US006996439B2

(12) United States Patent
Ozawa et al.

(10) Patent No.: US 6,996,439 B2
(45) Date of Patent: Feb. 7, 2006

(54) RECORDING MEDIUM HAVING A COMPUTER-EXECUTABLE PROGRAM FOR DATA TRANSMISSION TO PLURAL DEVICES

(75) Inventors: Jun Ozawa, Nara (JP); Hiroshi Kutsumi, Moriguchi (JP); Takeshi Imanaka, Nara (JP); Satoshi Matsuura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/197,590

(22) Filed: Jul. 18, 2002

(65) Prior Publication Data

US 2003/0042253 A1 Mar. 6, 2003

Related U.S. Application Data

(62) Division of application No. 10/158,860, filed on Jun. 3, 2002, now Pat. No. 6,653,609, which is a division of application No. 09/445,966, filed as application No. PCT/JP99/02016 on Apr. 15, 1999, now Pat. No. 6,420,687.

(30) Foreign Application Priority Data

Apr. 17, 1998 (JP) ............................ H10-108,323

(51) Int. Cl.
*G05B 11/01* (2006.01)

(52) U.S. Cl. ............................ 700/19; 700/20; 700/86; 717/172; 710/10

(58) Field of Classification Search .................. 700/19, 700/9, 11, 20, 38, 66, 86, 87; 710/10, 11, 710/14; 717/171–173
See application file for complete search history.

(56) References Cited

U.S. PATENT DOCUMENTS

| | | | | |
|---|---|---|---|---|
| 4,356,370 | A | 10/1982 | Horinouchi | |
| 4,816,635 | A | 3/1989 | Edamura | |
| 5,204,768 | A | 4/1993 | Tsakiris et al. | 359/148 |
| 5,349,673 | A * | 9/1994 | Yasuda | 709/211 |
| 5,500,794 | A | 3/1996 | Fujita et al. | 700/83 |
| 5,535,375 | A | 7/1996 | Eshel et al. | |
| 5,758,081 | A | 5/1998 | Aytac | 709/212 |
| 5,883,801 | A * | 3/1999 | Drucker et al. | 700/15 |
| 5,909,368 | A * | 6/1999 | Nixon et al. | 700/2 |

(Continued)

FOREIGN PATENT DOCUMENTS

WO WO 98/48596 10/1998

*Primary Examiner*—John Follansbee
*Assistant Examiner*—Aaron Perez-Daple
(74) *Attorney, Agent, or Firm*—Smith, Gambrell & Russell, LLP

(57) ABSTRACT

An apparatus is disclosed to include a transmission device 151 having a rule generation device 101 for generating rules, and a data transmission device 102 for converting rules generated by the rule generation device 101 into rule data and for transmitting the rule data. The apparatus also includes a receiving device 152 having a data receiving device 103 for receiving rule data transmitted by the data transmission device 102, a rule conversion device 104 for converting the rule data received by the data receiving device 103 into rules, a rule storage device 105 for storing rules converted by the rule conversion device 104, and a control device 106 for controlling a controlled apparatus, such as a microwave oven, in accordance with the rules stored in the rule storage device 105.

6 Claims, 60 Drawing Sheets

U.S. PATENT DOCUMENTS

| | | | | |
|---|---|---|---|---|
| 5,956,487 | A * | 9/1999 | Venkatraman et al. | 709/218 |
| 6,133,847 | A * | 10/2000 | Yang | 340/825.22 |
| 6,175,860 | B1 | 1/2001 | Gaucher | 709/208 |
| 6,216,175 | B1 * | 4/2001 | Sliger et al. | 717/169 |
| 6,288,716 | B1 * | 9/2001 | Humpleman et al. | 345/733 |
| 6,438,444 | B1 * | 8/2002 | Mizuno et al. | 700/169 |

* cited by examiner

Fig. 4

4001a — If 800W microwave oven then
    If hamburger then heatup 30sec 500W bake 100sec 800W
    If fried potato then heatup 20sec 600W
    If hot dog then heatup 60sec 700W

... ... ...

4001b — If 500W microwave oven then
    If hamburger then heatup 30sec 500W bake 180 sec 500W
    If fried potato then heatup 25sec 500W
    If hot dog then heatup 70sec 500W

Fig. 5

If hamburger then heatup 30 500, bake 100 800 end
If fried potato then heatup 20 600 end
If hot dog then heatup 60 700 end

Fig. 9

| | |
|---|---|
| If | #001 |
| then | #002 |
| ... | ... |
| hamburger | #011 |
| fried potato | #012 |
| hot dog | #013 |
| ... | ... |
| heatup | #101 |
| bake | #102 |

Fig. 10

#001 *800 #002
#001 #011 #002 #101 *030 *500 #102 *100 *800 **
#002 #012 #002 #101 *020 *600 **
#003 #013 #002 #101 *060 *700 **

#001 *500 #002···
#001 #011 #002 #101 *030 *500 #102 *180 *500 **
#002 #012 #002 #101 *025 *500 **
#003 #013 #002 #101 *070 *500 **

Fig. 14

```
If TYPE = TYPE1 then address &H001 data 10
If TYPE = TYPE2 then address &H011 data 20
    ...   ...
```

Fig. 18

1801

```
If fried potato then normal_heatup
normal_heatup; heatup 20sec 600W
      ... ...
```

1802

Fig. 22

| | | |
|---|---|---|
| 30sec 500W | → | 25sec 500W with steam |
| … … | → | … … |
| … … | → | … … |

Fig. 23

If hamburger then heatup 30sec 500W with steam bake 100sec 800W

If fried potato then heatup 20sec 600W

If hot dog then heatup 60sec 700W

Fig. 27

If number of usage times 100 or more then Call Back

Fig. 31

TYPE 1 card is not renewed

Fig. 35

If 0:00 - 12:00 then password=ppqq
If 12:00 - 24:00 then password=rrss

Fig. 39

3901 3902

IF Type=MW

Then 1st 800W 10sec
2nd 300W 30sec

IF Type=SC
Then 1st 800W 10sec
2nd 300W 40sec with Steam

Fig. 43

Data for type MS
was not renewed

Fig. 47

4701

Time=99/4/1/10:00:00

IF Type=MW
Then 1st 800W 10sec
2nd 300W 30sec

If Type=SC
Then 1st 800W 10sec
2nd 300W 40sec with Steam

Fig. 54

IF Type=MW
Then
State= High
1st 800W 10sec
2nd 300W 30sec
State= Low
1st 800W 15sec
2nd 300W 35sec IF Type=SC
Then
State= High
1st 800W 10sec
2nd 300W 40sec with Steam
State= Low
1st 800W 15sec
2nd 300W 45sec with Steam

RECORDING MEDIUM HAVING A COMPUTER-EXECUTABLE PROGRAM FOR DATA TRANSMISSION TO PLURAL DEVICES

This application is a Division of Ser. No. 10/158,860 Jun. 3, 2002 now U.S. Pat. No. 6,653,609 which is a Division of Ser. No. 09/445,966 Dec. 16, 1999 U.S. Pat. No. 6,420,687 which is a 371 of PCT/JP99/02016 filed Apr. 15, 1999.

TECHNICAL FIELD

The present invention relates to a data transmission apparatus, a data receiving apparatus, a rule communication apparatus, a rule communication method and a program recording medium applicable to transmission of control information, for example.

BACKGROUND ART

These days, convenience stores have increased abruptly, and they provide service wherein, from among abundant menu items, simple cooking on the site, such as heating by using a microwave oven or deeply frying, is carried out before selling.

In these circumstances, at franchise convenience stores and the like, a method of sending a cooking method for each menu item as information from a server under the control of the center to the terminal apparatus of each store is considered to unify the quality of commodity products and to increase the efficiency of cooking by standardizing cooking methods. In other words, such a cooking method is a method as a box lunch of curry and rice is heated for 45 sec by an 800 W cooking-use microwave oven, or a fried potato is heated for 20 sec by an 800 W cooking-use microwave oven. The information on such a cooking method is received once at the terminal and stored in memory. Employees at the convenience store print out and use the cooking information as necessary.

As means for providing the information, the WWW information of the Internet is considered to be used. More specifically, in the WWW information of the Internet, if browser software is available at the information terminal connected to a network, for servers having contents, it is possible to easily browse the contents at each information terminal. Therefore, this kind of information provision can be easily achieved not only in domestic areas but also at worldwide-scale chain stores.

However, in the above-mentioned provision of cooking methods, cooking-use microwave ovens installed at respective stores may be different in cooking function and capability depending on the size of the store or the like, for example; therefore, the cooking method sent from the server cannot be used as it is in some cases.

In other words, in a store provided with only the 500 W cooking-use microwave oven, as described above, on the basis of the information meaning that a box lunch of curry and rice is heated for 45 sec by an 800 W cooking-use microwave oven, this information must be changed appropriately to heating for 1 minute by a 500 W cooking-use microwave oven, and then must be used. If commodity products change abruptly, and the kinds of commodity products become abundant, such a change causes burdens to employees, also causing problems of varying the quality of commodity products (that is, the quality, such as taste, of foods as the result of control) from one store to another. In other words, in the conventional exchange between information devices connected to a network, contents created at the terminal on the transmission side are only browsed at the terminal on the receiving side, but control information or the like required to be changed depending on the terminal is not communicated. Therefore, the contents and information to be executed depending on the hardware environment and conditions on the receiving side cannot be changed. As a result, in the case when the above-mentioned control information must be changed depending on the hardware environment and controlled object, the above-mentioned defects are caused.

DISCLOSURE OF INVENTION

In consideration of these conventional problems, the present invention is intended to provide a data transmission apparatus, a data receiving apparatus, a rule communication apparatus and a rule communication method capable of reducing burdens on the change of received information on the information receiving terminal side and capable of reducing variations in the result of control.

The 1st invention of the present invention is a data transmission apparatus comprising:

a rule generation means for generating rules corresponding to each kind of plural kinds of controlled apparatuses as controlled objects on the receiving side, and a data transmission means for converting said rules generated by said rule generation means into data and for transmitting said converted data to plural data receiving apparatuses, wherein said data receiving apparatus comprises a data receiving means for receiving said data transmitted from said transmission means, a rule conversion means for converting said rules received by said data receiving means into rules, a rule storage means for storing said rules converted by said rule conversion means, and a rule selection means for selecting a corresponding rule from said plural kinds of rules stored in said rule storage means.

The 3rd invention of the present invention is data receiving apparatus comprising:

a data receiving means for receiving data when rules corresponding to each kind of plural kinds of controlled apparatuses as controlled objects on the receiving side are converted into predetermined data and transmitted, a rule conversion means for converting said data received by said data receiving means into rules, a rule storage means for storing said rules converted by said rule conversion means, and a rule selection means for selecting a predetermined rule from said plural kinds of rules stored in said rule storage means, wherein said predetermined rule is selected depending on said controlled apparatus.

The 15th invention of the present invention is a rule communication apparatus comprising:

a data transmission apparatus having a rule generation means for generating rules corresponding to each kind of plural kinds of controlled apparatuses on the receiving side, and a data transmission means for converting said rules generated by said rule generation means into data and for transmitting said data to plural data receiving apparatuses, and plural data receiving apparatuses each having a data receiving means for receiving said data transmitted from said data transmitting means, a rule conversion means for converting said rules received by said data receiving means into rules, a rule storage means for storing said rules converted by said rule conversion means, and a rule selection means for selecting a corresponding rule from among said plural kinds of rules stored in said rule storage means, wherein said predetermined rule is selected depending on said controlled apparatus.

The 16th invention of the present invention is a rule communication method wherein rules corresponding to each kind of plural kinds of controlled apparatuses are generated on the receiving side, said generated rules are converted into data, and transmitted to said receiving side, and each of the plural receiving apparatuses installed on said receiving side receives said transmitted data, carries out conversion into rules, stores said rules, and selects a rule corresponding to said controlled apparatus from among said plural kinds of stored rules.

The 18th invention of the present invention is a rule communication apparatus in accordance with said the 15th invention, wherein said rule selection means selects a rule corresponding to said controlled apparatus from among said plural kinds of rules by using identification information described in said rule, and carries out writing control for writing said selected rule in a predetermined data storage means.

The 20th invention of the present invention is a rule communication apparatus comprising:

a rule generation means for generating rules, an execution content generation means for generating execution contents of said rules, a data transmission means for converting said rules and said execution contents into data and transmitting said data, a data receiving means for receiving said data transmitted by said data transmission means, a rule/execution content conversion means for converting said data received by said data receiving means into rules and execution contents, a rule storage means for storing said rules converted by said rule/execution content conversion means, an execution content storage means for storing said execution contents converted by said rule/execution content conversion means, and a control means for carrying out control by using said rules stored in said rule storage means and said execution contents stored in said execution content storage means.

The 22th invention of the present invention is a rule communication apparatus comprising:

a rule editing content generation means for generating rule editing contents, a data transmission means for converting said rule editing contents generated by said rule editing content generation means into data and for transmitting said data, a data receiving means for receiving said data transmitted by said data transmission means, a rule editing content conversion means for converting said data received by said data receiving means into rule editing contents, a rule editing content storage means for storing said rule editing contents converted by said rule editing content conversion means, a rule storage means for storing rules, and a rule editing means for editing said rules stored in said rule storage means on the basis of said rule editing contents stored in said rule editing content storage means.

The 24th invention of the present invention is a rule communication apparatus comprising:

a rule generation means for generating rules, a data transmission means for converting said rules generated by said rule generation means into data and transmitting said data, a data receiving means for receiving said data transmitted by said data transmission means, a rule conversion means for converting said data received by said data receiving means into rules, a rule storage means for storing said rules converted by said rule conversion means, a control means for controlling controlled apparatuses, a control content storage means for storing contents controlled by said control means, and a rule execution means for executing rules depending on said rules stored in said rule storage means and said control contents stored in said control content storage means.

The 26th invention of the present invention is a rule communication apparatus in accordance with said the 18th invention, comprising a data storage means for storing data to be written, and a control operation execution means for executing control operation depending on the contents stored in said data storage means.

The 28th invention of the present invention is a rule communication apparatus comprising:

a next password input means for inputting a password planned to be used next as the next password, a data transmission means for converting said password input by said next password input means into data and transmitting said data, a data receiving means for receiving said data transmitted by said data transmission means, a next password interpretation means for interpreting said password received by said data receiving means, and a next password storage means for storing said next password interpreted by said next password interpretation means.

The 34th invention of the present invention is a rule communication apparatus, wherein said data transmission means converts said rules into DTMF signals and carries out said transmission.

Therefore, for example, it is possible to select control information corresponding to a controlled apparatus at the data receiving apparatus.

BRIEF DESCRIPTION OF THE DRAWINGS

FIG. 4 is a view explaining control rules created by the rule communication apparatus;

FIG. 5 is a view showing text format contents used for communications by the rule communication apparatus;

FIG. 9 is a view showing a table of the relationship between the contents of rules and DTMF signals;

FIG. 10 is a view representing the DTMF signals to be transmitted;

FIG. 14 is a view showing contents to be written on an IC card;

FIG. 18 is a view showing rules and contents to be executed;

FIG. 22 is a view showing the corrected contents of rules;

FIG. 23 is a view showing corrected rules;

FIG. 27 is a view showing rules for control contents;

FIG. 31 is a view showing a display indication example in accordance with the present embodiment;

FIG. 35 is a view showing the next passwords represented in rules in accordance with the present embodiment;

FIG. 39 is a view explaining control rules created by the rule communication apparatus in accordance with the present embodiment;

FIG. 43 is a view showing a display indication example in accordance with the present embodiment;

FIG. 47 is a view explaining control rules created by the rule communication apparatus in accordance with the present embodiment;

FIG. 54 is a view explaining control rules created by the rule communication apparatus in accordance with the present embodiment;

Figure 1:
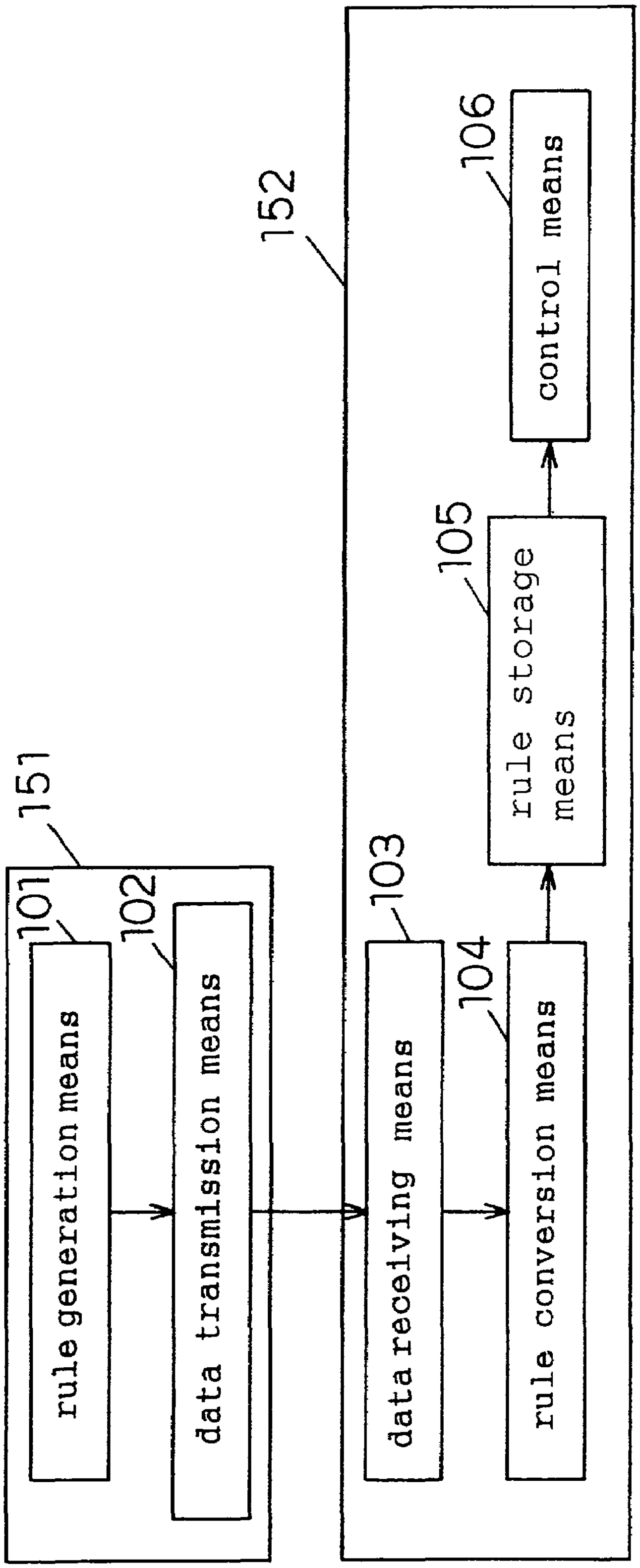
FIG. 1 is a block diagram showing the system configuration of a rule communication apparatus in accordance with Embodiment 1.

EXPLANATION OF CODES 101, 601, 1101, 1501, 2401, 2801 . . . rule generation means 1505 . . . execution content generation means 102, 1102, 1503, 1902, 2402, 2802, 3202 . . . data transmissive means 103, 1103, 1504, 1903, 2403, 2803, 3203 . . . data receiving means 104, 604, 1104, 2404, 2804 . . . rule conversion means 105, 605, 1105, 1506, 1907, 2405, 2805 . . . rule storage means 106, 606, 1508, 2406 . . . control means 602 . . . DTMF transmission means 603 . . . DTMF receiving means 1106, 2806 . . . data writing means 1107, 2807 . . . data storage means 1505 . . . rule/execution content conversion means 1507 . . . execution content storage means 1901 . . . rule editing content generation means 1904 . . . rule editing content conversion means 1905 . . . editing content storage means 1906 . . . rule editing means 2407 . . . control content storage means 2408 . . . rule execution means 2809 . . . control operation execution means 2808 . . . data writing content storage means 3201 . . . next password input means 3204 . . . next password interpretation means 3205 . . . next password storage means 201, 701, 1201, 1601, 2001, 2501, 2901, 3301 . . . main storage means 202, 702, 1202, 1602, 2002, 2502, 2902, 3302 . . . external storage means 203, 703, 1203, 1603, 2003, 2503, 2903, 3303 . . . CPU 204, 704, 1204, 1604, 2004, 2504, 2904, 3304 . . . modem 205, 705, 1205, 1605, 2505, 2905 . . . control means

BEST MODE FOR CARRYING OUT THE INVENTION

Embodiments of the present invention will be described below referring to the drawings.

(Embodiment 1)

FIG. 1 is a system configuration diagram of a rule communication apparatus of an embodiment in accordance with the present invention; and the present embodiment will be described by using the figure.

First, the summary of the present embodiment is described.

In the case where control information is transmitted from the transmission side to the receiving side comprising plural receiving terminals, unless control information corresponding to each control function provided for each terminal on the receiving side is not transmitted, each receiving terminal cannot use the received control information as it is, as described before.

For example, in the case where a new frozen food has been developed at a convenience store or a family restaurant, control information for a microwave oven to be used to thaw and cook the frozen food differs depending on the microwave oven to be used. More specifically, a 500 W microwave oven and a 800 W microwave oven require different control information, even when the same food is cooked. Furthermore, a microwave oven equipped with a steam function additionally requires control information wherein steam control information is considered. The functions of a microwave oven may sometimes differ for each store, and plural types of microwave ovens are frequently provided even in the same store. Therefore, the present embodiment is intended to transmit plural kinds of information depending on each type from the server on the transmission side to all stores. In this case, in each piece of control information, identification information for identifying which type of the microwave oven uses the information is represented in the format of the IF statement (in FIG. 4, codes 4001*a* and 4001*b* are assigned)

In other words, since control information corresponding to each type is represented in accordance with the rule of the IF THEN format, only the necessary control information can be selected by referring to the IF statement from the transmitted control information on the receiving side.

As a result, it is possible to carry out cooking in accordance with the control information corresponding to each type.

Next, the configuration of the present embodiment will be described referring to FIG. 1.

In FIG. 1, the numeral 101 represents a rule generation means for generating rules, and the numeral 102 represents a data transmission means for converting the rules generated by the rule generation means 101 into data and for transmitting the data. These are used to compose a transmission apparatus 151. Furthermore, the numeral 103 represents a data receiving means for receiving data transmitted by the data transmission means 102, the numeral 104 represents a rule conversion means for converting the data received by the data receiving means 103 into rules, the numeral 105 represents a rule storage means for storing the rules converted by the rule conversion means 104, and the numeral 106 represents a control means for controlling a controlled apparatus (not shown), such as a microwave oven, in accordance with the rules stored in the rule storage means 105. These are used to compose a receiving apparatus 152. A rule communication apparatus in accordance with the present embodiment comprises the above-mentioned transmission apparatus 151 and the receiving apparatus 152. Herein, the data transmission apparatus of the present invention corresponds to the transmission apparatus 151, and the data receiving apparatus of the present invention corresponds to the receiving apparatus 152. In addition, the control means 106 is a means including a rule selection means of the present invention.

Figure 2:
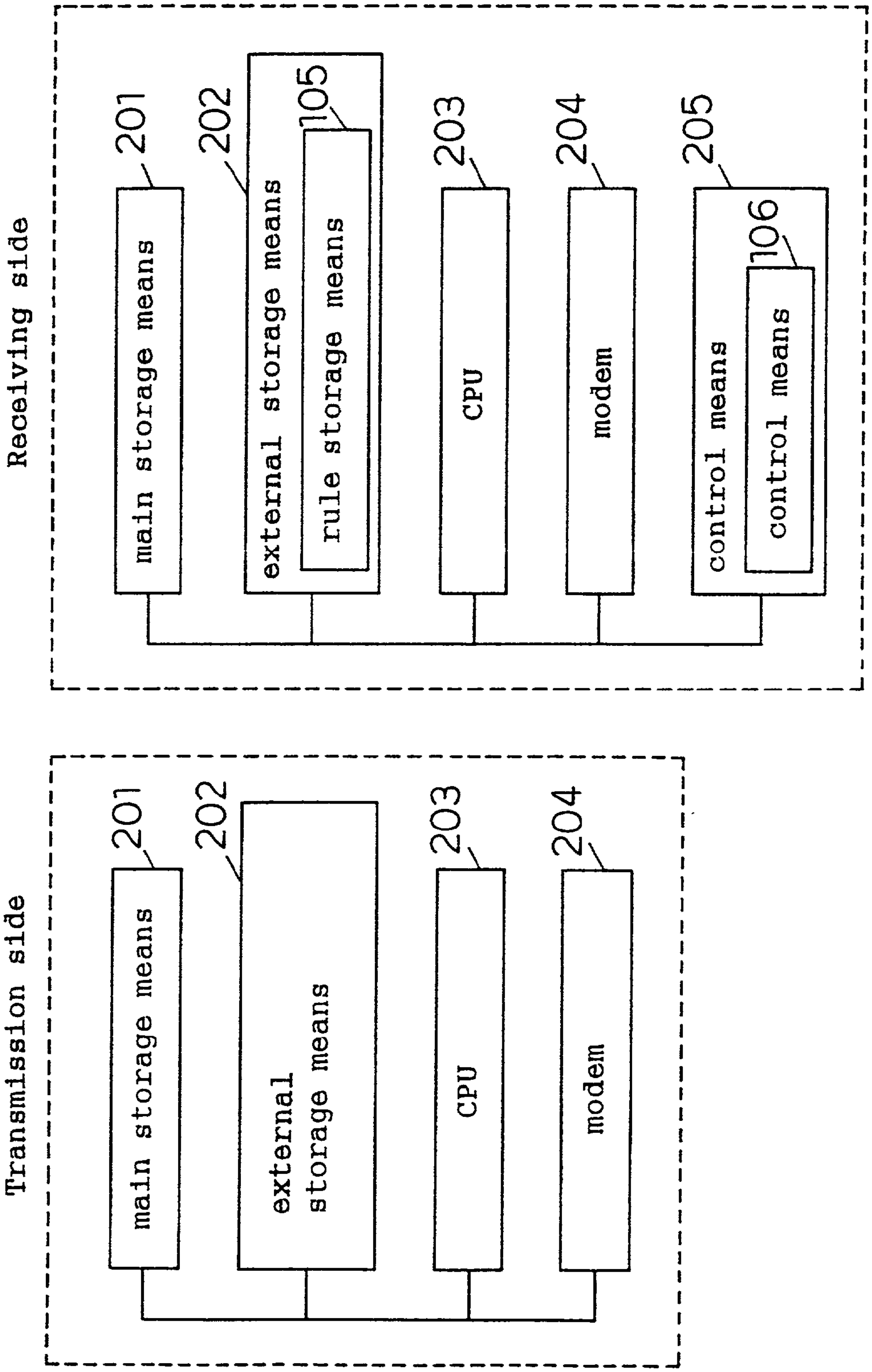
FIG. 2 is a block diagram showing the hardware configuration of the rule communication apparatus in accordance with Embodiment 1.

Next, FIG. 2 shows a hardware configuration wherein the system configured as described above is operated.

FIG. 2 is basically the same configuration as that of a general-purpose computer system for carrying out communication, and comprising the rule storage means 105 and the control means 106 described as the components of the system shown in FIG. 1. The same components in the configuration shown in FIG. 2 as those of the system configuration shown in FIG. 1 are represented by the same numerals, and their explanations are omitted. In FIG. 2, the numeral 201 represents a main storage apparatus for storing processing programs and data at the time of execution, the numeral 202 represents an external storage apparatus for storing programs and data, the numeral 203 represents a CPU for transferring programs stored in the external storage apparatus 202 to the main storage apparatus 201 and for executing them, the numeral 204 represents a modem capable of being connected to an external network, and the numeral 205 represents a control apparatus for controlling a controlled apparatus (this may be simply referred to as a device or a control device in some cases) by the control means 106.

Figure 3:
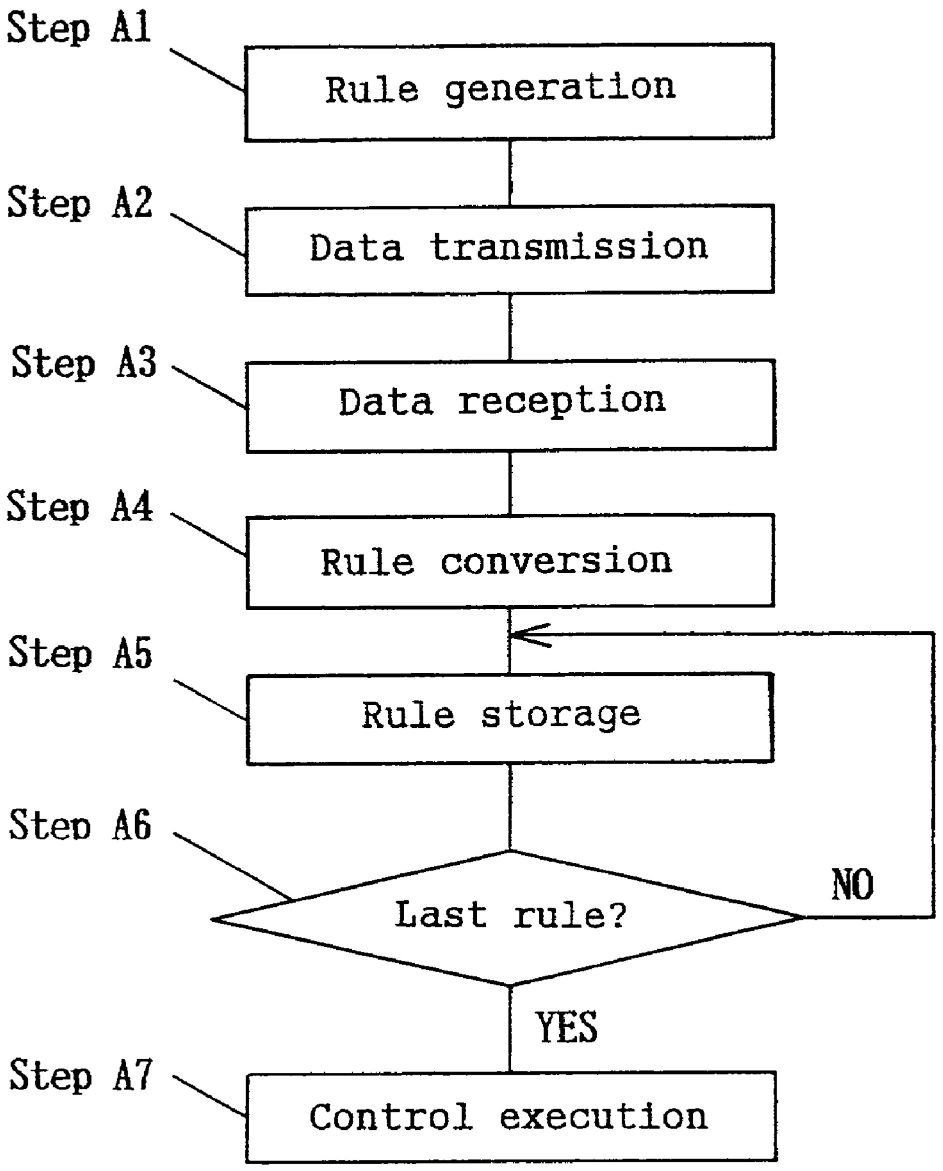
FIG. 3 is a flowchart explaining the operation of the rule communication apparatus in accordance with Embodiment 1.

The operation of the rule communication apparatus configured as described above will be explained in accordance with the flowchart of FIG. 3, and an embodiment of the rule communication method of the present invention will also be described.

(Step A1)

At the rule generation means 101, rules are edited on the transmitter side. For example, it is assumed that the rules shown in FIG. 4 have been created and edited as rules for controlling a cooking apparatus.

(Step A2)

At the data transmission means 102, the rules created by the rule generation means 101 are reedited so as to have a format interpretable on the data receiving side and transmitted. For example, the rules of FIG. 4 created at (Step A1) are converted into text format data shown in FIG. 5.

(Step A3)

At the data receiving means 103, the contents of the text format transmitted at (Step A2) are received on the data receiving side. In this example, the contents of the text of FIG. 5 are received.

(Step A4)

At the rule conversion means 104, the contents received at (Step A3) are converted into rules. At this step, conversion is carried out into the rules of FIG. 4 created by the rule generation means 101 on the transmission side.

(Step A5)

One rule is selected from among the rules converted at (Step A4), and input to the rule storage means 105 and stored therein.

(Step A6)

In the case where the rule to be stored is not the last rule, the sequence returns to (Step A5). In other cases, the sequence advances to the next step. As a result, the rules of FIG. 4 are stored in the rule storage means 105.

(Step A7)

In the case where the control means 106 controls a controlled apparatus, it controls the controlled apparatus referring to the rules stored in the rule storage means 105.

For example, the case wherein an apparatus to be a controlled object is an 800 W microwave oven, and heating is selected by a user as a method of cooking a food "hamburger" is described below.

In other words, in this case, the control means 106 reads IF statement portions from plural kinds of cooking methods (corresponding to the rules) shown in FIG. 4 and stored in the rule storage means 105, and searches for only the cooking methods corresponding to the 800 W microwave oven. Then, it selects the cooking method for "hamburger" from among them. Herein, as shown in FIG. 4, "heatup 30 sec 500 W bake 100 sec 800 W" is selected to control a controlled apparatus, such as a microwave oven or an oven.

As a result of operating the above-mentioned algorithm, the control for the controlled apparatus can be changed depending on a food or an object to be cooked. Furthermore, control contents to be changed can be set on the transmitter side at a remote location. Therefore, it is possible to change the control contents for the controlled apparatus depending on the object without going to the site wherein the controlled apparatus is located.

In addition, in the above-mentioned embodiment, the case wherein the IF statement is used as identification information is described; however, without being limited to this, an identification number corresponding to each controlled apparatus may be assigned simply, instead of the IF statement.

The control means 106 may be disposed outside the controlled apparatus as described above, or may be built in the controlled apparatus.

(Embodiment 2)

Figure 6:
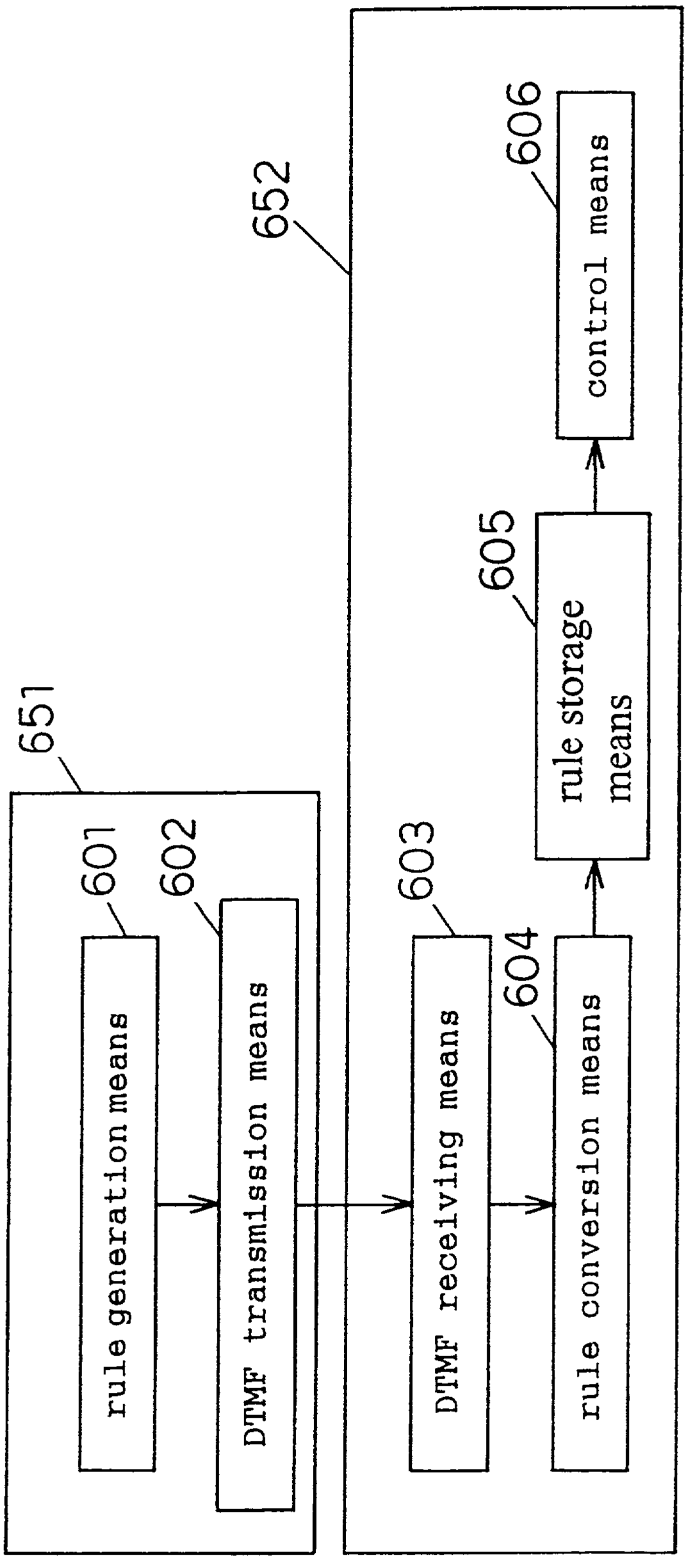
FIG. 6 is a block diagram showing the system configuration of a rule communication apparatus in accordance with Embodiment 2.

FIG. 6 is a system configuration diagram of a rule communication apparatus of an embodiment in accordance with the present invention; and the present embodiment will be described by using the figure. In FIG. 6, the numeral 601 represents a rule generation means for generating rules, and the numeral 602 represents a DTMF transmission means for converting the rules generated by the rule generation means 601 into DTMF and for transmitting the DTMF. These are used to form a transmission apparatus 651. Furthermore, the numeral 603 represents a DTMF receiving means for receiving DTMF signals transmitted by the DTMF transmission means 602, the numeral 604 represents a rule conversion means for converting the data received by the data receiving means 603 into rules, the numeral 605 represents a rule storage means for storing the rules converted by the rule conversion means 604, and the numeral 606 represents a control means for carrying out control in accordance with the rules stored in the rule storage means 605. These are used to compose a receiving apparatus 652.

The main difference between the present embodiment and Embodiment 1 is that the rules to be transmitted are converted into the DTMF signals.

Figure 7:
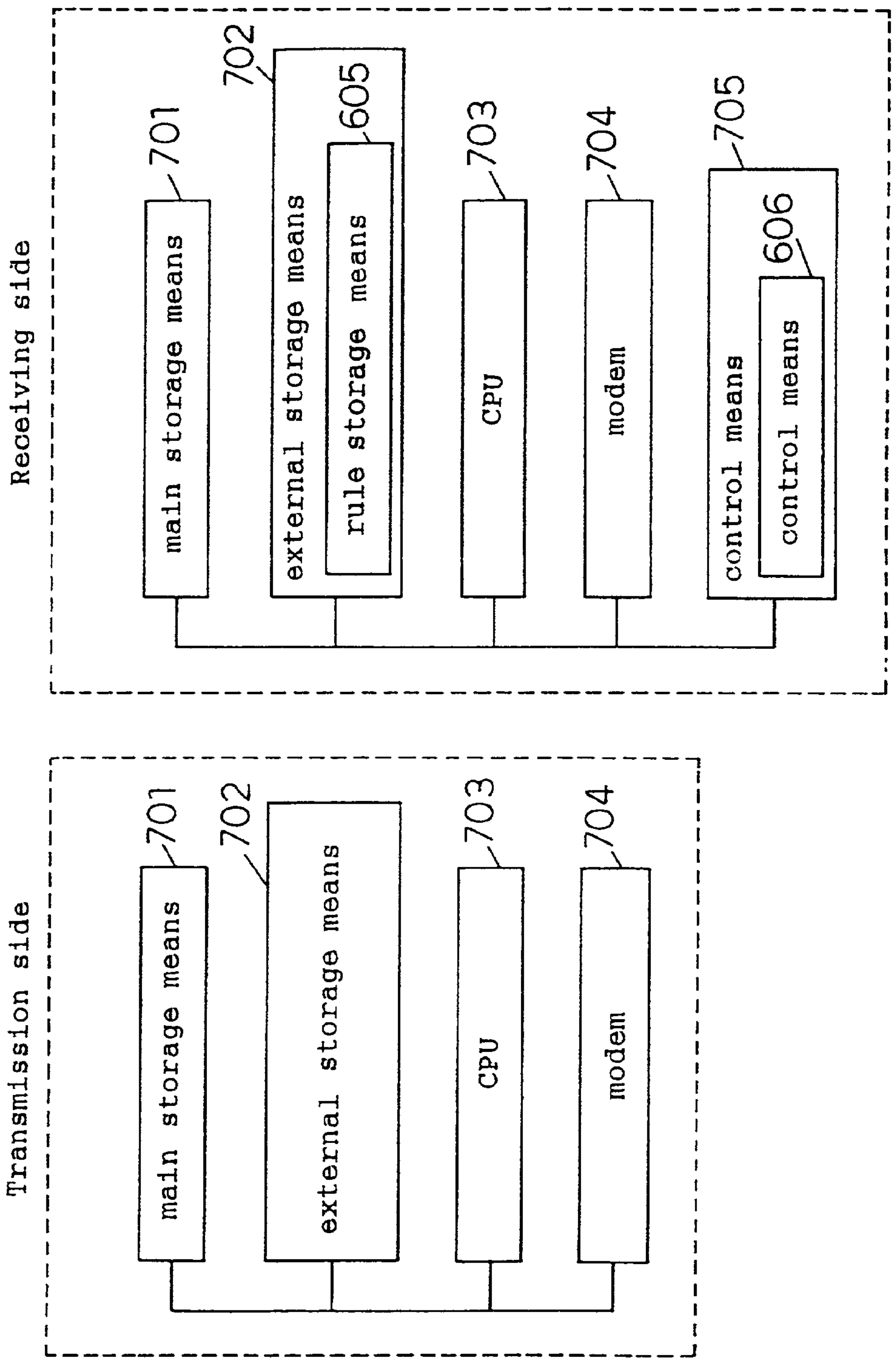
FIG. 7 is a block diagram showing the hardware configuration of the rule communication apparatus in accordance with Embodiment 2.

FIG. 7 shows a hardware configuration wherein the system configured as described above is operated. FIG. 7 is basically the same configuration as that of a general-purpose computer system for carrying out communication, and comprising the rule storage means 605 and the control means 606 described as the components of the system shown in FIG. 6. The same components in the configuration shown in FIG. 7 as those of the system configuration shown in FIG. 6 are represented by the same numerals, and their explanations are omitted. In FIG. 7, the numeral 701 represents a main storage apparatus for storing processing programs and data at the time of execution, the numeral 702 represents an external storage apparatus for storing programs and data, the numeral 703 represents a CPU for transferring programs stored in the external storage apparatus 702 to the main storage apparatus 701 and for executing them, the numeral 704 represents a modem capable of being connected to an external network, and the numeral 705 represents a control apparatus for controlling a device by the control means 606.

Figure 8:
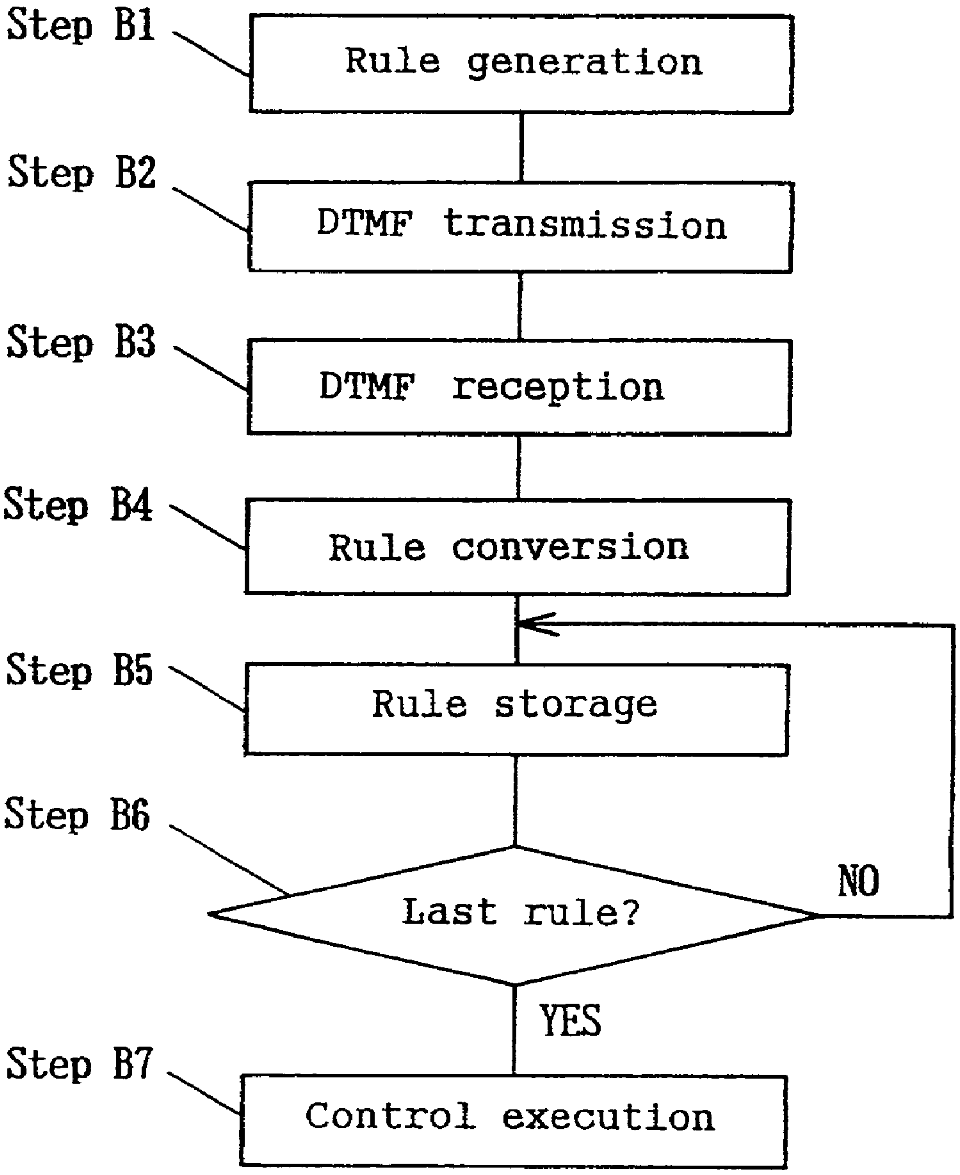
FIG. 8 is a flowchart explaining the operation of the rule communication apparatus in accordance with Embodiment 2.

The operation of the rule communication apparatus configured as described above will be explained in accordance with the flowchart of FIG. 8, and an embodiment of the rule communication method of the present invention will also be described.

(Step B1)

The process similar to that of (Step A1) is carried out.

(Step B2)

At the DTMF transmission means 602, the rules created by the rule generation means 601 are reedited so as to have a format interpretable on the receiving side and transmitted. For example, the rules of FIG. 4 created at (Step B1) are converted by referring to the table of FIG. 9 showing the relationship between the rules and DTMF. “30 sec” and “500 W” are converted into DTMF signals “*030” and “*500,” respectively. As a result, they are converted into the DTMF signals shown in FIG. 10. The converted contents are transmitted as DTMF signals.

(Step B3)

At the DTMF receiving means 603, the contents of the DTMF signals transmitted at (Step B2) are received on the data receiving side. In this example, the DTMF signals of FIG. 10 are received.

(Step B4)

At the rule conversion means 604, the contents received at (Step B3) are converted into rules. Herein, the table shown in FIG. 9 and used on the transmission side is also held beforehand on the receiving side, and the contents are converted into the rules shown in FIG. 4 by using the table.

The, processes similar to those of (Step A5) to (Step A7) are carried out at (Step B5) to (Step B7).

As a result of operating the above-mentioned algorithm, device control can be changed depending on a food or an object to be cooked. Furthermore, control contents to be changed can be set on the transmitter side at a remote location. Moreover, since the DTMF signals are used, it is possible to change the contents of device control through a generally-used telephone set with pushbutton telephone line. Therefore, it is possible to change contents of device control depending on the object without going to the site wherein the controlled apparatus is located.

(Embodiment 3)

Figure 11:
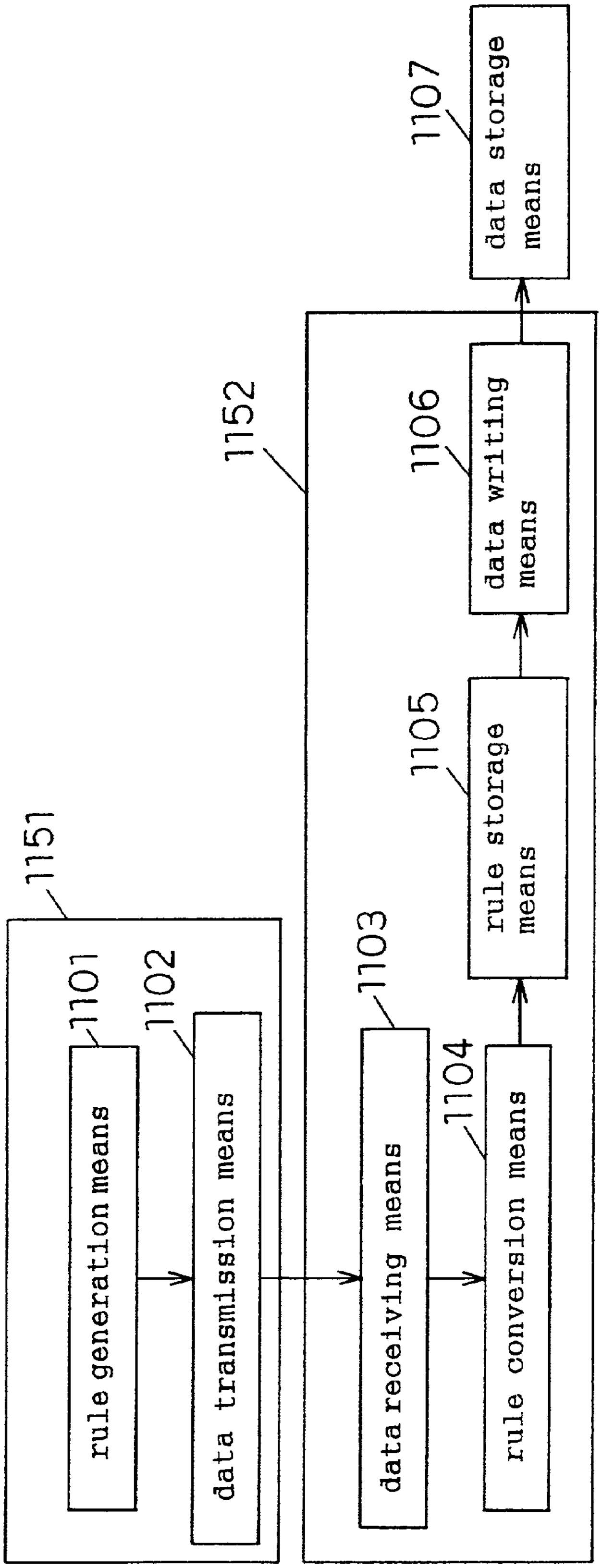
FIG. 11 is a block diagram showing the system configuration of a rule communication apparatus in accordance with Embodiment 3.

FIG. 11 is a system configuration diagram of a rule communication apparatus of an embodiment in accordance with the present invention; and the present embodiment will be described by using the figure.

In FIG. 11, the numeral 1101 represents a rule generation means for generating rules, and the numeral 1102 represents a data transmission means for converting the rules generated by the rule generation means 1101 into data and for transmitting the data. These are used to compose a transmission apparatus 1151. Furthermore, the numeral 1103 represents a data receiving means for receiving data transmitted by the data transmission means 1102, the numeral 1104 represents a rule conversion means for converting the data received by the data receiving means 1103 into rules, the numeral 1105 represents a rule storage means for storing the rules converted by the rule conversion means 1104, the numeral 1107 represents a data storage means, such as an IC card for storing data, the numeral 1106 represents a data writing means for writing data in the data storage means 1107 on the basis of the rules stored in the rule storage means 1105. These are used to compose a receiving apparatus 1152. The rule selection means of the present invention is a means corresponding to the control apparatus 1205 including the data writing means 1106.

The summary of the present embodiment will be described herein.

The present embodiment is a modification example of the above-mentioned Embodiment 1. In other words, in Embodiment 1, the control apparatus 205 (with the control means 106 built in) is directly connected to each controlled apparatus. However, since a line terminal such as a telephone line terminal for receiving data from the transmission apparatus side is physically remote from the installation location of each controlled apparatus, direct connection may be difficult in some cases. The present embodiment is intended to conform to such cases.

In a controlled device such as a microwave oven, control contents are stored in a removable storage medium, such as an IC card, and control is carried out by connecting the storage medium to the controlled device in some cases. In the present embodiment, an apparatus (the data writing means 1106) for storing control information transmitted from the transmission apparatus side on a recording medium (the data storage means 1107) such as an IC card, is provided to achieve an apparatus for transmitting and receiving control information corresponding to the controlled device.

In the present embodiment, by using the data writing means 1106, the rule storage means 1105 is connected to the data storage means 1107, such as an IC card, for storing control information. By the data writing means 1106, on the IC card, only the information relating to a device capable of using the IC card is selected from among plural kinds of information in the rule storage means 1105 by using the IF statement just as in the case of the above-mentioned Embodiment 1, and then stored. After this, by connecting this IC card (the medium of the data storage means) to the corresponding controlled apparatus, it is possible to carry out control corresponding to each controlled apparatus.

Figure 12:
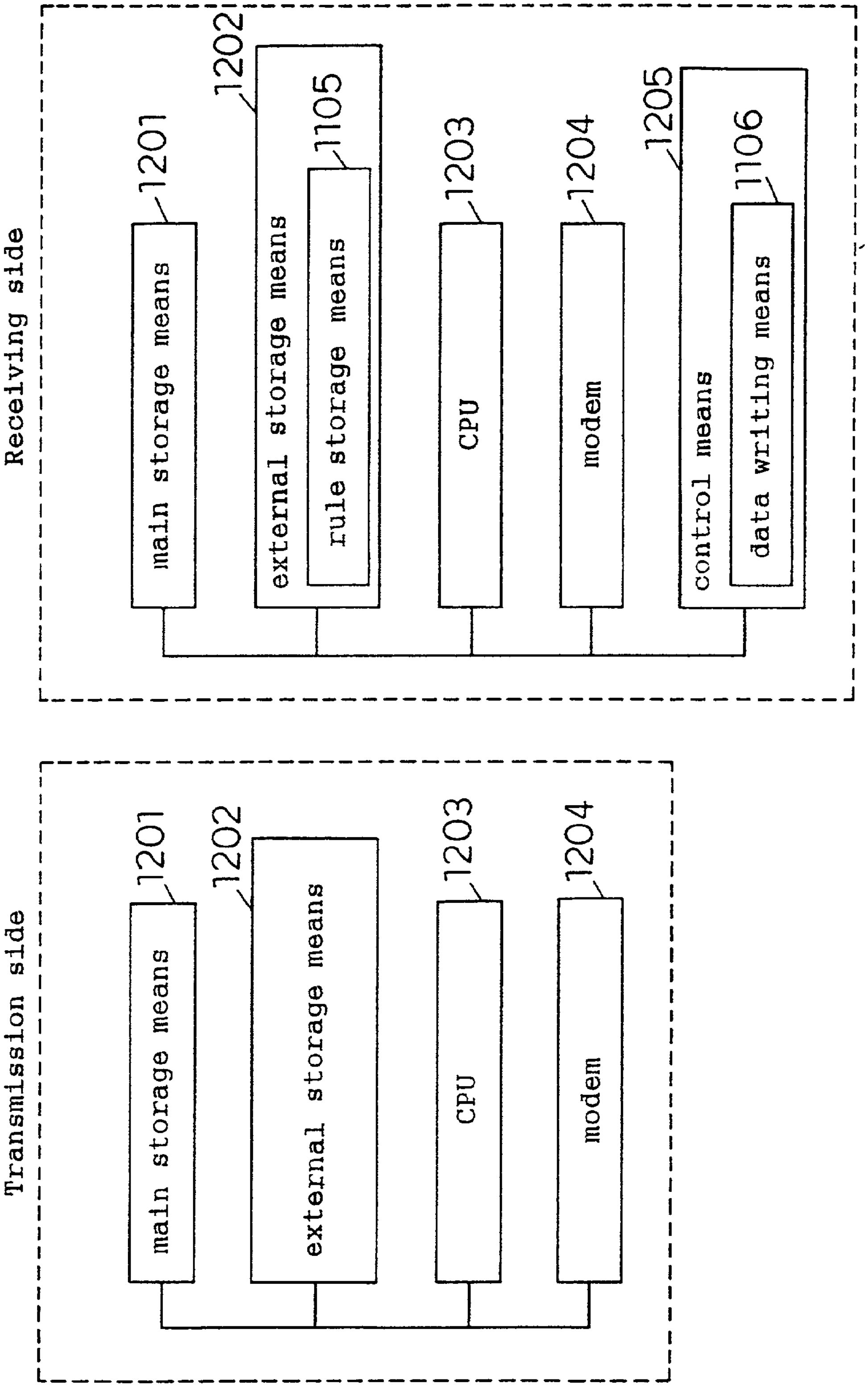
FIG. 12 is a block diagram showing the hardware configuration of the rule communication apparatus in accordance with Embodiment 3.

FIG. 12 shows a hardware configuration wherein the system configured as described above is operated. FIG. 12 is basically the same configuration as that of a general-purpose computer system for carrying out communication, and comprising the rule storage means 1105 and the data writing means 1106 described as the components of the system shown in FIG. 11. The same components in the configuration shown in FIG. 12 as those of the system configuration shown in FIG. 11 are represented by the same numerals, and their explanations are omitted. In FIG. 12, the numeral 1201 represents a main storage apparatus for storing processing programs and data at the time of execution, the numeral 1202 represents an external storage apparatus for storing programs and data, the numeral 1203 represents a CPU for transferring programs stored in the external storage apparatus 1202 to the main storage apparatus 1201 and for executing them, the numeral 1204 represents a modem capable of being connected to an external network, and the numeral 1205 represents a control apparatus for controlling data writing by the data writing means 1106.

Figure 13:
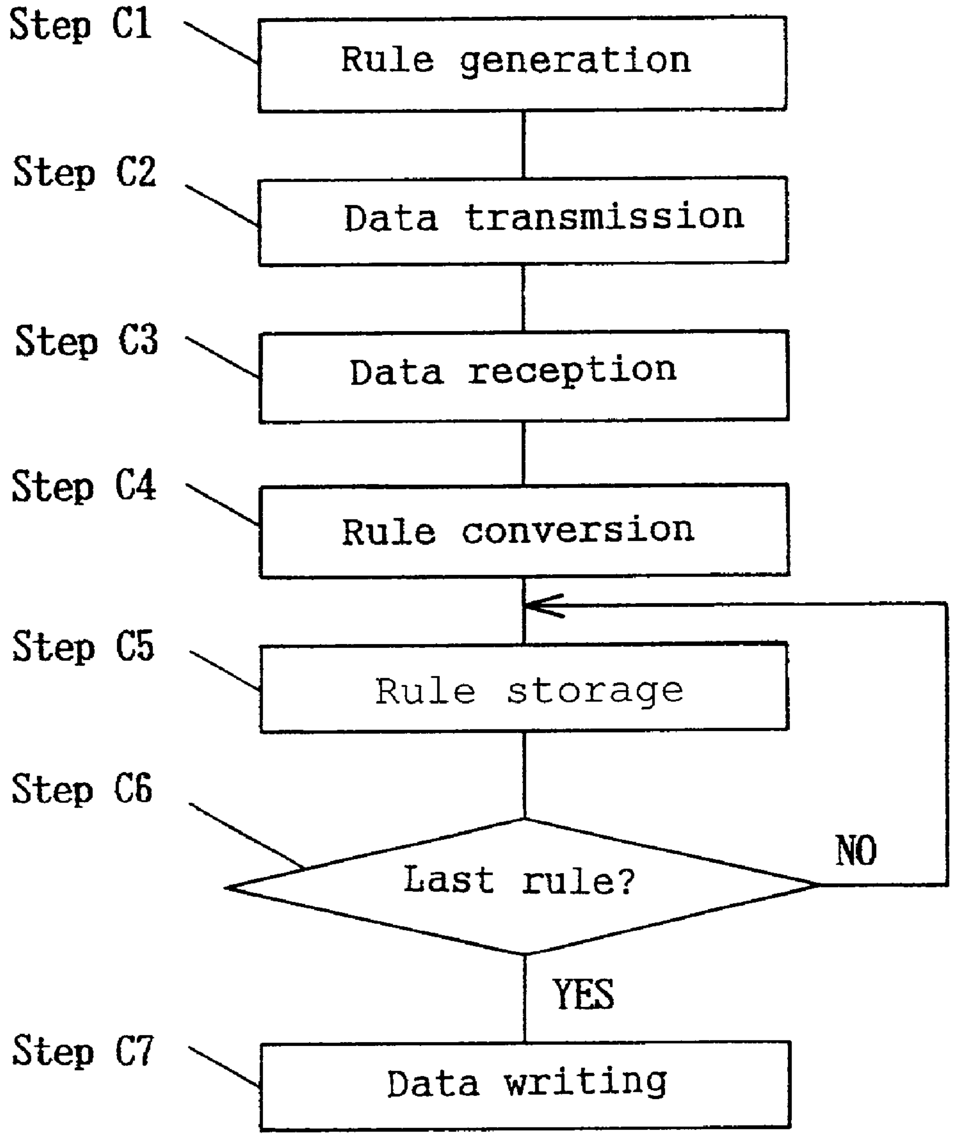
FIG. 13 is a flowchart explaining the operation of the rule communication apparatus in accordance with Embodiment 3.

The operation of the rule communication apparatus configured as described above will be explained in accordance with the flowchart of FIG. 13, and an embodiment of the rule communication method of the present invention will also be described.

(Step C1)

At the rule generation means 1101, rules are edited on the transmitter side. For example, it is assumed that the rules shown in FIG. 14 have been created and edited as rules for data writing contents.

(Step C2)

At the data transmission means 1102, the rules created by the rule generation means 1101 are reedited so as to have a format interpretable on the receiving side and then transmitted.

(Step C3)

At the data receiving means 1103, the text-format contents transmitted at (Step C2) are received on the data receiving side.

(Step C4)

At the rule conversion means 1104, the contents received at (Step C3) are converted into rules. At this step, conversion is carried out into the rules of FIG. 14 generated by the rule generation means 1101 on the transmission side.

(Step C5)

One rule is selected from among the rules converted at (Step C4), and input to the rule storage means 1105 and stored therein.

(Step C6)

In the case where the rule to be stored is not the last rule, the sequence returns to (Step C5). In other cases, the sequence advances to the next step.

(Step C7)

For example, in the case where an IC card (corresponding to the data storage means 1107), on which device control information has been stored, is inserted into the data writing means 1106, data is written on the card on the basis of the rule stored in the rule storage means 1105. At this time, information, such as TYPE1, TYPE2 or the like, has been stored on each IC card for device control depending on the controlled device, it is possible to select the contents to be written on the card depending on the TYPE. In other words, it is possible to select control information depending on the controlled device.

As the result of operating the above-mentioned algorithm, in the case where a device is controlled by using an external storage medium, such as an IC card, it is possible to write the content of data to be written depending on the type of the card; therefore, even a user, who must control the device by using the external storage medium, such as the IC card, can make the present apparatus automatically identify the type of the card and write data, without concern for the type of the card.

In the present embodiment, the data transmission means and the data receiving means are used to carry out data transmission and reception; however, these means may be changed to a DTMF transmission means and a DTMF receiving means, and information transmission and reception may be carried out by using DTMF signals.

(Embodiment 4)

Figure 15:
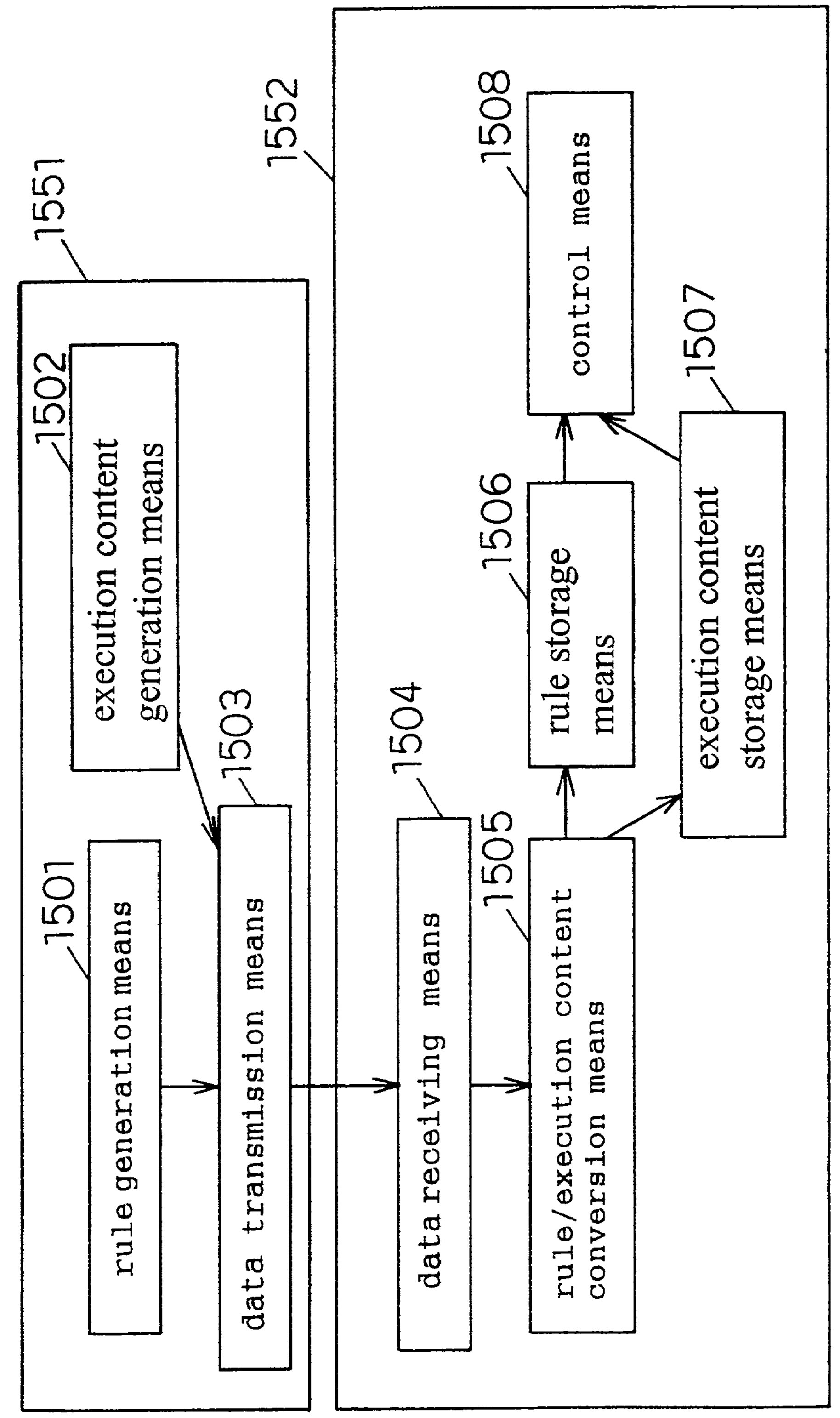
FIG. 15 is a block diagram showing the system configuration of a rule communication apparatus in accordance with Embodiment 4.

FIG. 15 is a system configuration diagram of a rule communication apparatus of an embodiment in accordance with the present invention; and the present embodiment will be described by using the figure.

First, the summary of the present embodiment is described.

The present embodiment is a modification example of the above-mentioned Embodiment 1. In other words, in the case where control information is transmitted from the transmission side to the receiving side, a content similar to that transmitted before may be transmitted. In this case, by storing previously transmitted control information on the receiving side, control information to be transmitted can be reduced, and the cost for communication can be reduced. Accordingly, the present embodiment is intended to conform to this kind of case.

Next, the configuration of the present embodiment will be described referring to FIG. 15.

In FIG. 15, the numeral 1501 represents a rule generation means for generating rules, the numeral 1502 represents execution content generation means for generating the execution contents of the rules, and the numeral 1503 represents a data transmission means for converting the rules and the execution contents into data and for transmitting the data. These are used to compose a transmission apparatus 1551 Furthermore, the numeral 1504 represents a data receiving means for receiving data transmitted by the data transmission means 1503, the numeral 1505 represents a rule/execution content conversion means for converting the data received by the data receiving means 1503 into rules and execution contents, the numeral 1506 represents a rule storage means for storing the rules converted by the rule/execution content conversion means 1505, the numeral 1507 represents an execution content storage means for storing the execution contents converted by the rule/execution content conversion means 1505, and the numeral 1508 represents a control means for carrying out control by using the rules stored in the rule storage means 1506 and the execution contents stored in the execution content storage means 1507. These are used to compose a receiving apparatus 1552.

Figure 16:
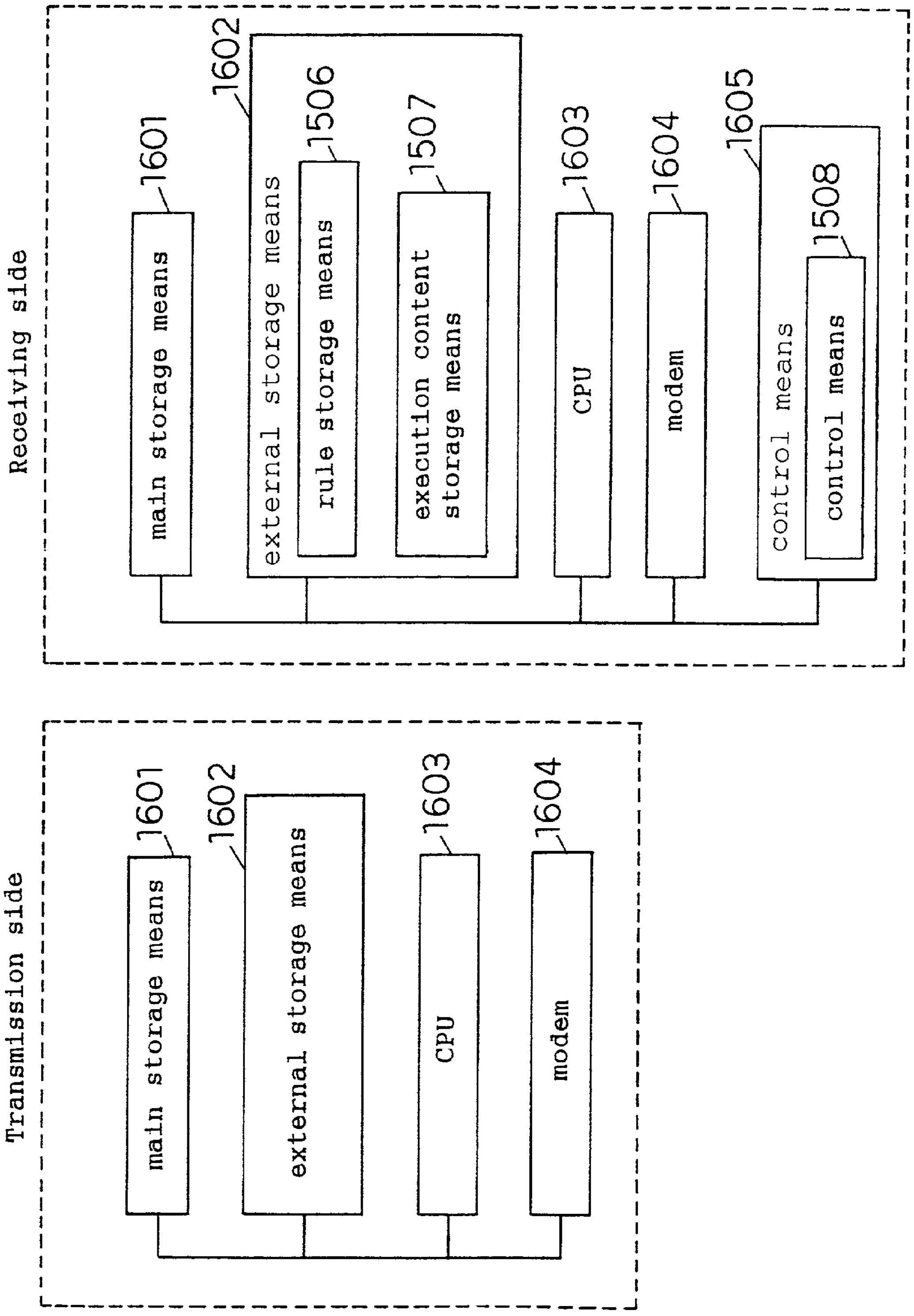
FIG. 16 is a block diagram showing the hardware configuration of the rule communication apparatus in accordance with Embodiment 4.

FIG. 16 shows a hardware configuration wherein the system configured as described above is operated. FIG. 16 is basically the same configuration as that of a general-purpose computer system for carrying out communication, and comprising the rule storage means 1506, the execution content storage means 1507 and the control means 1508 described as the components of the system shown in FIG. 15. The same components in the configuration shown in FIG. 16 as those of the system configuration shown in FIG. 15 are represented by the same numerals, and their explanations are omitted. In FIG. 16, the numeral 1601 represents a main storage apparatus for storing processing programs and data at the time of execution, the numeral 1602 represents an external storage apparatus for storing programs and data, the numeral 1603 represents a CPU for transferring programs stored in the external storage apparatus 1602 to the main storage apparatus 1601 and for executing them, the numeral 1604 represents a modem capable of being connected to an external network, and the numeral 1605 represents a control apparatus for controlling a device by the control means 1507.

Figure 17:
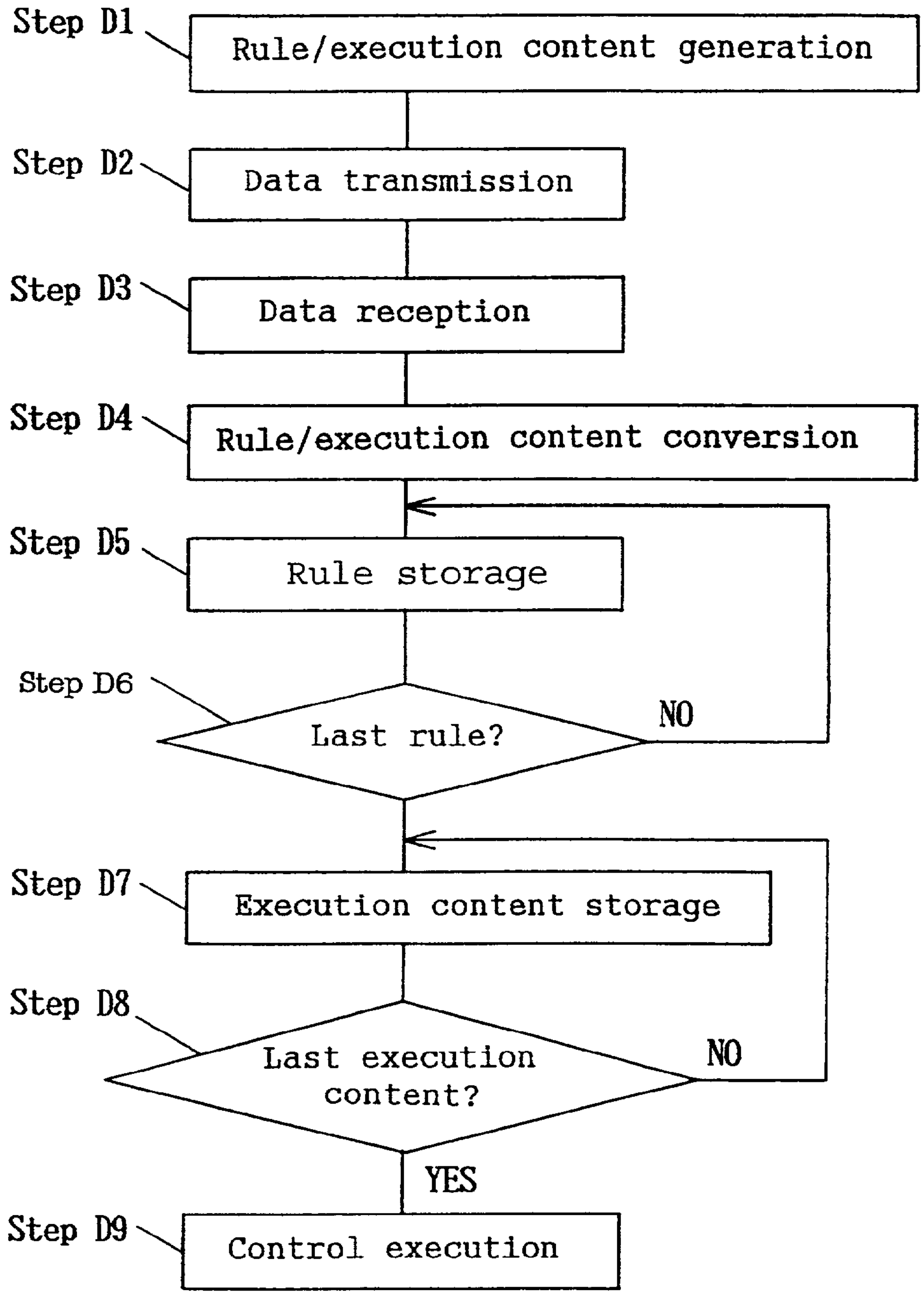
FIG. 17 is a flowchart explaining the operation of the rule communication apparatus in accordance with Embodiment 4.

The operation of the rule communication apparatus configured as described above will be explained in accordance with the flowchart of FIG. 17, and an embodiment of the rule communication method of the present invention will also be described.

(Step D1)

At the rule generation means 1501 and the execution content generation means 1502, rules and execution contents are edited respectively on the transmitter side. For example, it is assumed that the rules and their execution contents shown in FIG. 18 have been created and edited as rules for controlling cooking apparatuses. FIG. 18 shows a rule 1801 relating to a cooking method for "fried potato" and an execution content 1802 for the cooking method.

(Step D2)

At the data transmission means 1503, the rules generated by the rule generation means 1501 and the execution contents generated by the execution content generation means 1502 are reedited so as to have formats interpretable on the receiving side and transmitted.

(Step D3)

At the data receiving means 1504, the contents transmitted at (Step D2) are received on the data receiving side.

(Step D4)

At the rule/execution content conversion means 1505, the contents received at (Step D3) are converted into rules and execution contents. At this step, conversion is carried out into the rules and execution contents of FIG. 18 created on the transmission side.

(Step D5)

One rule is selected from among the rules converted at (Step D4), input to the rule storage means 1506, and stored therein.

(Step D6)

In the case when the rule to be stored is not the last rule, the sequence returns to (Step D5). In other cases, the sequence advances to the next step.

(Step D7)

One execution content is selected from among the execution contents converted at (Step D4), input to the execution content storage means 1507, and stored therein.

(Step D8)

In the case when the execution content to be stored is not the last execution content, the sequence returns to (Step D7). In other cases, the sequence advances to the next step.

(Step D9)

In the case when the control means 1508 controls a device, it controls the device referring to the rule (in FIG. 18, the numeral 1801 is assigned) and the execution content (in FIG. 18, the numeral 1802 is assigned) stored in the rule storage means 1506 and the execution content storage means 1507, respectively. As a result, it is possible to control a cooking device depending on an object to be cooked. Furthermore, in the case when the transmitter of device control information designates the procedure for the same cooking method (normal_heatup) as "fried potato" on and after next time, "normal-heatup" should only be designated as a rule, since the actual execution operation content for "normal_heatup" has already been stored in the execution content storage means on the receiving side.

As a result of operating the above-mentioned algorithm, device control can be changed depending on a food or an object to be cooked. Furthermore, control contents to be changed can be set on the transmitter side at a remote location. Therefore, it is possible to change device control contents depending on the object without going to the site wherein the controlled apparatus is located. Furthermore, with respect to complicated control operation, the control contents transmitted before can be used; therefore, it is not necessary to retransmit the same control contents, whereby it is possible to reduce the cost for data transmission and reception.

In the present embodiment, the data transmission means and the data receiving means are used to carry out data transmission and reception; however, these means may be changed to a DTMF transmission means and a DTMF receiving means, and information transmission and reception may be carried out by using DTMF signals.

(Embodiment 5)

Figure 19:
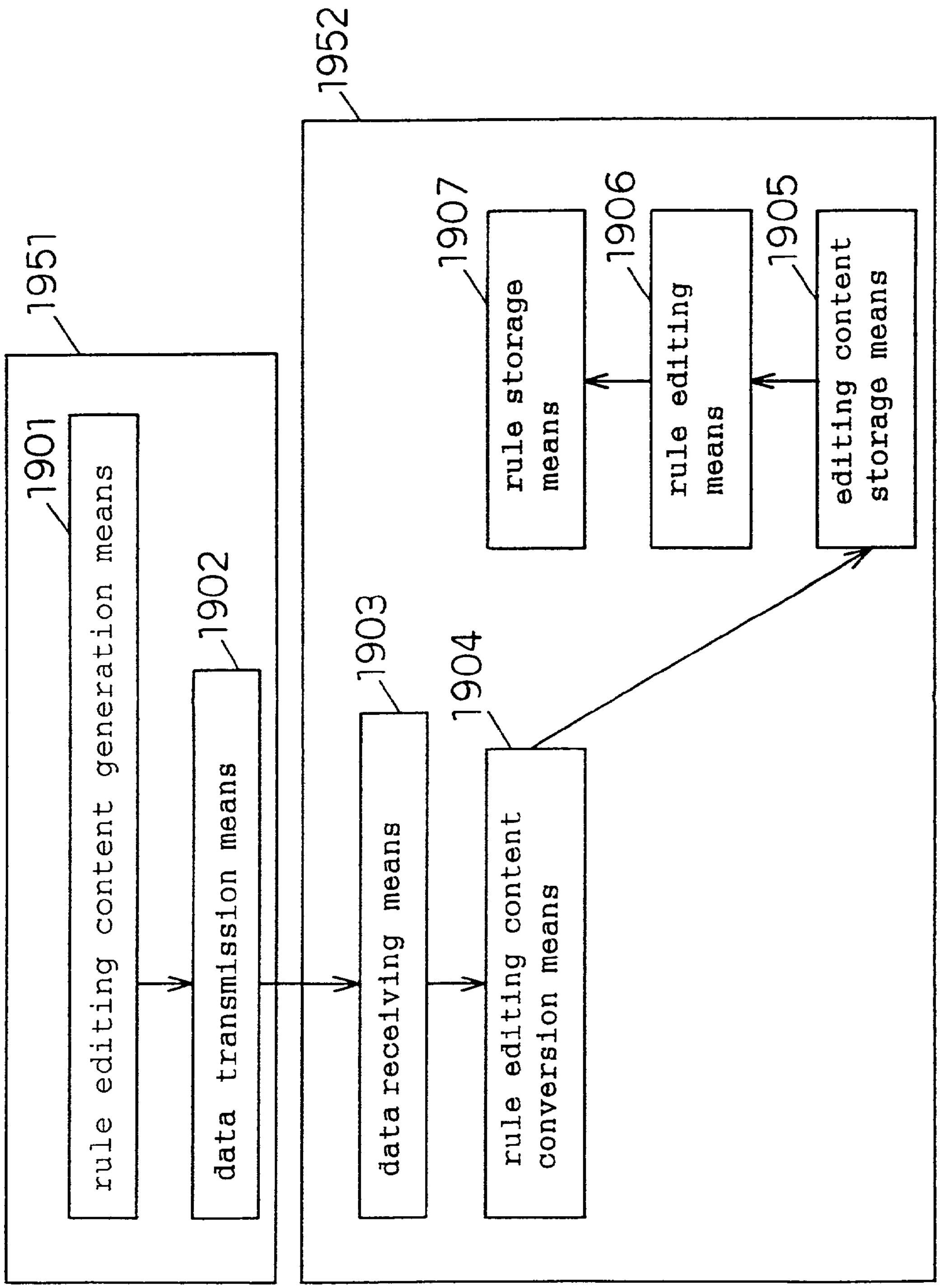
FIG. 19 is a block diagram showing the system configuration of a rule communication apparatus in accordance with Embodiment 5.

FIG. 19 is a system configuration diagram of a rule communication apparatus of an embodiment in accordance with the present invention; and the present embodiment will be described by using the figure. In FIG. 19, the numeral 1901 represents a rule editing content generation means for generating rule editing contents, and the numeral 1902 represents a data transmission means for converting the rule editing contents generated by the rule editing content generation means 1901 into data and for transmitting the data. These are used to form a transmission apparatus 1951. Furthermore, the numeral 1903 represents a data receiving means for receiving data transmitted by the data transmission means 1902, the numeral 1904 represents a rule editing content conversion means for converting the data received by the data receiving means 1903 into rule editing contents, the numeral 1905 represents a rule editing content storage means for storing the rule editing contents converted by the rule editing content conversion means 1904, the numeral 1907 represents a rule storage means for storing rules, and the numeral 1906 represents a rule editing means for editing the rules stored in the rule storage means 1907 on the basis of the rule editing contents stored in the rule editing content storage means 1905. These are used to form a receiving apparatus 1952.

The present embodiment is an example of renewing cooking methods stored in the rule storage means described in the above-mentioned Embodiment 1.

Figure 20:
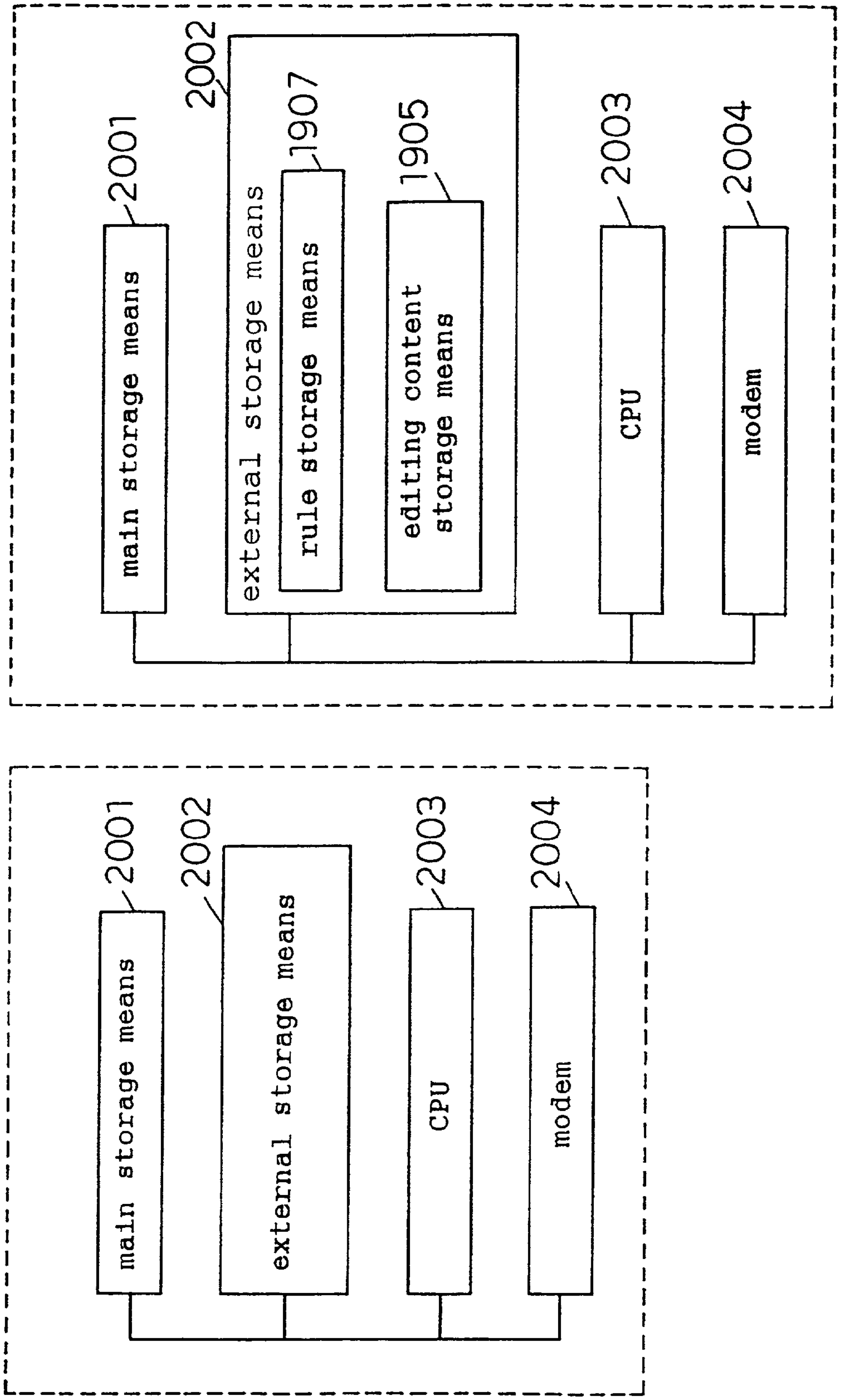
FIG. 20 is a block diagram showing the hardware configuration of the rule communication apparatus in accordance with Embodiment 5.

FIG. 20 shows a hardware configuration wherein the system configured as described above is operated. FIG. 20 is basically the same configuration as that of a general-purpose computer system for carrying out communication, and comprising the editing content storage means 1905 and the rule storage means 1907 described as the components of the system shown in FIG. 19. The same components in the configuration shown in FIG. 20 as those of the system configuration shown in FIG. 19 are represented by the same numerals, and their explanations are omitted. In FIG. 20, the numeral 2001 represents a main storage apparatus for storing processing programs and data at the time of execution, the numeral 2002 represents an external storage apparatus for storing programs and data, the numeral 2003 represents a CPU for transferring programs stored in the external storage apparatus 2002 to the main storage apparatus 2001 and for executing them, and the numeral 2004 represents a modem capable of being connected to an external network.

Figure 21:
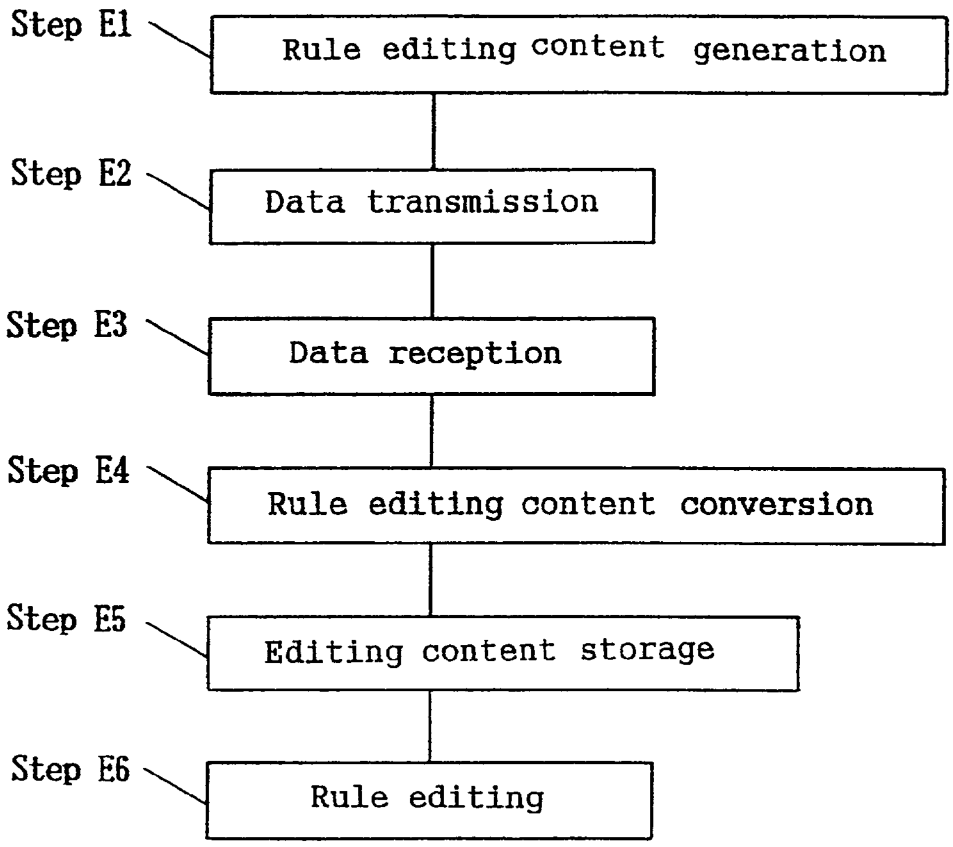
FIG. 21 is a flowchart explaining the operation of the rule communication apparatus in accordance with Embodiment 5.

The operation of the rule communication apparatus configured as described above will be explained in accordance with the flowchart of FIG. 21, and an embodiment of the rule communication method of the present invention will also be described.

(Step E1)

In the rule editing content generation means 1901, the rule editing contents are edited on the transmitter side. For example, it is assumed that the rules shown in FIG. 22 have been created as rule editing contents for controlling a cooking apparatus. The contents shown in FIG. 22 are intended to change a conventional cooking method at the intensity of 30 sec 500 W to a cooking method wherein the cooking time is shortened by 5 sec, that is, 25 sec 500 W, and steaming is included additionally.

(Step E2)

At the data transmission means 1902, the rules created by the rule editing content generation means 1901 are reedited so as to have a format interpretable on the data receiving side and transmitted.

(Step E3)

At the data receiving means 1903, the contents transmitted at (Step E2) are received on the data receiving side.

(Step E4)

At the rule editing content conversion means 1904, the contents received at (Step E3) are converted into rules. At this step, conversion is carried out into the contents of FIG. 22 generated by the rule editing content generation means 1901 on the transmission side.

(Step E5)

The rule editing contents converted at (Step E4) are input to the editing content storage means 1905 and stored therein.

(Step E6)

The contents of the rules for controlling devices, stored in the rule storage means 1907, are corrected on the basis of the contents of the editing content storage means 1905. For example, in the case when the control rules for the cooking methods of the contents shown in FIG. 4 have been stored in the rule storage means 1907, they are changed to the control rules for the cooking methods shown in FIG. 23 depending on the editing contents shown in FIG. 22.

As a result of operating the above-mentioned algorithm, device control can be changed depending on a food or an object to be cooked. Furthermore, control contents to be changed can be set on the transmitter side at a remote location. Therefore, it is possible to change device control contents depending on the object without going to the site wherein the controlled apparatus-is located. Furthermore, only the change portions of the rules stored in the device on the receiving side can be corrected on the transmission side. Therefore, even when wrong control contents are transmitted, they can be corrected easily on the transmission side.

In the present embodiment, the data transmission means and the data receiving means are used to carry out data transmission and reception; however, these means may be changed to a DTMF transmission means and a DTMF receiving means, and information transmission and reception may be carried out by using DTMF signals.

Furthermore, in the present embodiment, cooking devices, such as microwave ovens and ovens, are described; however, any kinds of control devices may be used, provided that they are control devices having different control contents depending on other cooking devices such as a rice cocker, air-conditioning devices for cooling and heating, devices such as a washing machine and a vacuum cleaner, and devices such as a television image quality adjuster.

Furthermore, in the present embodiment, the apparatus for receiving information is described as a device connected to a network via a modem or the like; however, it may be possible to transmit rule-format information by using media such as broadcasting and to receive the rule-format information by using a tuner.

Furthermore, in the present embodiment, transmission and reception of rules to be changed depending on food materials are described; however, it may be possible to use transmission and reception of rules for changing cooking contents depending on time and season.

Furthermore, in the present embodiment, a modem connected to a telephone line is described as a device for transmitting and receiving data; however, a leased line for the Internet or a LAN line may also be used.

(Embodiment 6)

First, the summary of the present embodiment will be described.

Conventionally, a system has been developed to concentratedly control information such as usage conditions and the like of control devices used abundantly by using a server installed at a remote location.

For example, a system is available that automatically transmits information on the number of usage times of a commercial-use microwave oven installed at the above-mentioned convenience store or family restraint to a server via a network. By using this, the usage conditions of each device can be concentratedly controlled by the server. In these systems, in the above-mentioned commercial-use microwave oven, a rule, wherein the number of usage times is notified every day or each time of its usage to the server, has been programmed beforehand, and information is transmitted to the server depending on the rule. However, since this rule is stored in a non-writable portion, such as a ROM, of the commercial-use microwave oven, a rule having been determined once cannot be renewed. In addition, when its installation position is changed, the ROM or the like must be replaced to change the rule.

In the case of the present embodiment, rules are transmitted via a network, and the cases wherein the rules can be renewed or changed depending on the usage conditions of each controlled device are described. Therefore, it is possible to set rules in consideration of the usage conditions of each controlled device. As this kind of controlled device, a copier installed at the above-mentioned convenience store or family restaurant may be used, for example.

Next, the present embodiment will be described more specifically. In other words, FIG. 24 is a system configuration diagram of a rule communication apparatus of an embodiment in accordance with the present invention; and the present embodiment will be described by using the figure.

Figure 24:
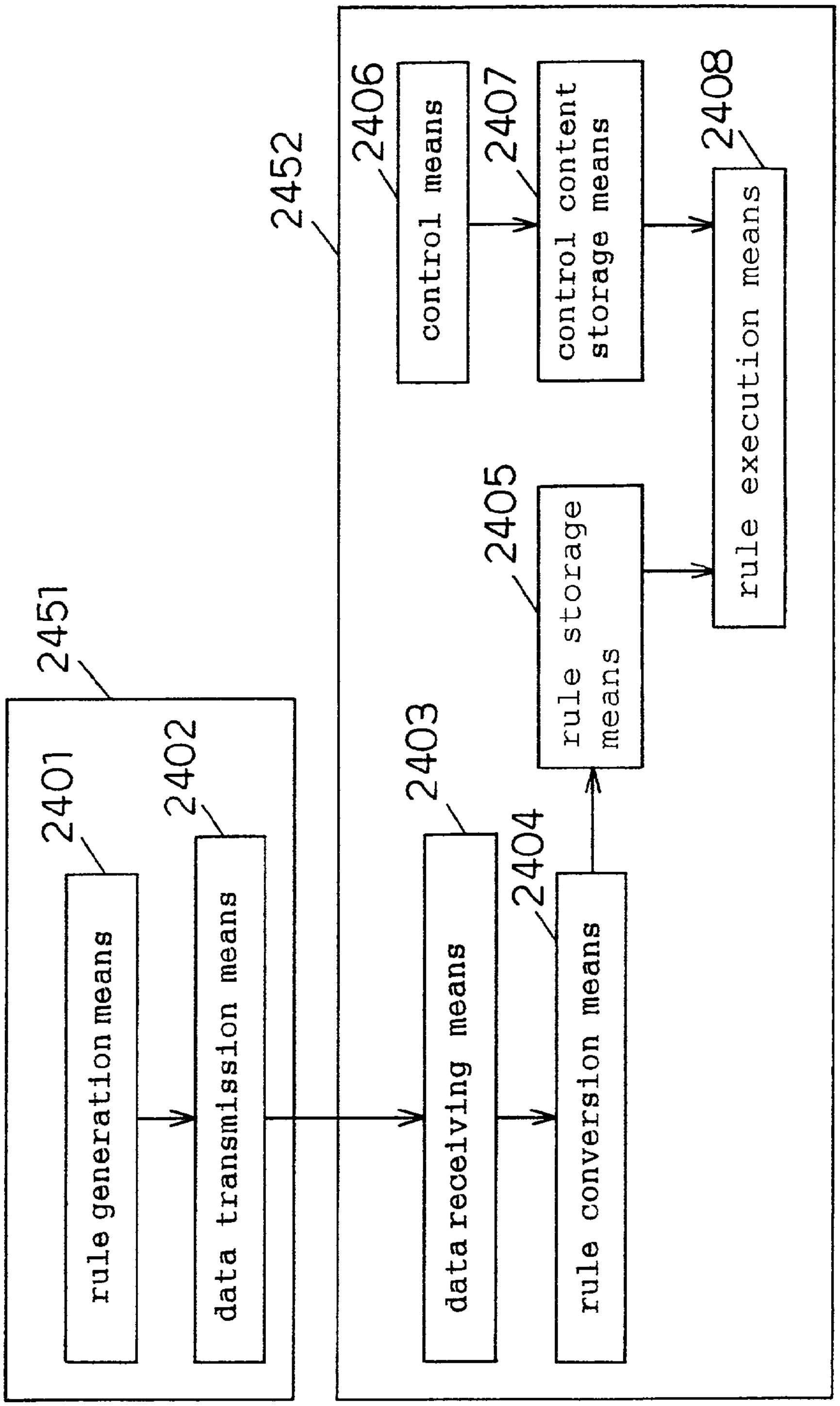
FIG. 24 is a block diagram showing the system configuration of a rule communication apparatus in accordance with Embodiment 6.

In FIG. 24, the numeral 2401 represents a rule generation means for generating rules, and the numeral 2402 represents a data transmission means for converting the rules generated by the rule generation means 2401 into data and for transmitting the data. These are used to form a transmission apparatus 2451. Furthermore, the numeral 2403 represents a data receiving means for receiving data transmitted by the data transmission means 2402, the numeral 2404 represents a rule conversion means for converting the data received by the data receiving means 2403 into rules, the numeral 2405 represents a rule storage means for storing the rules converted by the rule conversion means 2404, and the numeral 2406 represents a control means for controlling a device, the numeral 2407 represents a control content storage means for storing the contents controlled by the control means 2406, and the numeral 2408 represents a rule execution means for executing the rules depend on the rules stored in the rule storage means 2405 and the control contents stored in the control content storage means 2407. These are used to form a receiving apparatus 2452.

Figure 25:
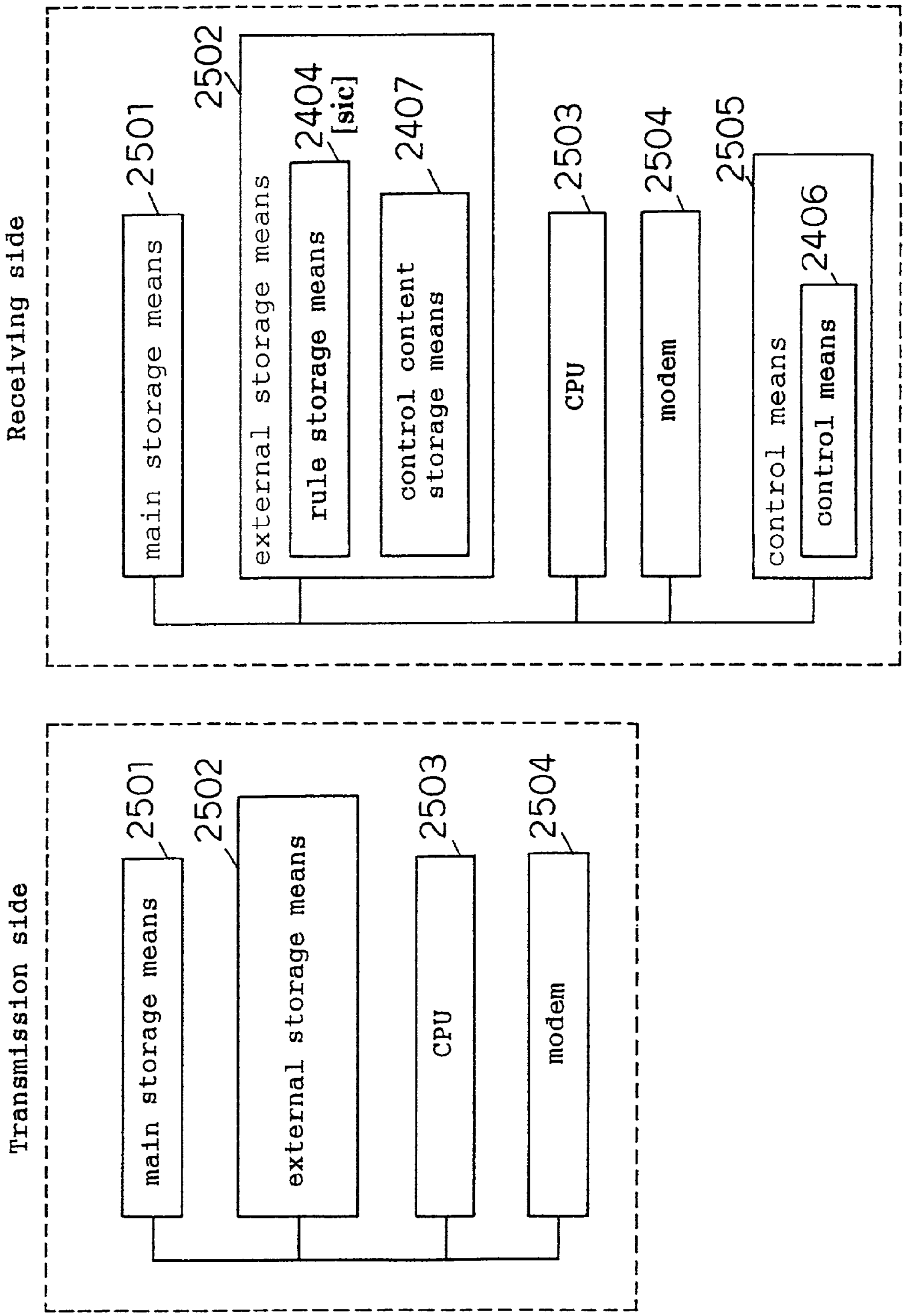
FIG. 25 is a block diagram showing the hardware configuration of the rule communication apparatus in accordance with Embodiment 6.

FIG. 25 shows a hardware configuration wherein the system configured as described above is operated. FIG. 25 is basically the same configuration as that of a general-purpose computer system for carrying out communication, and comprising the rule storage means 2405, the control means 2406 and the control content storage means 2407 described as the components of the system shown in FIG. 24. The same components in the configuration shown in FIG. 25 as those of the system configuration shown in FIG. 24 are represented by the same numerals, and their explanations are omitted. In FIG. 25, the numeral 2501 represents a main storage apparatus for storing processing programs and data at the time of execution, the numeral 2502 represents an external storage apparatus for storing programs and data, the numeral 2503 represents a CPU for transferring programs stored in the external storage apparatus 2502 to the main storage apparatus 2501 and for executing them, the numeral 2504 represents a modem capable of being connected to an external network, and the numeral 2505 represents a control apparatus for controlling a device by the control means 2406.

Figure 26:
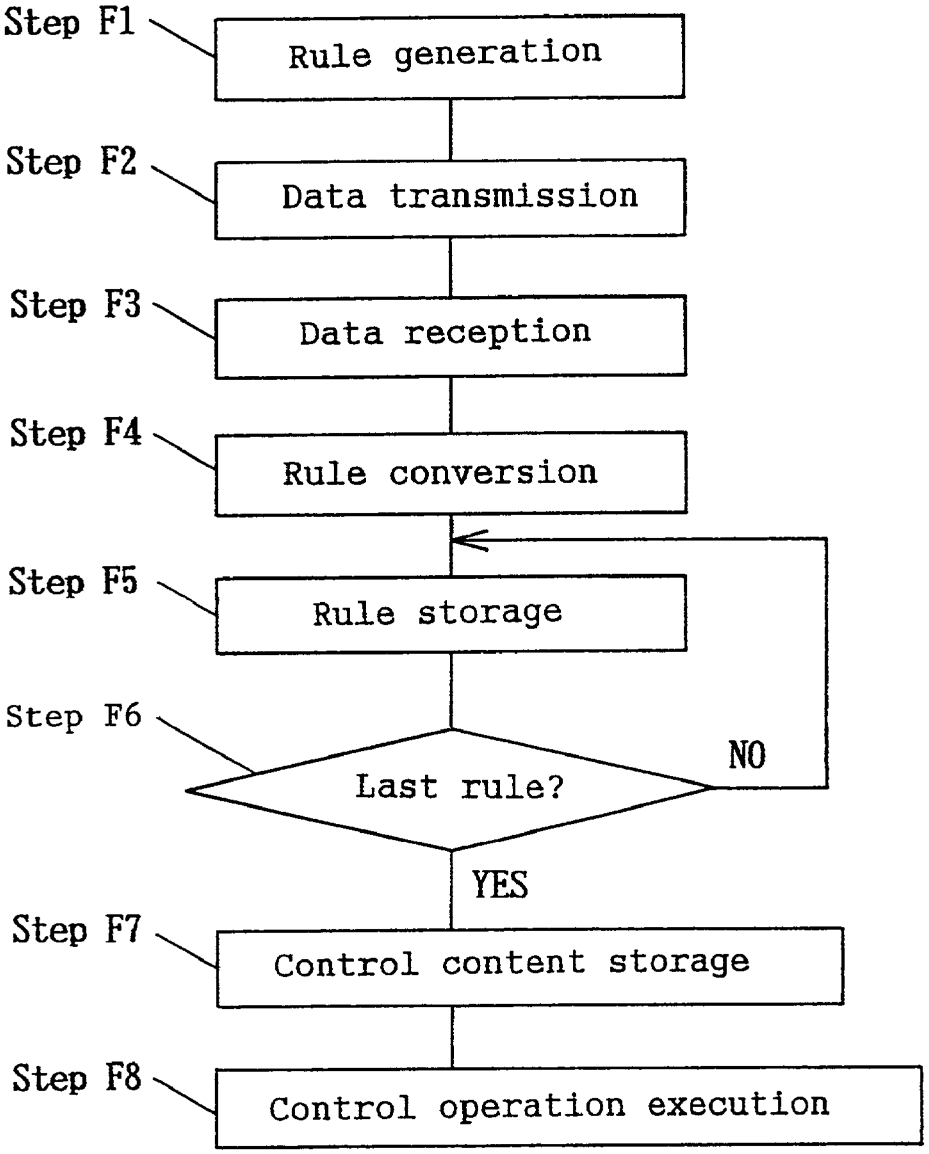
FIG. 26 is a flowchart explaining the operation of the rule communication apparatus in accordance with Embodiment 6.

The operation of the rule communication apparatus configured as described above will be explained in accordance with the flowchart of FIG. 26, and an embodiment of the rule communication method of the present invention will also be described.

(Step F1)

At the rule generation means 2401, rules are edited on the transmitter side. For example, it is assumed that the rules shown in FIG. 27 have been created as rules for monitoring control contents. In the case when the number of usage times of a control device is more than 100, the rule shown in FIG. 27 is a rule for transmitting the information from the control device to the data transmission side via a network.

(Step F2)

At the data transmission means 2402, the rules created by the rule generation means 2401 are reedited so as to have a format interpretable on the data receiving side and transmitted.

(Step F3)

At the data receiving means 2403, the contents transmitted at (Step F2) are received on the data receiving side.

(Step F4)

At the rule conversion means 2404, the contents received at (Step F3) are converted into rules. At this step, conversion is carried out into the rule shown in FIG. 27 generated by the rule generation means 2401 on the transmission side.

(Step F5)

One rule is selected from among the rules converted at (Step F4), and input to the rule storage means 2405 and stored therein.

(Step F6)

In the case when the rule to be stored is not the last rule, the sequence returns to (Step F5). In other cases, the sequence advances to the next step.

(Step F7)

The contents controlled by the control means 2406 are stored in the control content storage means 2407 For example, the number of times the control device is used is stored in the control content storage means, and the number of usage times is renewed each time the control device is used.

(Step F8)

The contents of the rule storage means 2405 are compared with the contents of the control content storage means 2407, and if a rule compatible with the rule storage means 2405 is present, the rule is executed. If there is no applicable rule, the sequence returns to (Step F7). In the present embodiment, since the rule shown in FIG. 27 is stored in the rule storage means, in the case when the number of usage times of the device, stored in the control content storage means 2407, is more than 100, this information is notified from the control device side to the data transmission side via a network.

Even if the control device has been set beforehand at the time of the shipment of the control device so that when the number of usage times is more than 200, this information is notified from the control device side to the data transmission side, it is possible to appropriately change the rule so that the information indicating that the number of usage times is 100 is notified to the data transmission side by transmitting the rule shown in FIG. 27. Furthermore, the setting of the number of usage times can be made different in the same way depending on each installation position.

As the result of the operation of the above-mentioned algorithm, the usage contents of the control device can be monitored at a remote location without going to the location wherein the control device is installed. This is particularly effective for the notification of a failure or the like of the control device.

In the present embodiment, the data transmission means and the data receiving means are used to carry out data transmission and reception; however, these means may be changed to a DTMF transmission means and a DTMF receiving means, and information transmission and reception may be carried out by using DTMF signals.

Furthermore, in the present embodiment, the number of usage times of the control device is described; however, information on abnormal areas and defective portions may be used.

Furthermore, in the present embodiment, the apparatus for receiving information is described as a device connected to a network via a modem or the like; however, it may be possible to transmit rule-format information by using media such as broadcasting and to receive the rule-format information by using a tuner.

Furthermore, in the present embodiment, a modem connected to a telephone line is described as a device for transmitting and receiving data; however, a leased line for such as the Internet or a LAN line may also be used.

The control devices in accordance with the present embodiment may be cooking devices, such as commercial-use microwave ovens or the like used in a convenience store or a family restaurant. Since these commercial-use microwave ovens are used frequently, they are required to be maintained depending on the usage times of each device. However, the usage frequency of the microwave oven differs from one store to another. Therefore, a rule, wherein when the number of usage times of the microwave oven at each store is more than a preset number of times, this information is notified from each store to the server, is sent to each store via a network. By doing this, the time when the microwave oven must be maintained depending on each store can be controlled on the server side. Herein, with respect to the rule, the number of setting times can be changed depending on each store; and in such a case, at each store, in transmitted plural rules, an identifier (an IF statement, for example) capable of distinguishing the setting value of the store itself has been written.

(Embodiment 7)

Figure 28:
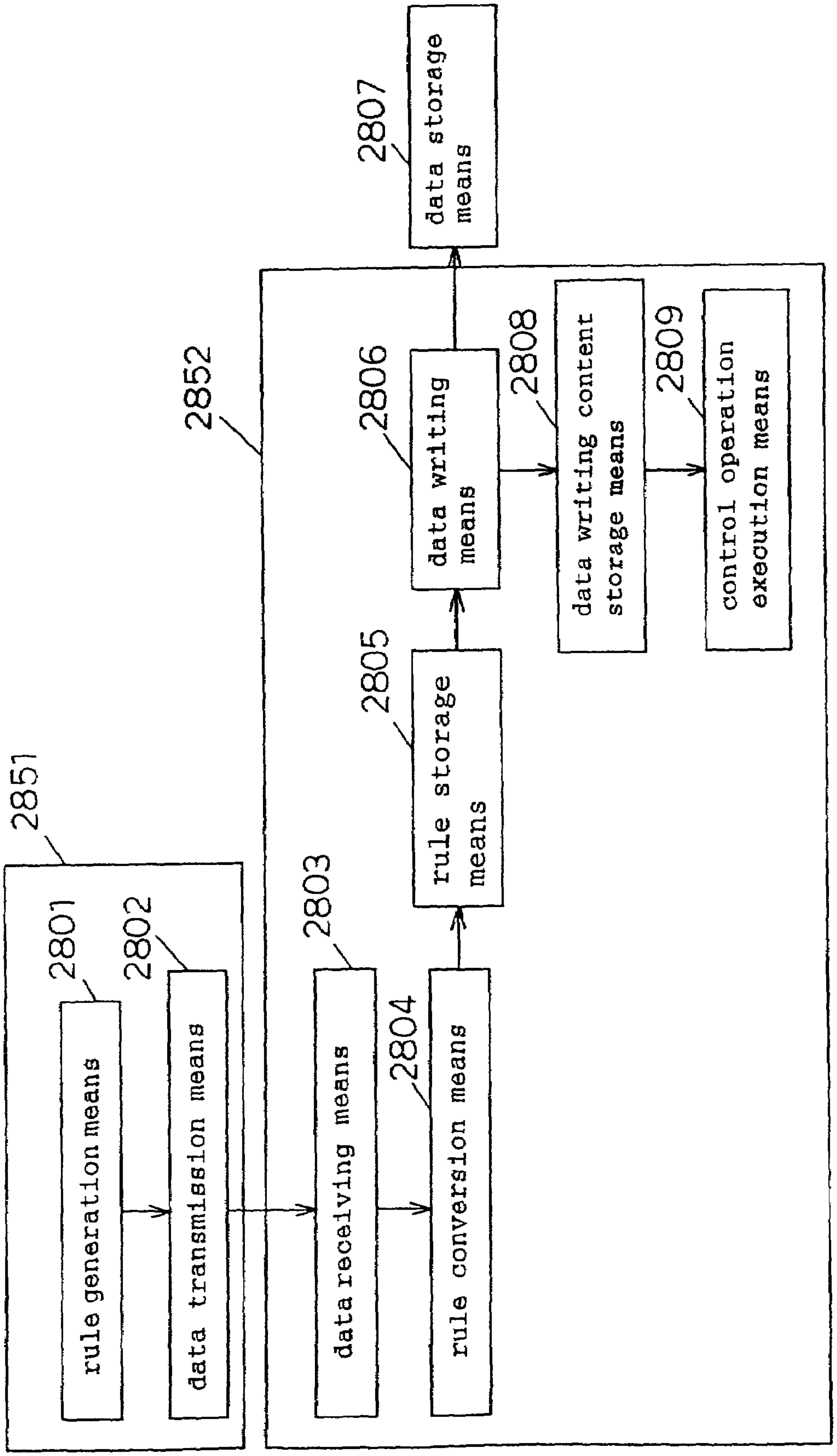
FIG. 28 is a block diagram showing the system configuration of a rule communication apparatus in accordance with Embodiment 7.

FIG. 28 is a system configuration diagram of a rule communication apparatus of an embodiment in accordance with the present invention; and the present embodiment will be described by using the figure.

In FIG. 28, the numeral 2801 represents a rule generation means for generating rules, and the numeral 2802 represents a data transmission means for converting the rules generated by the rule generation means 2801 into data and for transmitting the data. These are used to form a transmission apparatus 2851. Furthermore, the numeral 2803 represents a data receiving means for receiving data transmitted by the data transmission means 2802, the numeral 2804 represents a rule conversion means for converting the data received by the data receiving means 2803 into rules, the numeral 2805 represents a rule storage means for storing the rules converted by the rule conversion means 2804, the numeral 2807 represents a data storage means for storing data, the numeral 2806 represents a data writing means for writing data in the data storage means 2807 on the basis of the rules stored in the rule storage means 2805, the numeral 2808 is a data writing content storage means for storing data writing contents executed by the data writing means, and the numeral 2809 represents a control operation execution means for executing control operation depending on the contents stored in the data writing content storage means 2808. These are used to form a receiving apparatus 2852.

Figure 29:
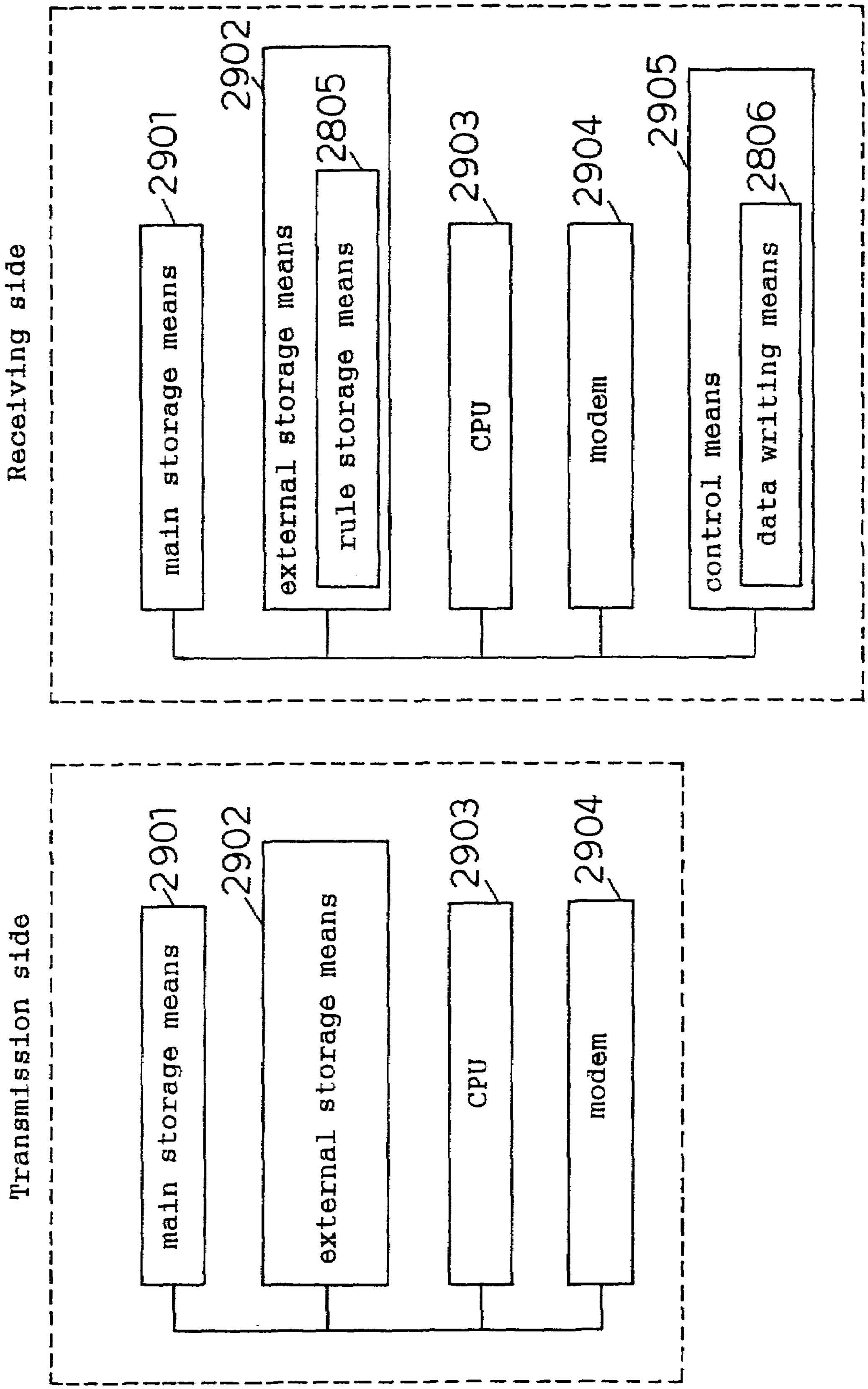
FIG. 29 is a block diagram showing the hardware configuration of the rule communication apparatus in accordance with Embodiment 7.
Figure 30:
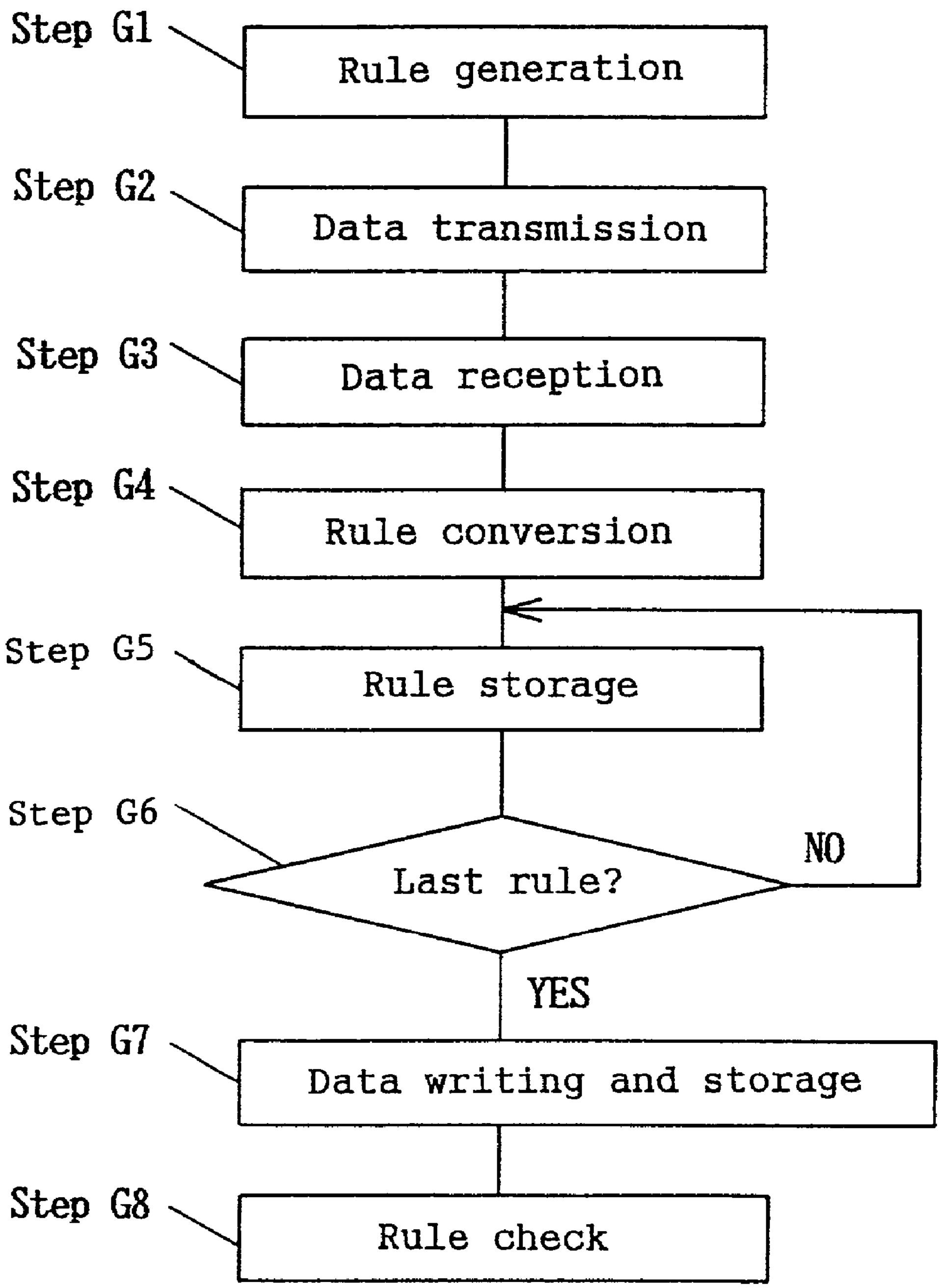
FIG. 30 is a flowchart explaining the operation of the rule communication apparatus in accordance with Embodiment 7.

FIG. 29 shows a hardware configuration wherein the system configured as described above is operated. FIG. 29 is basically the same configuration as that of a general-purpose computer system for carrying out communication, and comprising the rule storage means 2805, the data writing means 2806 and the data writing content storage means 2808 described as the components of the system shown in FIG. 28. The same components in the configuration shown in FIG. 29 as those of the system configuration shown in FIG. 28 are represented by the same numerals, and their explanations are omitted. In FIG. 29, the numeral 2901 represents a main storage apparatus for storing processing programs and data at the time of execution, the numeral 2902 represents an external storage apparatus for storing programs and data, the numeral 2903 represents a CPU for transferring programs stored in the external storage apparatus 2902 to the main storage apparatus 2901 and for executing them, the numeral 2904 represents a modem capable of being connected to an external network, and the numeral 2905 represents a control apparatus for controlling data writing by the data writing means 2806. The operation of the rule communication apparatus configured as described above will be explained in accordance with the flowchart of FIG. 30.

Since the processes from (Step G1) to (Step G6) are similar to those from (Step C1) to (Step C6), their explanations are omitted.

(Step G7)

In the case when an IC card for device control is inserted data is written on the basis of the rules stored in the rule storage means. For example, in the case when a TYPE1 card is inserted as an IC card for device control, data is written on the basis of the first rule shown in FIG. 14. At this time, with respect to the TYPE1 card, data writing is stored in the data writing content storage means 2808.

(Step G8)

After all rules stored in the rule storage means 2805 are executed, the contents of the data writing content storage means are checked; when data writing for all the contents is not completed, the following control operation is carried out at the control operation execution means. For example, this is a control operation for urging the user to check in the case when a display is provided and there is a recording medium on which writing is not carried out (see FIG. 31). In addition, the fact that data is not written is notified to the data transmitter side Furthermore, if data writing ended in failure by ejecting the IC card during data writing or the like, the contents regarding the failure are notified to the user.

As the result of operating the above-mentioned algorithm, in the case when a device is controlled by using an external storage medium, such as an IC card, it is possible to describe the contents of data to be written depending on the type of the card; therefore, even a user, who must control the device by using the external storage medium, such as the IC card, can make the present apparatus automatically identify the type of the card and write data, without concern for the type of the card. Furthermore, a check can be urged so that writing is carried out completely.

In the present embodiment, the data transmission means and the data receiving means are used to carry out data transmission and reception; however, these means may be changed to a DTMF transmission means and a DTMF receiving means, and information transmission and reception may be carried out by using DTMF signals.

Furthermore, in the present embodiment, the apparatus for receiving information is described as a device connected to a network via a modem or the like; however, it may be possible to transmit rule-format information by using media such as broadcasting and to receive the rule-format information by using a tuner.

Furthermore, in the present embodiment, transmission and reception of rules for changing processing contents depending on the type of IC card are described; however, it may be possible to use transmission and reception of rules for changing processing contents depending on time and season.

Furthermore, in the present embodiment, a modem connected to a telephone line is described as a device for transmitting and receiving data; however, a leased line for such as the Internet or a LAN line may also be used.

(Embodiment 8)

Figure 32:
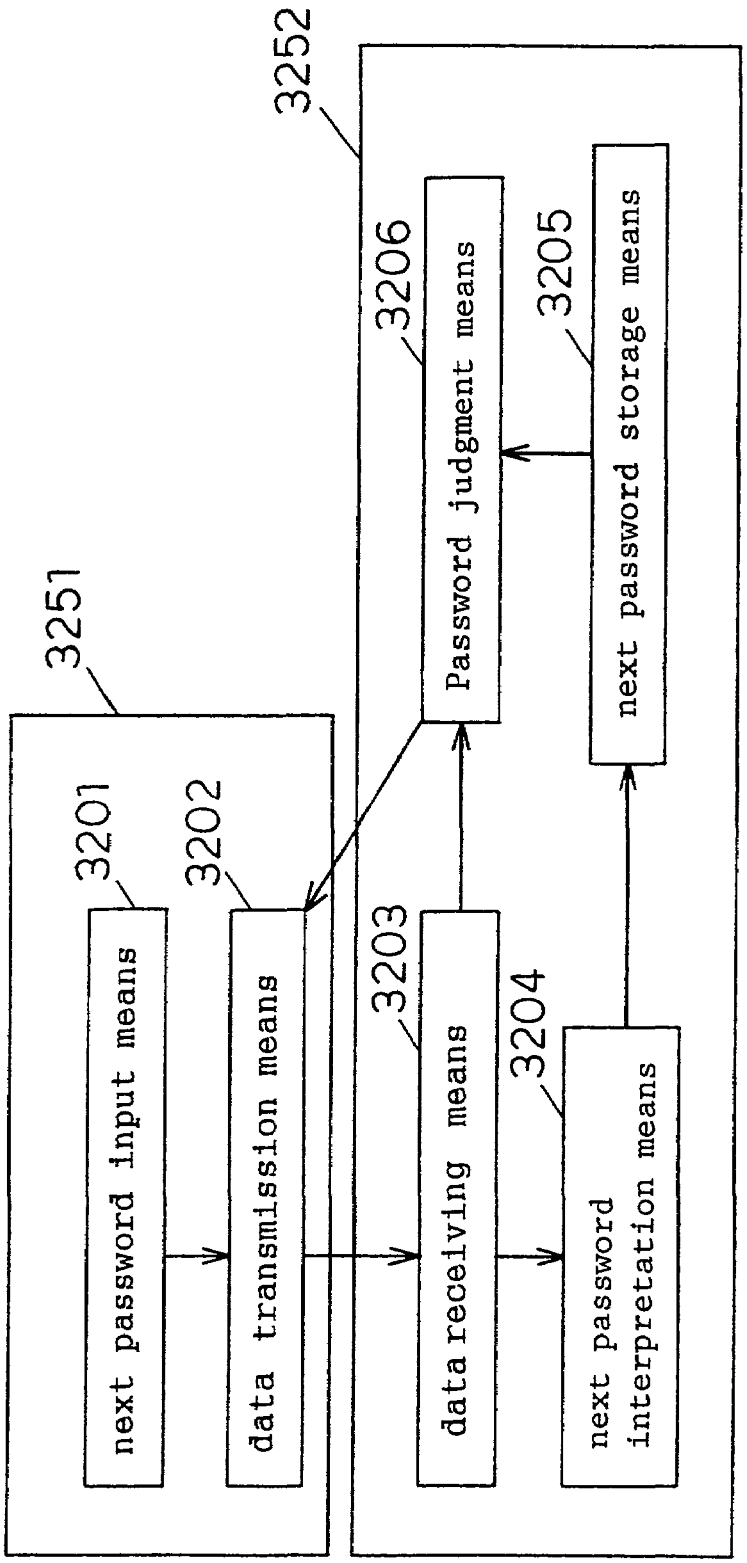
FIG. 32 is a block diagram showing the system configuration of a rule communication apparatus in accordance with Embodiment 8.

FIG. 32 is a system configuration diagram of a rule communication apparatus of an embodiment in accordance with the present invention; and the present embodiment will be described by using the figure.

First, the summary of the present embodiment is described.

As described with respect to the above-mentioned embodiment, by transmitting new control information from the transmission side to the receiving side, it is possible to change the control information for each control device previously provided on the receiving side. In other words, as described with respect to Embodiment 1 and Embodiment 5, at a convenience store or a family restaurant, for example, it is possible to transmit the control information of microwave ovens from the server to the terminal of each store, and to change it further. Therefore, if a protocol for connection to the microwave oven of each store is known, any third party other than the server can change the control information for each store without authorization. To prevent this, a new password planned to be used for the next connection is transmitted beforehand from the server to each store at the time of each connection. In other words, this password is used to carry out renewal or the like of the control information from the server to each store. With this, in the case when the new password transmitted beforehand is not transmitted, the terminal of each store judges that the transmission side requesting connection together with its attached password is an unauthorized third party other than the server, and refuses the connection request, whereby it is possible to prevent unauthorized change of control information.

Next, the configuration of the present embodiment will be described referring to FIG. 32.

In FIG. 32, the numeral 3201 represents a next password input means for inputting the next password, the numeral 3202 represents a data transmission means for converting the password input by the next password input means 3201 into data and for transmitting the data. These are used to form a transmission apparatus 3251. Furthermore, the numeral 3203 represents a data receiving means for receiving data transmitted by the data transmission means 3202, the numeral 3204 represents a next password interpretation means for interpreting the password received by the data receiving means 3203, and the numeral 3205 represents a next password storage means for storing the next password interpreted by the next password interpretation means 3204. These are used to form a receiving apparatus 3252. Furthermore, when a connection request is issued from the data transmission apparatus, a password judgment means 3206 judges as to whether the password attached to the connection request is proper or not on the basis of the password renewal planned information having been transmitted beforehand from the data transmission apparatus, and permits the connection depending on the result of the judgment.

Figure 33:
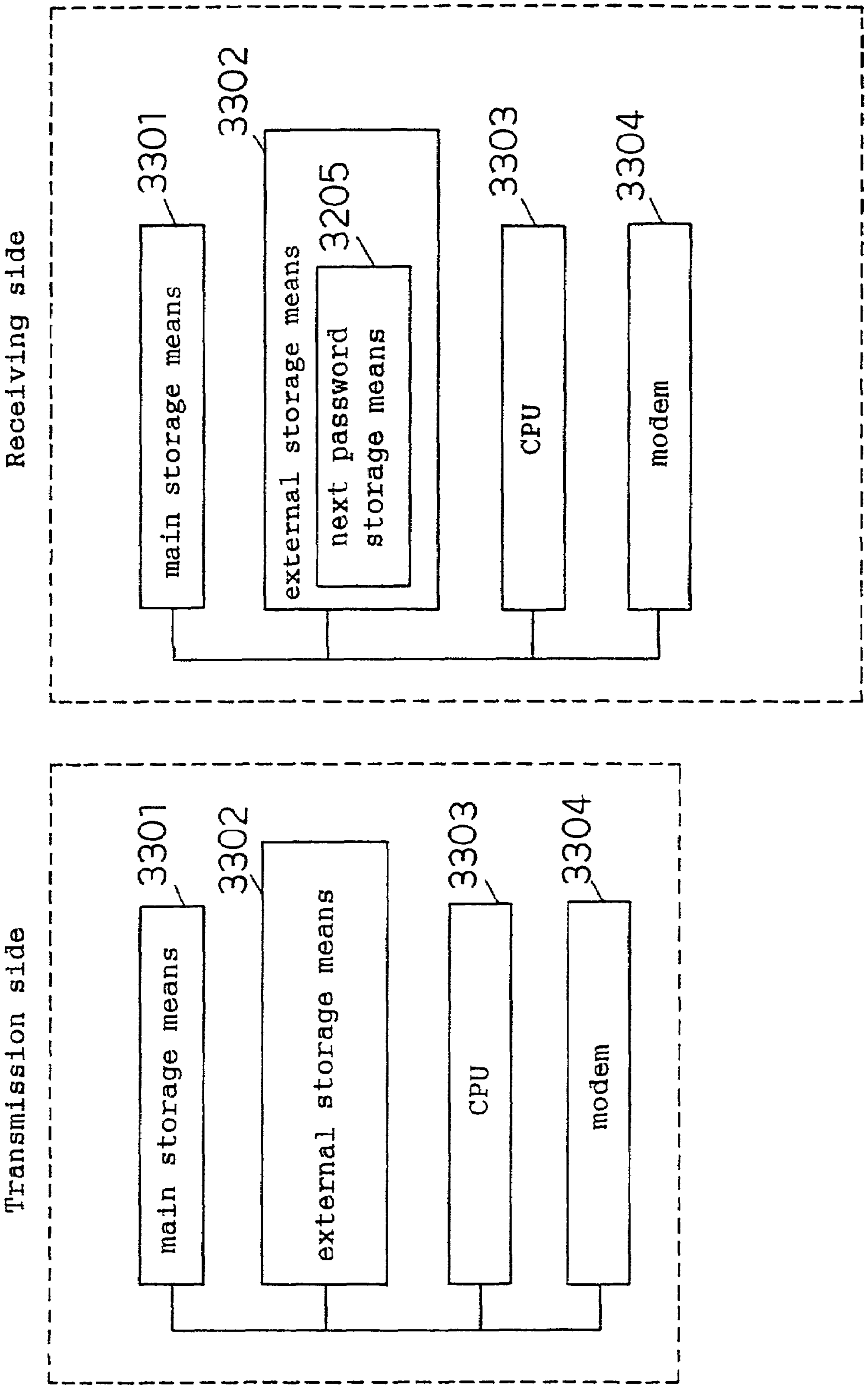
FIG. 33 is a block diagram showing the hardware configuration of the rule communication apparatus in accordance with Embodiment 8.

FIG. 33 shows a hardware configuration wherein the system configured as described above is operated. FIG. 33 is basically the same configuration as that of a general-purpose computer system for carrying out communication, and comprising the next password storage means 3205. The same components in the configuration shown in FIG. 33 as those of the system configuration shown in FIG. 32 are represented by the same numerals, and their explanations are omitted. In FIG. 33, the numeral 3301 represents a main storage apparatus for storing processing programs and data at the time of execution, the numeral 3302 represents an external storage apparatus for storing programs and data, the numeral 3303 represents a CPU for transferring programs stored in the external storage apparatus 3302 to the main storage apparatus 3301 and for executing them, the numeral 3304 represents a modem capable of being connected to an external network, and the numeral 3305 represents a control apparatus for controlling a device by the control means 3306.

Figure 34:
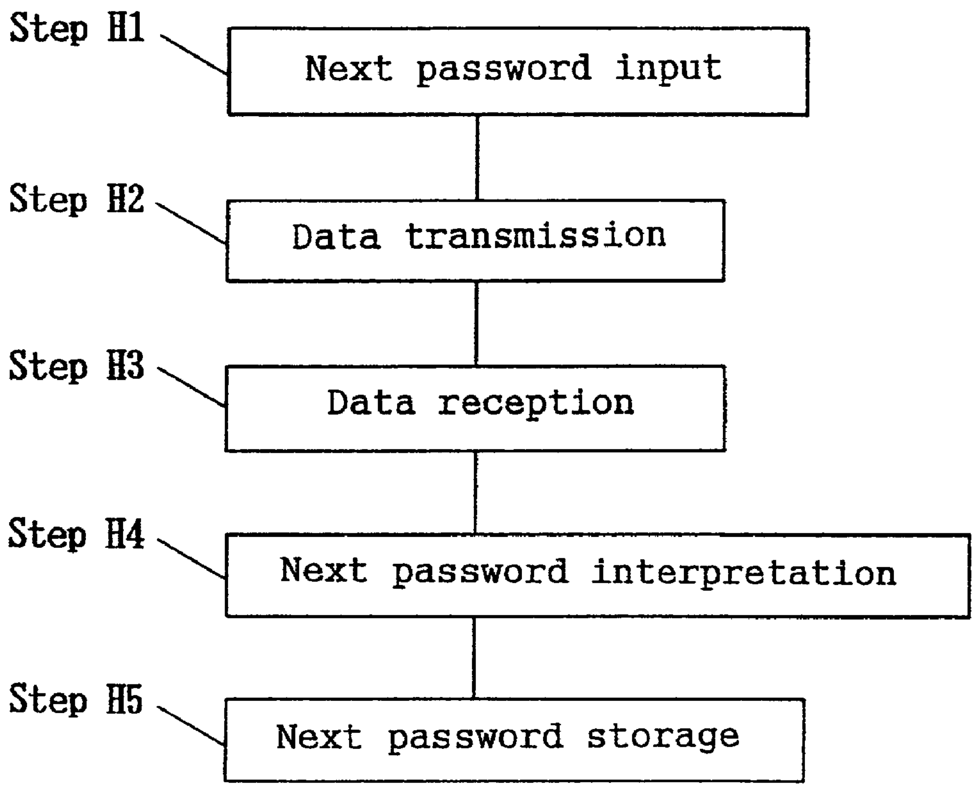
FIG. 34 is a flowchart explaining the operation of the rule communication apparatus in accordance with Embodiment 8.

The operation of the rule communication apparatus configured as described above will be explained in accordance with the flowchart of FIG. 34, and an embodiment of the rule communication method of the present invention will also be described.

(Step H1)

At the next password generation means 3201, the next password is edited in the rule format on the transmitter side. For example, as changed with time, the password for the next connection is set in the rule format as shown in FIG. 35.

(Step H2)

At the data transmission means 3202, the rules created by the next password input means 3201 are reedited to a format interpretable on the receiving side and transmitted.

(Step H3)

At the data receiving means 3203, the contents transmitted at (Step H2) are received on the data receiving side.

(Step H4)

At the next password interpretation means 3204, the contents received at (Step H3) are converted into rules. Herein, the contents are converted into the rules shown in FIG. 35 generated by the next password input means 3201 on the transmission side.

(Step H5)

The rules converted at (Step H4) are input to the next password storage means 3205 and stored.

For example, it is assumed that a connection request is issued next at time 9:00 from the transmission side to renew control information. Since the rules shown in FIG. 35 have been stored at each terminal at this time, in the case when the server has transmitted "ppqq" as a password, the terminal judges that the genuine server requests connection to renew control information, and then the terminal permits the connection.

More specifically, as shown in FIG. 32, the password judgment means 3206 obtains reception information from the data receiving means 3203, and compares it with the new password stored in the next password storage means 3205; in the case when it judges that the server has transmitted "ppqq" as a password, it issues permission for connection to the data transmission means 3202.

On the other hand, when a connection request is issued to a terminal, and in the case when the password "ppqq" is not transmitted, the password judgment means 3206 judges that the request is a connection request by a third party other than the genuine server, and refuses the connection. This can prevent unauthorized change of the control information. By having transmitting the password planned to be used next each time the server makes connection to each terminal, the password can be changed dynamically; even if a third party knows the password once, he cannot makes connection the next time and after, whereby the security of the control information can be ensured.

As the result of operating the above-mentioned algorithm, the password can be changed dynamically each time data is transmitted, whereby it is possible to easily achieve high security by using rules.

(Embodiment 9)

Figure 36:
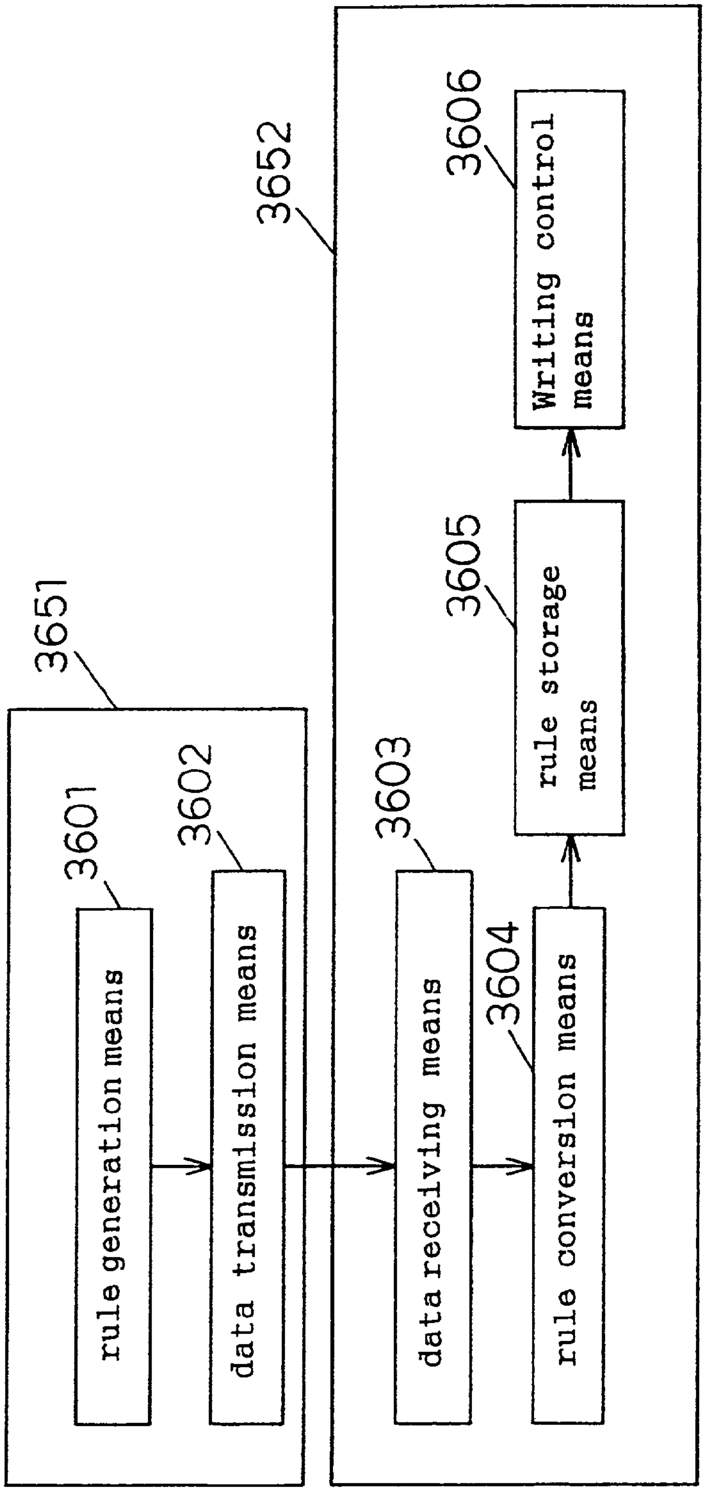
FIG. 36 is a block diagram showing the system configuration of a rule communication apparatus in accordance with Embodiment 9.

FIG. 36 is a system configuration diagram of a rule communication apparatus of an embodiment in accordance with the present invention; and the present embodiment will be described by using the figure.

In FIG. 36, the numeral 3601 represents a rule generation means for generating rules, and the numeral 3602 represents a data transmission means for converting the rules generated by the rule generation means 3601 into data and for transmitting the data. These are used to form a transmission apparatus 3651. It is assumed that these rules have been described in the IF THEN format. Furthermore, the numeral 3603 represents a data receiving means for receiving data transmitted by the data transmission means 3602, the numeral 3604 represents a rule conversion means for converting the data received by the data receiving means 3603 into rules, the numeral 3605 represents a rule storage means for storing the rules converted by the rule conversion means 3604, and the numeral 3606 represents a writing means which, on the basis of the front portion of a rule stored in the rule storage means 3605, controls and executes the writing of data of the latter portion of the rule for the storage medium (not shown) of the corresponding controlled apparatus. These are used to form a receiving apparatus 3652. Herein, as shown in FIG. 39, the front portion is a condition information portion 3901 described in the rule by using an IF statement, and the latter portion is a control information portion 3902 described in the rule after THEN. In addition, the rule selection means of the present invention corresponds to a writing control means.

Figure 37:
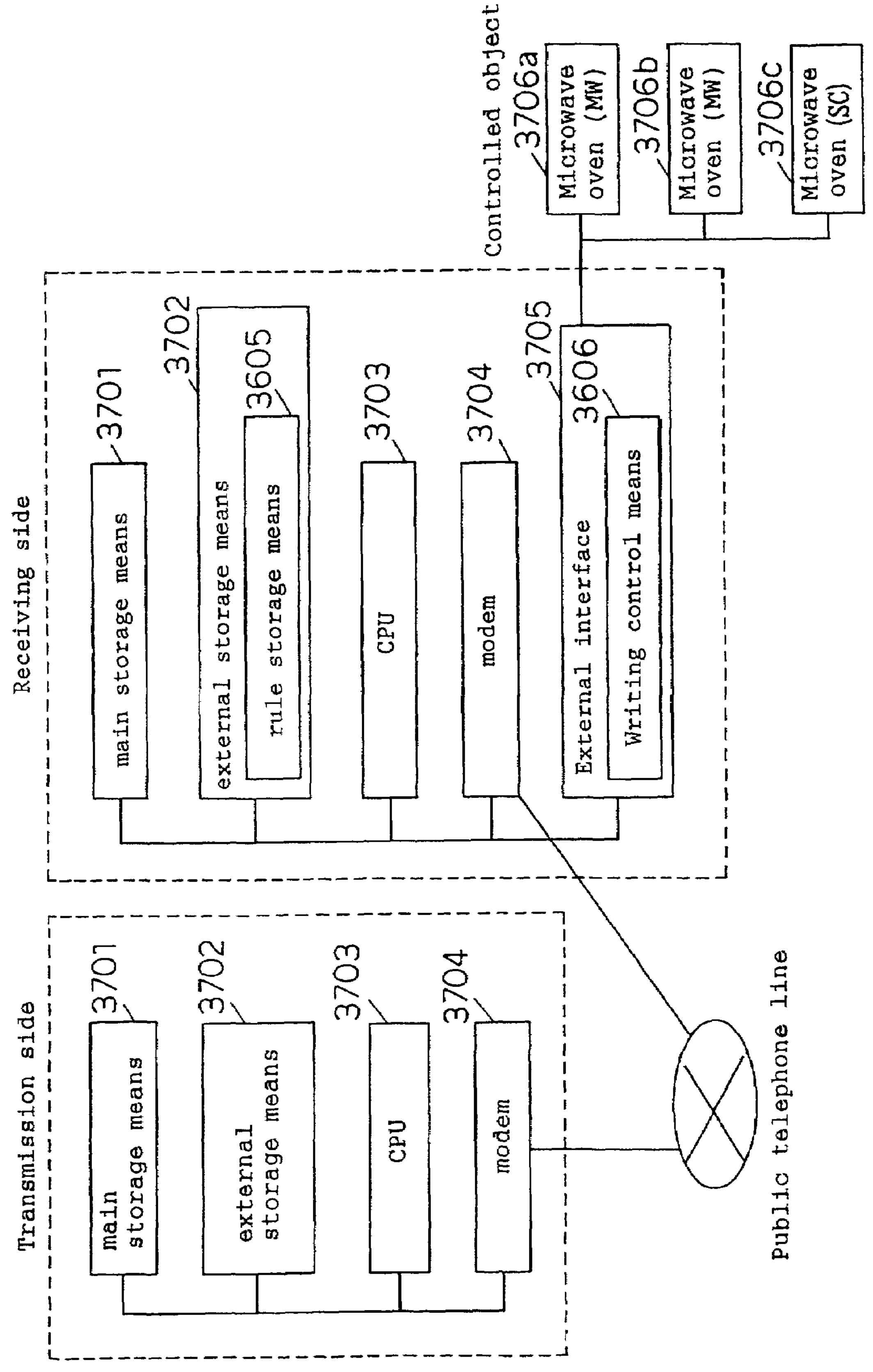
FIG. 37 is a block diagram showing the hardware configuration of the rule communication apparatus in accordance with Embodiment 9.

FIG. 37 shows a hardware configuration wherein the system configured as described above is operated. FIG. 37 is basically the same configuration as that of a general-purpose computer system for carrying out communication. In FIG. 37, the numeral 3701 represents a main storage apparatus for storing processing programs and data at the time of execution, the numeral 3702 represents an external storage apparatus for storing programs and data, the numeral 3703 represents a CPU for transferring programs stored in the external storage apparatus to the main storage apparatus and for executing them, the numeral 3704 represents a modem capable of being connected to an external network, the numeral 3705 represents an external interface, such as an RS232C, for writing data externally, the numerals 3706*a*and 3706*b* represent MW type microwave ovens having storage media. In addition, the numeral 3706*c* represents an SC type microwave oven having a recording medium.

Figure 38:
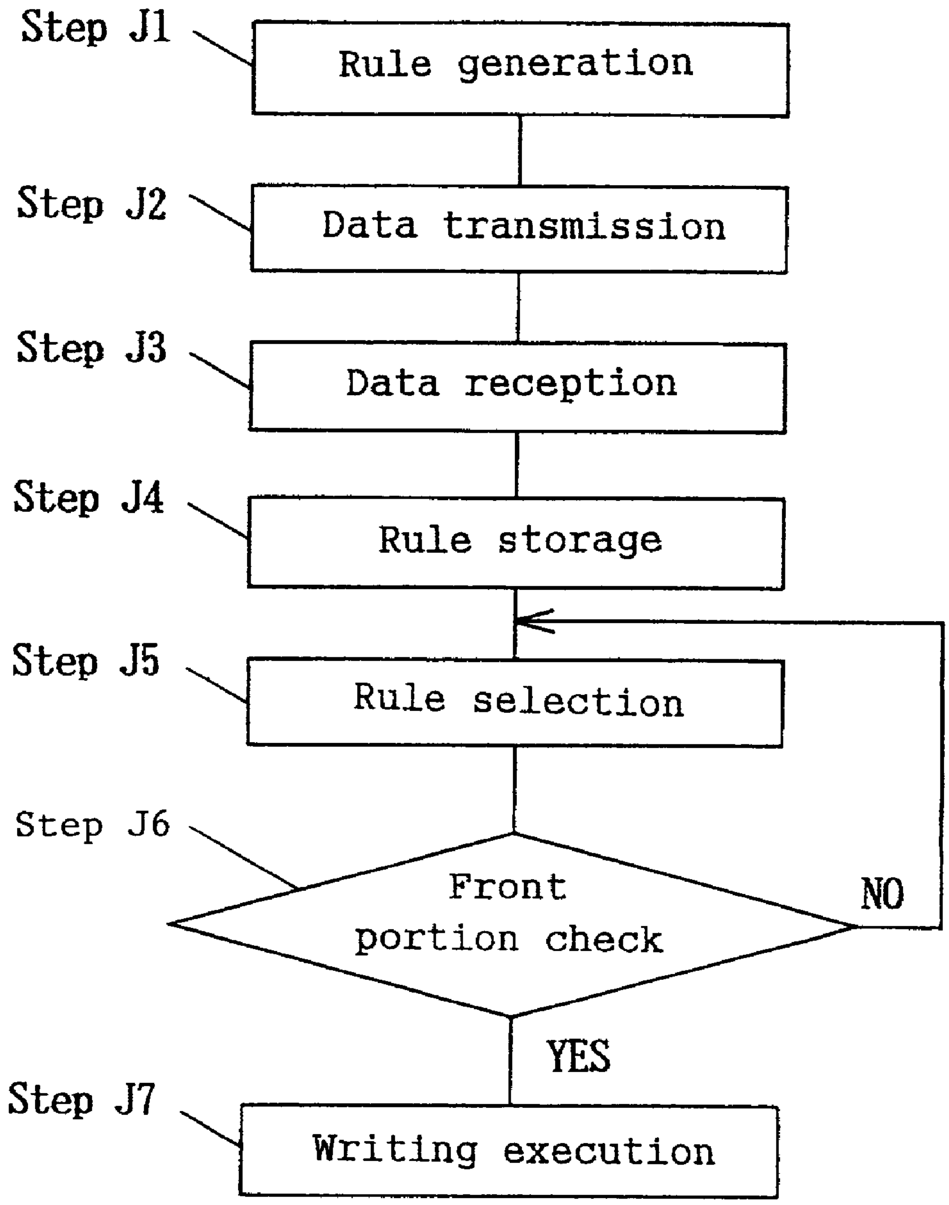
FIG. 38 is a flowchart explaining the operation of the rule communication apparatus in accordance with Embodiment 9.

The operation of the rule communication apparatus configured as described above will be explained in accordance with the flowchart of FIG. 38. Even in the present embodiment, as described at the beginning of the description of the above-mentioned embodiment 1, in the case when a new frozen food is developed or in the case when a conventional cooking method is changed, a scene wherein the information of the new cooking method and the like are transmitted from the server to each convenience store or each family restaurant is taken as an example and described.

(Step J1)

At the rule generation means 3601, rules are edited on the transmitter side.

For example, it is assumed that the rules shown in FIG. 39 have been created and edited as rules for controlling the written contents of the cooking sequences for microwave ovens depending on the type of the microwave oven. These rules are rules representing "If the type is MW, heating is carried out 10 sec at 800 W first, and 30 sec at 300 W next. If the type is SC, heating is carried out 10 sec at 800 W first, and then 40 sec at 300 W next while using a steam function." Since the SC type has a steam function, its cooking sequence differs from that of the MW type having no steam function.

(Step J2)

The data transmission means 3602 transmits the rules created by the rule generation means 3601.

For example, transmission is carried out to the receiving apparatus through a modem via a telephone line.

(Step J3)

The data receiving means 3603 receives the rules transmitted from the data transmission means.

(Step J4)

The rules received by the data receiving means 3603 are stored in the rule storage means 3605.

(Step J5)

From the rules stored in the rule storage means 3605, one rule not yet selected is selected.

(Step J6)

The front portion (in FIG. 39, the portion represented by the numeral 3901) of the rule selected at Step J5 is checked whether it is compatible with the plural types of microwave ovens connected to the receiving apparatus 3652. In the case when the type of the microwave oven is compatible with the front portion of the rule selected at Step J5, matching is carried out between the type of the microwave oven to be specified as the connection destination for data writing and the description content of the latter portion (in FIG. 39, the portion represented by the numeral 3902 of the rule. If the front portion is not compatible, the sequence returns to (Step J5).

Next, in the case when the rule not yet selected has been stored in the rule storage means 3605, the sequence returns to Step J5.

And, in the case when the selection of all rules has already been completed at step J5, the above-mentioned matching information, created at this step, is retained, and the sequence advances to Step J7.

(Step J7)

By using the above-mentioned matching information created at Step J6, the writing process for the data of the corresponding latter portion is executed for the microwave oven at each connection destination described above. In this case, the writing destination is the recording medium of each microwave oven.

For example, as shown in FIG. 37, it is assumed that the MW type microwave ovens 3706*a* and 3706*b* and the SC type of microwave oven 3706*c* have been connected to the receiving apparatus 3652 as controlled apparatuses. At this time, at Step J6, matching is carried out between the type of the microwave ovens 3706*a* and 3706*b* and the content (the latter portion 3902 shown in FIG. 39) "Then 1st 800 W 10 sec, 2nd 300 W 30 sec," and furthermore, matching is carried out between the type of the microwave oven 3706*c* and the content "Then 1st 800 W 10 sec, 2nd 300 W 40 sec with Steam." As a result, cooking sequences are written for the two types of the above-mentioned microwave ovens 3706*a* and 3706*b* and one type of the microwave oven 3706*c*. This writing operation is carried out by the writing control means 3606. In addition, both the microwave ovens 3706*a* and 3706*b* are the MW type, but they are different apparatuses as controlled apparatuses; therefore, an identification number or the like is assigned to each apparatus so that they can be identified individually.

Therefore, even if the control content (cooking sequence) differs depending on the type of the controlled apparatus installed at each store, a cooking sequence corresponding to each type is prepared for the types of all microwave ovens, whereby the cooking sequences for all the types can be transmitted to all stores at one time. As a result, at each store, only the optimal cooking sequence corresponding to the type of the microwave oven can be extracted, and cooking can be achieved by using this.

In the present embodiment, data communication via a modem is used; however, broadcasting may be used as a data communication means. For example, cooking sequence information may be broadcast simultaneously with the CM program of a frozen food, and the cooking sequence may be written on a recording medium of the connected microwave oven via a receiver.

Furthermore, in the present embodiment, the storage medium of the controlled apparatus is described as in the case of a built-in type; however, without being limited to this, it may be a card memory type that can be inserted into and ejected from the controlled apparatus, for example. In the case of the card memory type, as described in Embodiment 3, the writing control means 3603 writes the above-mentioned control information on the IC card to which identification information indicating the relationship to the controlled apparatus is assigned.

(Embodiment 10)

Figure 40:
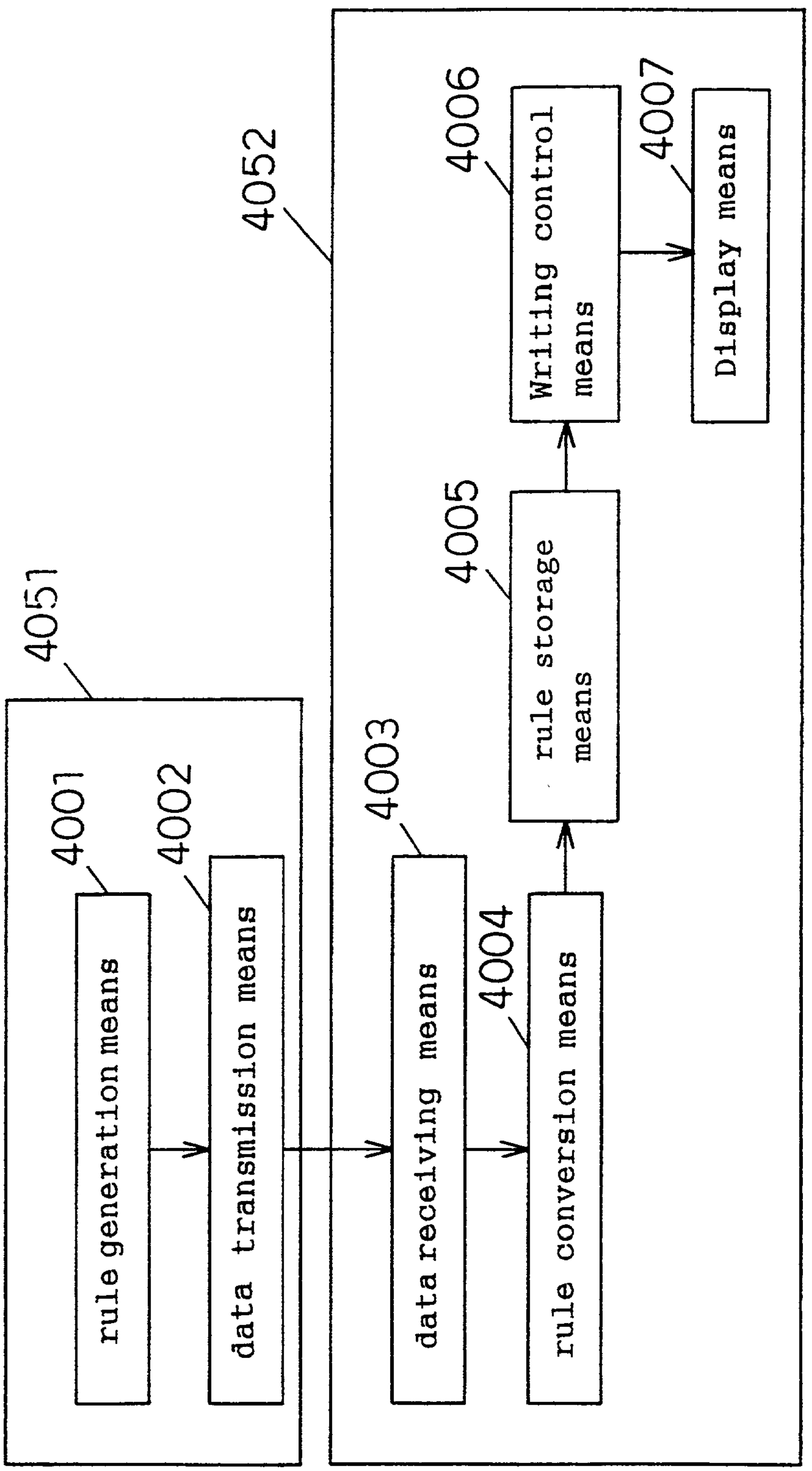
FIG. 40 is a block diagram showing the system configuration of a rule communication apparatus in accordance with Embodiment 10.

FIG. 40 is a system configuration diagram of a rule communication apparatus of an embodiment in accordance with the present invention; and the present embodiment will be described by using the figure.

Figure 41:
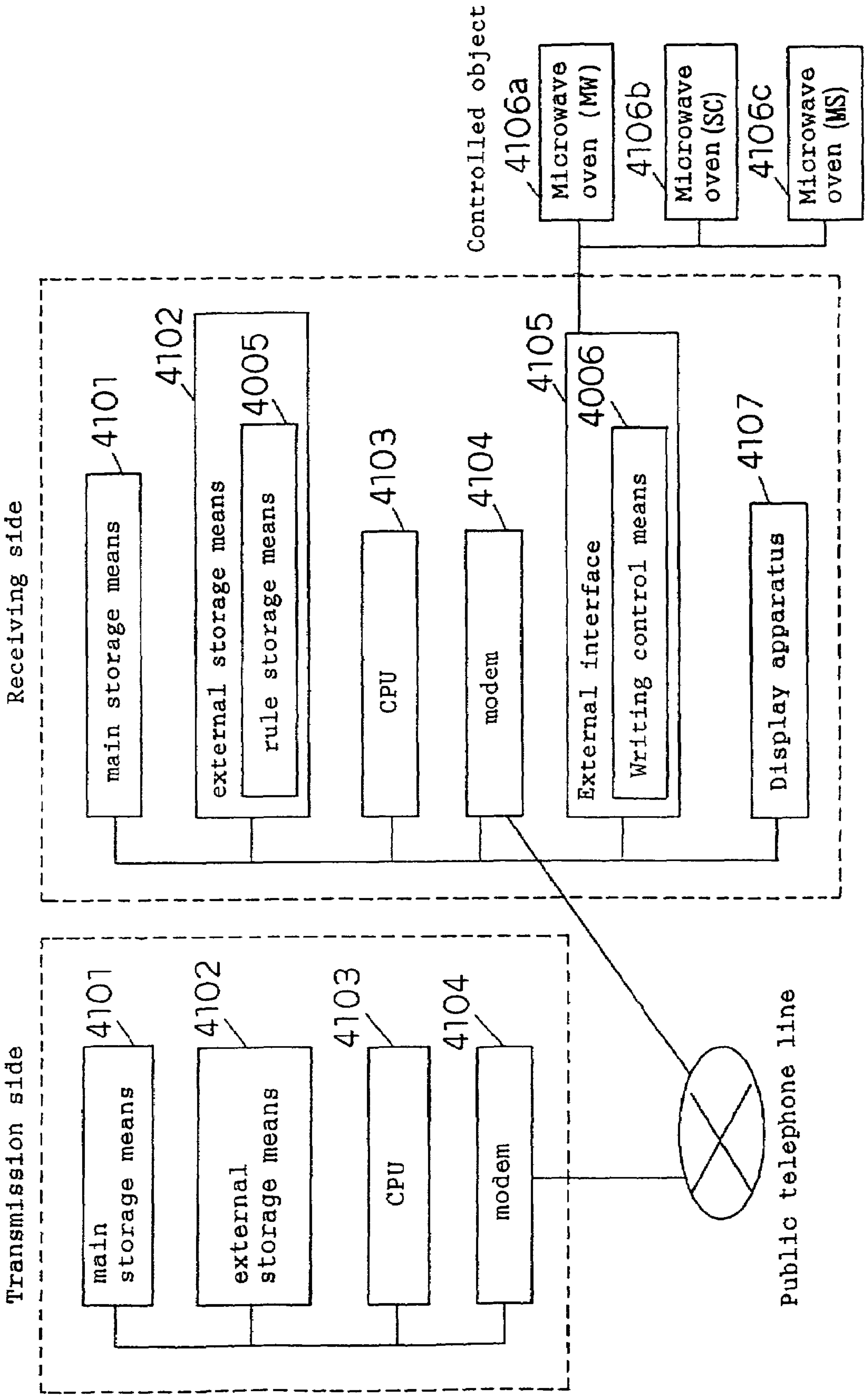
FIG. 41 is a block diagram showing the hardware configuration of the rule communication apparatus in accordance with Embodiment 10.

In FIG. 40, the numeral 4001 represents a rule generation means for generating rules, and the numeral 4002 represents a data transmission means for converting the rules generated by the rule generation means 4001 into data and for transmitting the data. These are used to form a transmission apparatus 4051. Furthermore, the numeral 4003 represents a data receiving means for receiving data transmitted by the data transmission means 4002, the numeral 4004 represents a rule conversion means for converting the data received by the data receiving means 4003 into rules, the numeral 4005 represents a rule storage means for storing the rules converted by the rule conversion means 4004, the numeral 4006 represents a writing control means for controlling data writing on the basis of the rules stored in the rule storage means 4005, and the numeral 4007 represents a display means for displaying the result of the writing control means. These are used to form a receiving apparatus 4052. FIG. 41 shows a hardware configuration wherein the system configured as described above is operated. FIG. 41 is basically the same configuration as that of a general-purpose computer system for carrying out communication. In FIG. 41, the numeral 4101 represents a main storage apparatus for storing processing programs and data at the time of execution, the numeral 4102 represents an external storage apparatus for storing programs and data, the numeral 4103 represents a CPU for transferring programs stored in the external storage apparatus to the main storage apparatus and for executing them, the numeral 4104 represents a modem capable of being connected to an external network, the numeral 4105 represents an external interface, such as an RS232C, for writing data externally, the numerals 4106*a*, 4106*b* and 4106*c* represent microwave ovens having storage media, and the numeral 4107 represents a display apparatus for displaying the result of the writing control.

The main differences between the present embodiment and the above-mentioned Embodiment 9 are that the present embodiment is provided with the display means 4007 and has control operation relating to Step K5 or the like of the writing control means described later; in other respects, they are basically the same.

Figure 42:
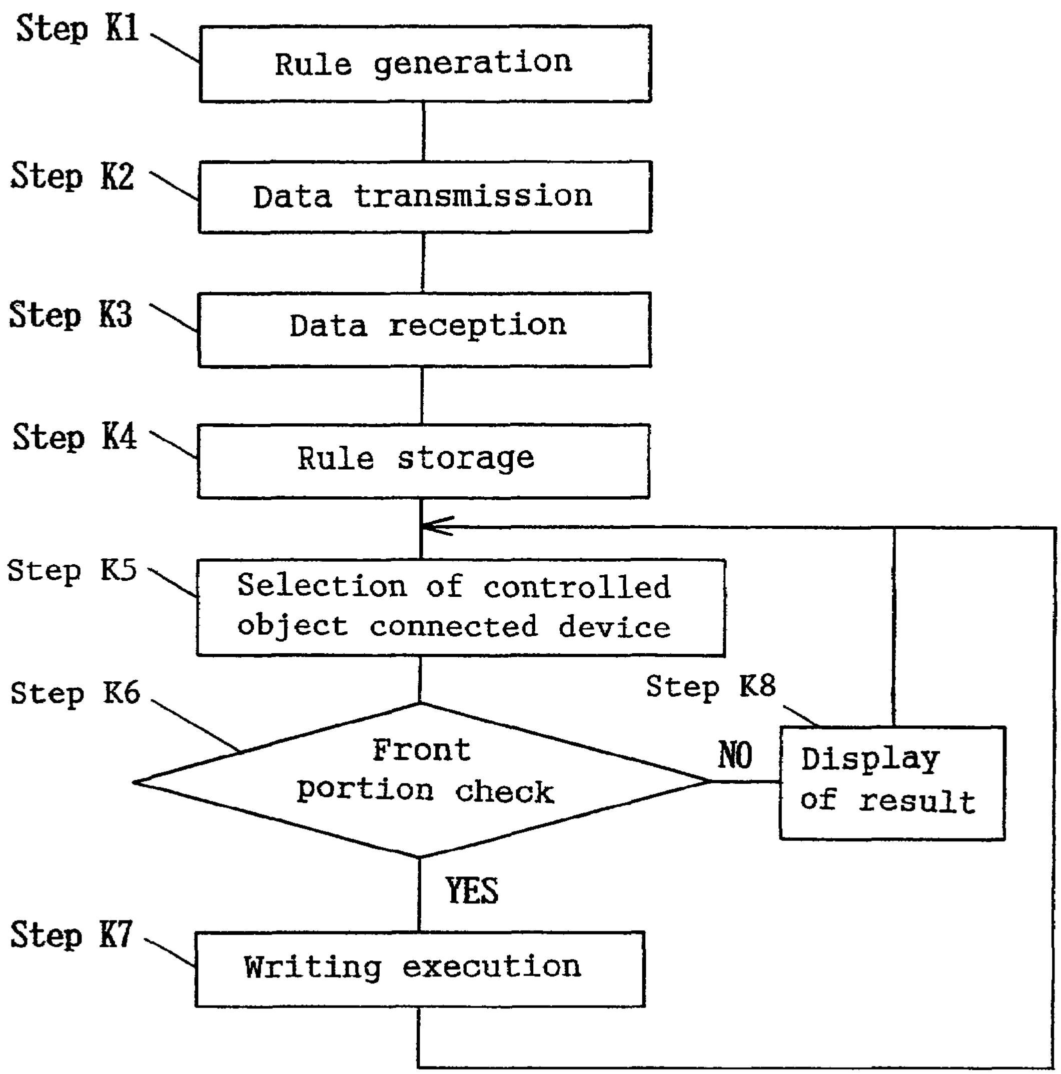
FIG. 42 is a flowchart explaining the operation of a rule communication apparatus in accordance with Embodiment 10.

The operation of the rule communication apparatus configured as described above will be explained in accordance with the flowchart of FIG. 42.

(Step K1)

At the rule generation means 4001, rules are edited on the transmitter side. For example, it is assumed that the rules shown in FIG. 39 have been created and edited as rules for controlling the written contents of cooking sequences for microwave ovens depending on the type of the microwave oven.

(Step K2)

The data transmission means 4003 transmits the rules created by the rule generation means 4001. For example, transmission is carried out to the receiving apparatus through a modem via a telephone line.

(Step K3)

The data receiving means receives the rules transmitted from the data transmission means.

(Step K4)

The rules received by the data receiving means are stored in the rule storage portion.

(Step K5)

One of control objects connected to the data receiving apparatus is selected.

(Step K6)

A check is carried out as to whether the type name (type name MW in the case of the microwave oven 4106*a*, for example) of the controlled apparatus (the microwave oven 4106*a*, for example) selected at Step K5 is compatible with the description content of the front portion 3901 of the rule stored in the rule storage means. In the case when the apparatus is compatible with the front portion, the sequence advances to (Step K7). In the case when it is not compatible, the sequence advances to (Step K8).

(Step K7)

At Step K6, the operation of writing the cooking method data described at the latter portion 3902 of the rule judged as compatible on the recording medium of the corresponding microwave oven 4106*a* is carried out, and the sequence returns to (Step K5).

(Step K8)

The fact that the controlled apparatus selected at Step K5 is not compatible with any rules stored in the rule storage means 4005 is indicated by using the display means 4007. This display operation is carried out by using a command from the writing control means 4006.

Herein, the types of microwave ovens corresponding to the rules shown in FIG. 39 are MW and SC; however, the types of the microwave ovens shown in FIG. 41 are types MW, SC and MS.

In this case, at Step K6, the microwave oven 4106*c* is judged as a type not compatible with any rules, and indicated as shown in FIG. 43 at Step K8, for example. Furthermore, it may be possible to transmit a message notifying that there was no compatible rule, from the receiving apparatus to the transmission apparatus via a modem and a telephone line.

For this reason, just as in the case of the above-mentioned Embodiment 9, even if the control (cooking sequence) differs depending on the type of the controlled apparatus, control contents for plural types can be transmitted by one transmission. Furthermore, in the present embodiment, in the case when there is a microwave oven, the menu content of which is not renewed by the transmitted rule, it is possible to notify this fact to the employees of the store or to the server on the transmission side.

Even when the display apparatus is not available at (Step K8), it may be possible to use a configuration wherein the above-mentioned contents are notified by voice or LED indication. Furthermore, when a menu is renewed, a display indicating this fact may be used.

(Embodiment 11)

Figure 44:
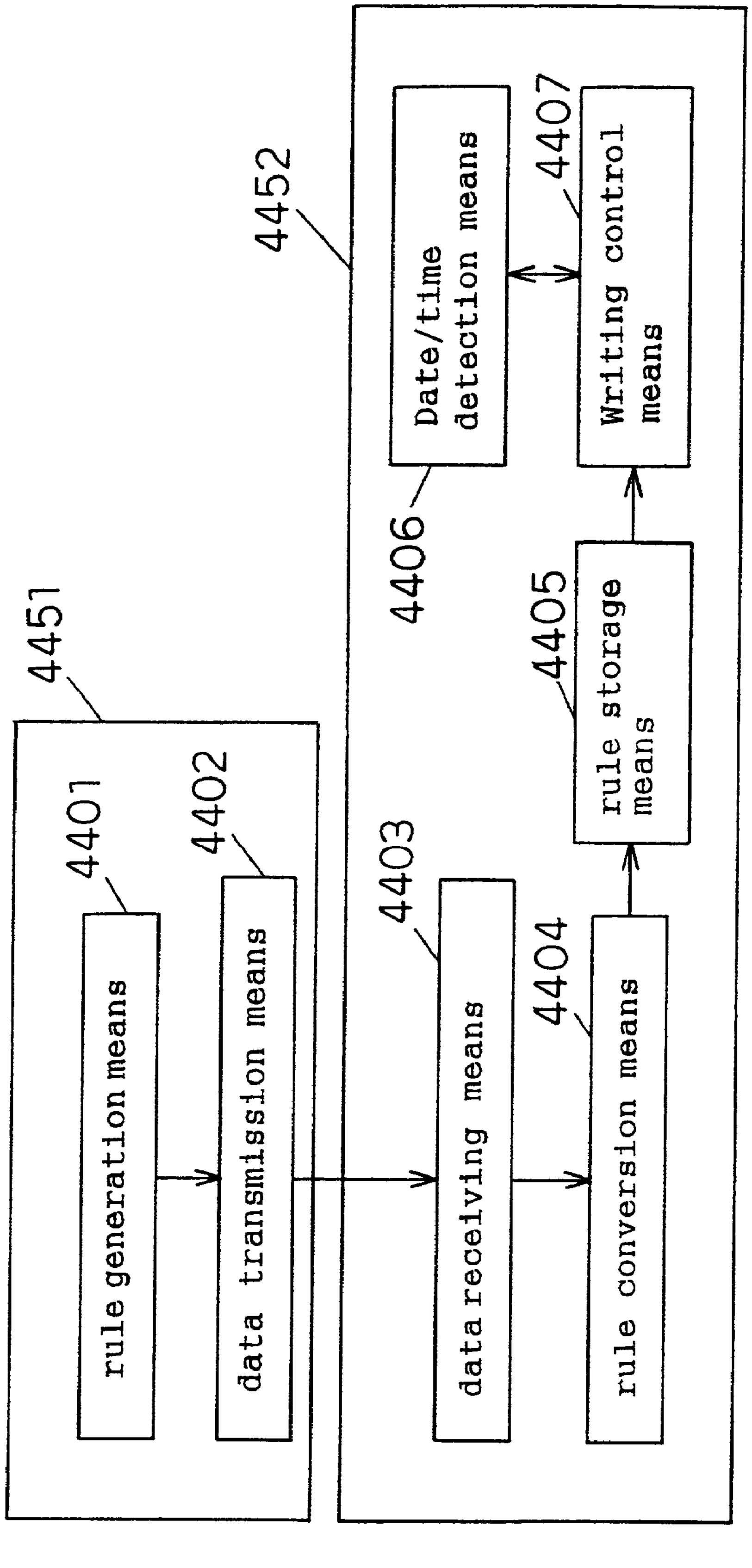
FIG. 44 is a block diagram showing the system configuration of a rule communication apparatus in accordance with Embodiment 11.

FIG. 44 is a system configuration diagram of a rule communication apparatus of an embodiment in accordance with the present invention; and the present embodiment will be described by using the figure.

In FIG. 44, the numeral 4401 represents a rule generation means for generating rules, and the numeral 4402 represents a data transmission means for converting the rules generated by the rule generation means 4401 into data and for transmitting the data. These are used to form a transmission apparatus 4451. Furthermore, the numeral 4403 represents a data receiving means for receiving data transmitted by the data transmission means 4402, the numeral 4404 represents a rule conversion means for converting the data received by the data receiving means 4403 into rules, the numeral 4405 represents a rule storage means for storing the rules converted by the rule conversion means 4404, and the numeral 4406 represents a date/time detection means for detecting data/time information from the rules stored in the rule storage means 4405, and the numeral 4407 represents a writing control means for controlling data writing on the basis of the rules stored in the rule storage means 4405 and the date/time information detected by the date/time detection means 4406. These are used to form a receiving apparatus 4452.

Figure 45:
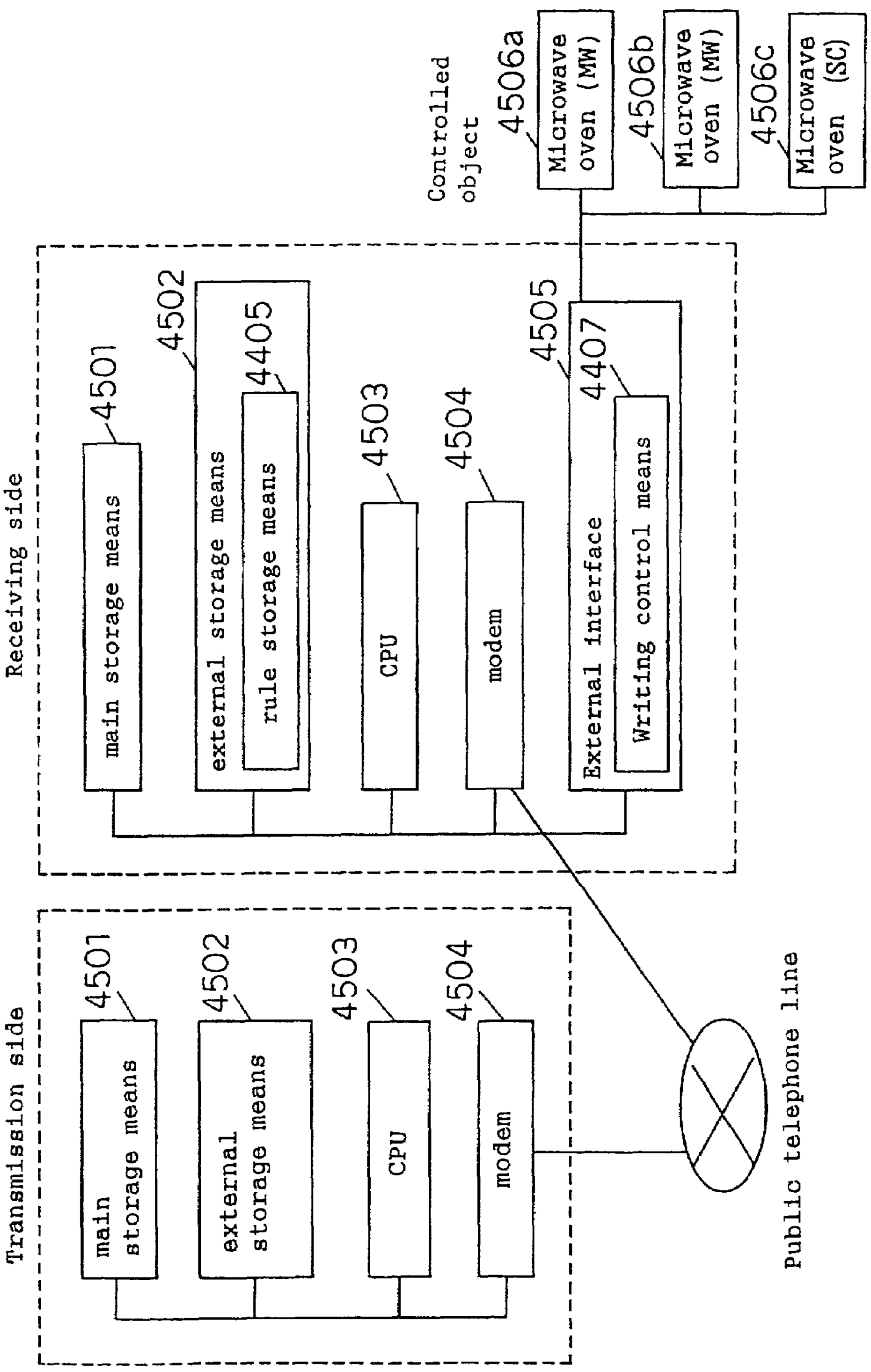
FIG. 45 is a block diagram showing the hardware configuration of the rule communication apparatus in accordance with Embodiment 11.

FIG. 45 shows a hardware configuration wherein the system configured as described above is operated. FIG. 45 is basically the same configuration as that of a general-purpose computer system for carrying out communication. In FIG. 45, the numeral 4501 represents a main storage apparatus for storing processing programs and data at the time of execution, the numeral 4502 represents an external storage apparatus for storing programs and data, the numeral 4503 represents a CPU for transferring programs stored in the external storage apparatus to the main storage apparatus and for executing them, the numeral 4504 represents a modem capable of being connected to an external network, the numeral 4505 represents an external interface, such as an RS232C or the like, for writing data externally, and the numerals 4506*a* to 4506*c* represent microwave ovens having storage media.

The main differences between the present embodiment and the above-mentioned Embodiment 9 are that the present embodiment is provided with the date/time detection means 4406, and that the writing time is also considered at the time of data writing control by the writing control means 4407. Therefore, in other respects, the present embodiment is basically the same as Embodiment 9. Furthermore, the rewriting time information of the present invention corresponds to the date/time information.

Figure 46:
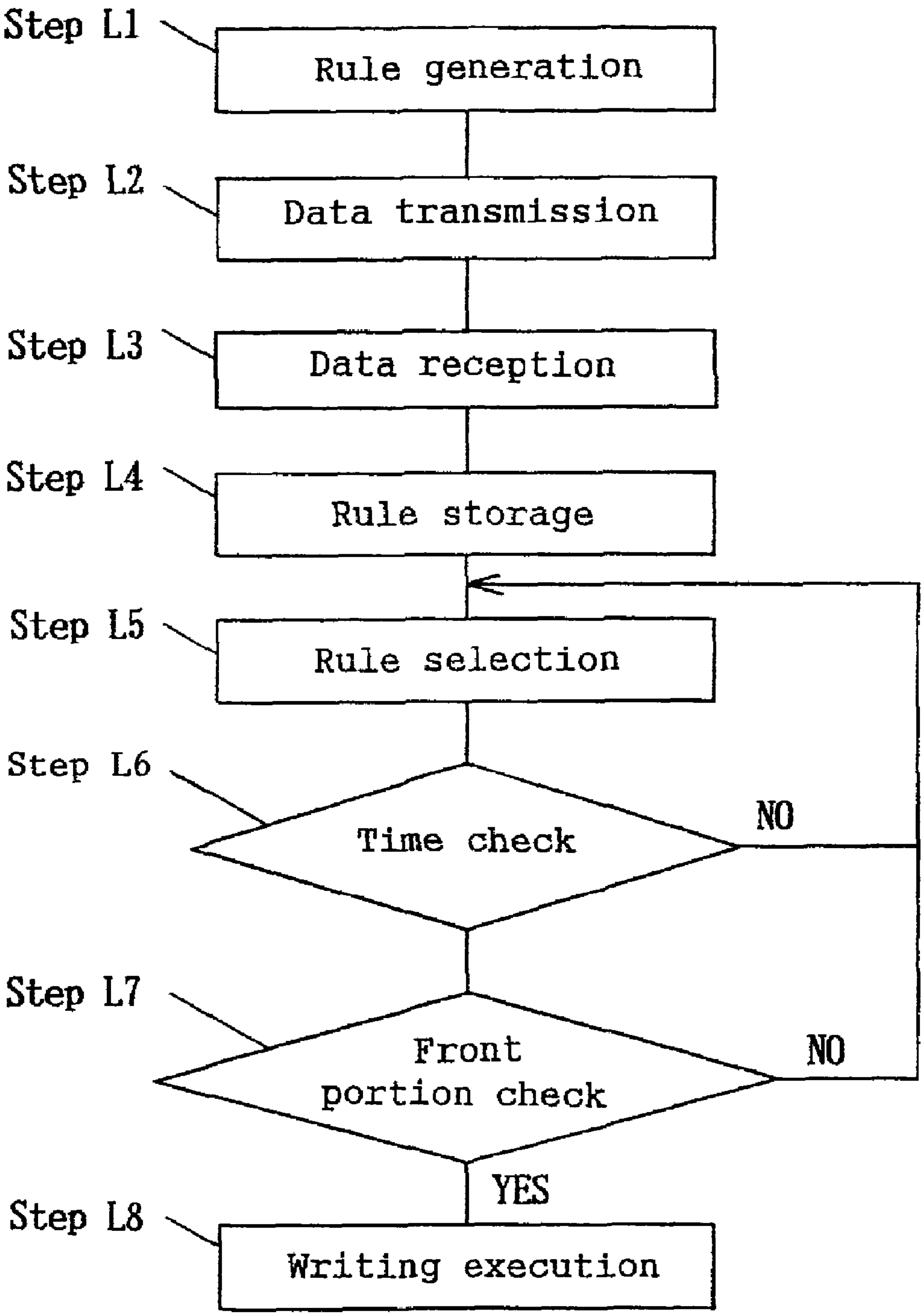
FIG. 46 is a flowchart explaining the operation of the rule communication apparatus in accordance with Embodiment 11.

The operation of the rule communication apparatus configured as described above will be explained in accordance with the flowchart of FIG. 46.

(Step L1)

At the rule generation means, rules are edited on the transmitter side. For example, it is assumed that the rules shown in FIG. 47 have been created and edited as rules for controlling the written contents of the cooking sequences for microwave ovens depending on the type of the microwave oven. The rules shown in FIG. 47 indicate that, in accordance with the date/time information 4701, the operation for writing a new cooking sequence to each microwave oven is carried out at 10 o'clock, Apr. 1, 1999.

As a result, for example, with respect to the time when the cooking sequence for the food material having been used is renewed to a new cooking sequence for a new food material, the renewal can be carried out simultaneously for all the stores. In other words, in this case, provision of a new menu item in accordance with the new cooking sequence can be securely carried out simultaneously at all the stores, starting at 10 o'clock, Apr. 1, 1999.

(Step L2)

The data transmission means transmits the rules created by the rule generation means. For example, transmission is carried out to the receiving apparatus through a modem via a telephone line.

(Step L3)

The data receiving means receives the rules transmitted from the data transmission means.

(Step L4)

The rules received by the data receiving means are stored in the rule storage portion.

(Step L5)

From the rules stored in the rule storage means 4405, one rule not yet selected is selected.

(Step L6)

A comparison is made as to whether the current time is the same as the setting time described in the selected rule. In the case when the current time is behind the setting time, the sequence advances to the next step. In other cases, the sequence returns to (Step L5).

In other words, in the case when the rules shown in FIG. 47 are selected at step L5, until the current time passes 10 o'clock, Apr. 1, 1999, the sequence returns to step L5; therefore, the writing operation of the rules is not executed.

(Step L7)

This stop is basically the same as Step J6 described in the above-mentioned Embodiment 9.

(Step L8)

This step is basically the same as Step J7 described in the above-mentioned embodiment 9.

In other words, by using the above-mentioned matching information created at Step L7, the writing processing for the data (see FIG. 47) of the corresponding latter portion is executed for the microwave ovens 4506*a* to 4506*c* at each of the above-mentioned connection destinations.

As a result, it is possible to designate the date/time for menu item writing on the transmission side. For example, it is possible to write a new cooking sequence on the recording medium of the microwave oven at a convenience store in synchronization with the time when a new menu item is sold.

(Embodiment 12)

Figure 48:
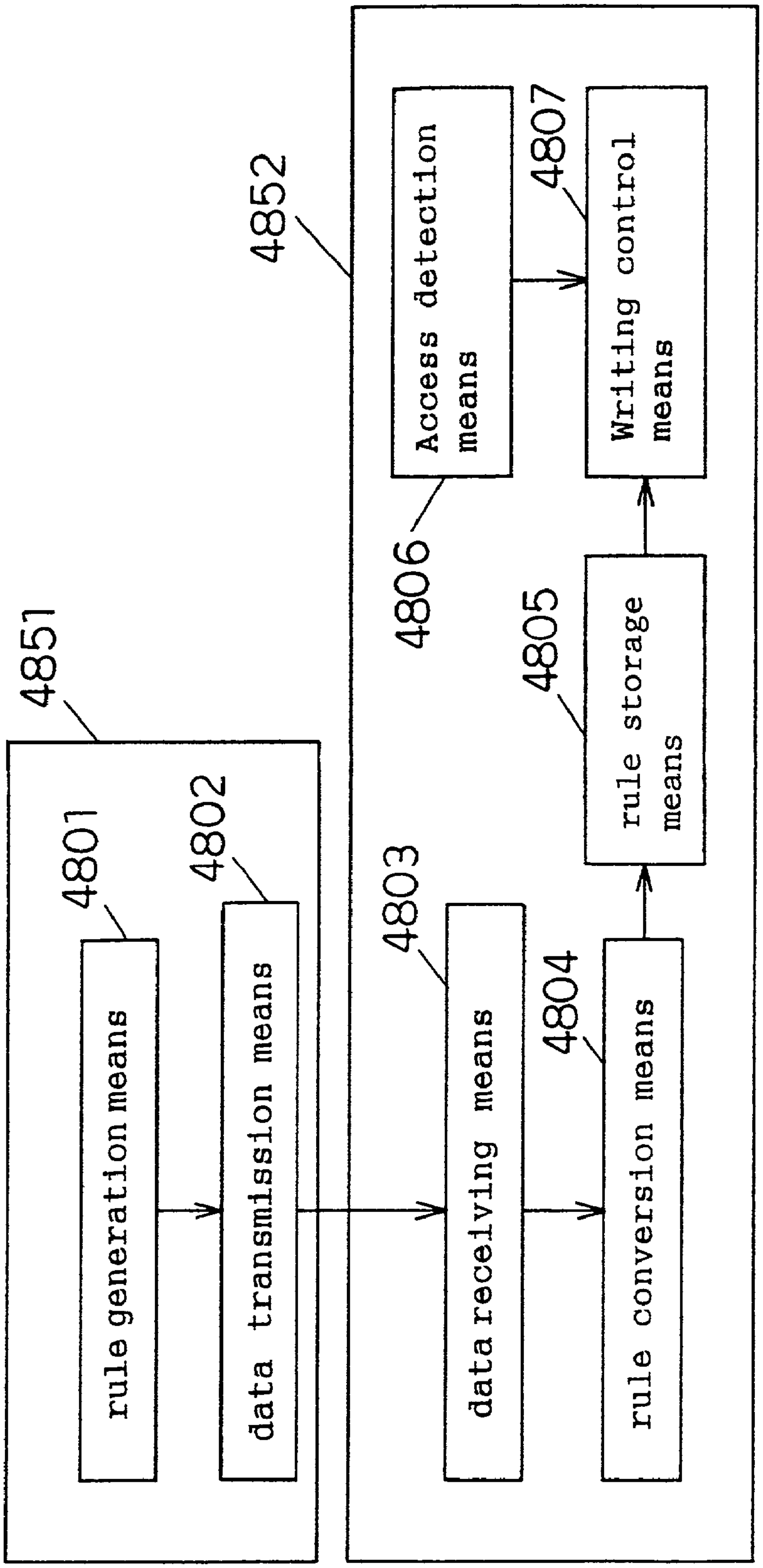
FIG. 48 is a block diagram showing the system configuration of a rule communication apparatus in accordance with Embodiment 12.

FIG. 48 is a system configuration diagram of a rule communication apparatus of an embodiment in accordance with the present invention; and the present embodiment will be described by using the figure.

In FIG. 48, the numeral 4801 represents a rule generation means for generating rules, and the numeral 4802 represents a data transmission means for converting the rules generated by the rule generation means 4801 into data and for transmitting the data. These are used to form a transmission apparatus 4851. Furthermore, the numeral 4803 represents a data receiving means for receiving data transmitted by the data transmission means 4802, the numeral 4804 represents a rule conversion means for converting the data received by the data receiving means 4803 into rules, the numeral 4805 represents a rule storage means for storing the rules converted by the rule conversion means 4804, and the numeral 4806 represents an access detection means for detecting whether the control object has gained access to the recording medium, the numeral 4807 represents a writing control means for controlling data writing on the basis of the rules stored in the rule storage means 4805 and the access conditions of the control object at the access detection means 4806. These are used to form a receiving apparatus 4852.

Figure 49:
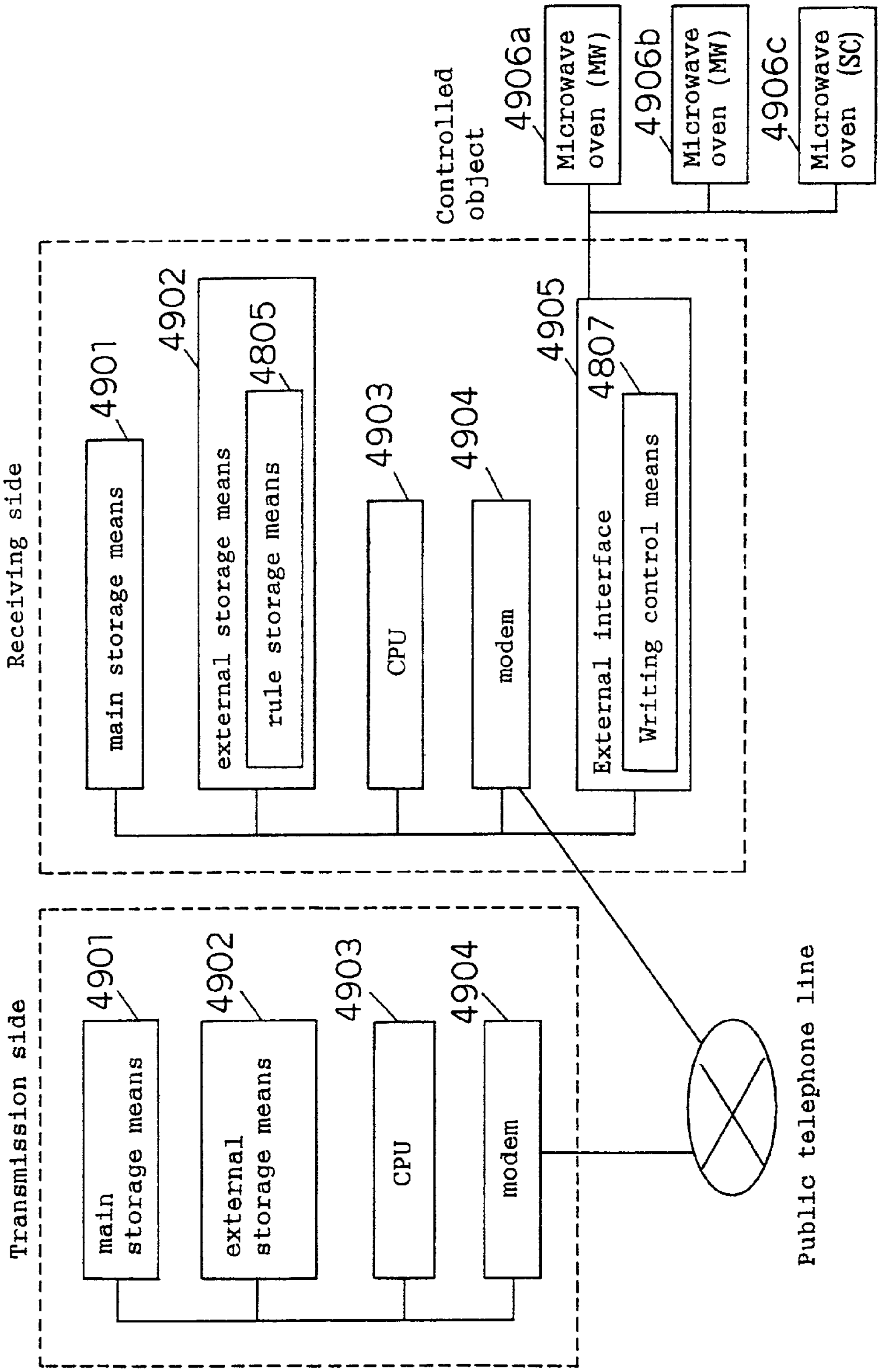
FIG. 49 is a block diagram showing the hardware configuration of the rule communication apparatus in accordance with Embodiment 12.

FIG. 49 shows a hardware configuration wherein the system configured as described above-is operated. FIG. 49 is basically the same configuration as that of a general-purpose computer system for carrying out communication. In FIG. 49, the numeral 4901 represents a main storage apparatus for storing processing programs and data at the time of execution, the numeral 4902 represents an external storage apparatus for storing programs and data, the numeral 4903 represents a CPU for transferring programs stored in the external storage apparatus to the main storage apparatus and for executing them, the numeral 4904 represents a modem capable of being connected to an external network, the numeral 4905 represents an external interface, such as an RS232C or the like, for writing data externally, and thee numerals 4906*a* to 4906*c* represent microwave ovens having storage media.

The main differences between the present embodiment and the above-mentioned Embodiment 9 are that the present embodiment is provided with the access detection means 4806, and that writing control by the writing control means 4807 is performed more minutely. Therefore, in other respects, the present embodiment is the same as Embodiment 9.

Figure 50:
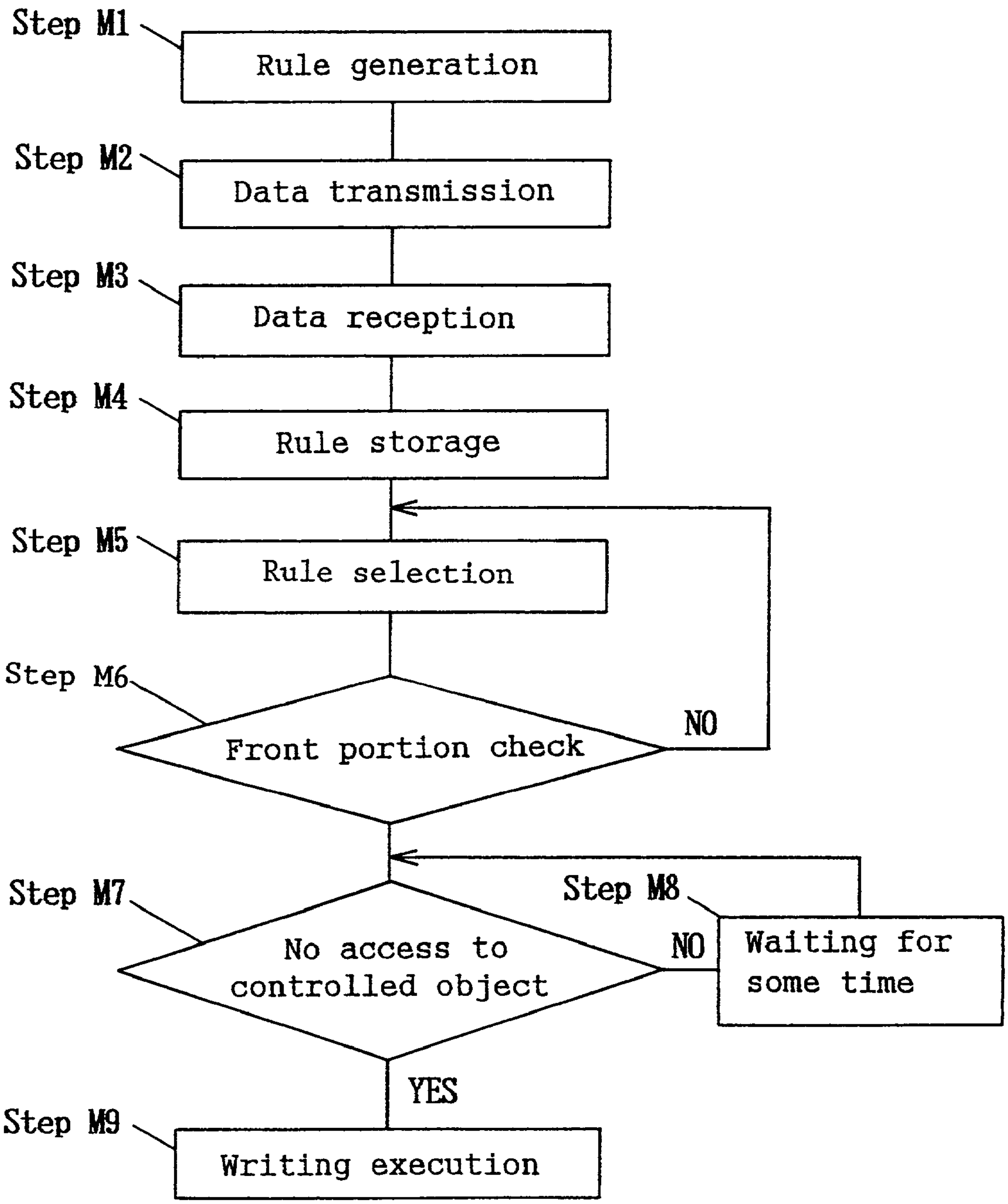
FIG. 50 is a flowchart explaining the operation of the rule communication apparatus in accordance with Embodiment 12.

The operation of the rule communication apparatus configured as described above will be explained in accordance with the flowchart of FIG. 50.

(Step M1)

At the rule generation means, rules are edited on the transmitter side. For example, it is assumed that the rules shown in FIG. 39 have been created and edited as rules for controlling the written contents of the cooking sequences for microwave ovens depending on the type of the microwave oven.

(Step M2)

The data transmission means transmits the rules created by the rule generation means. For example, transmission is carried out to the receiving apparatus through a modem via a telephone line (Step M3)

The data receiving means receives the rules transmitted from the data transmission means.

(Step M4)

The rules received by the data receiving means are stored in the rule storage means.

(Step M5)

From the rules stored in the rule storage means 4805, one rule not yet selected is selected.

(Step M6)

This step is basically the same as Step J6 described in the above-mentioned Embodiment 9.

(Step M7)

A check is carried out as to whether the controlled apparatus gains access or not to the recording medium to which data is written by the receiving apparatus. In the case when the control object gains access, the sequence advances to (Step M8). In other cases, the sequence advances to (Step M9).

(Step M8)

Waiting is carried out for a constant time until the access by the control apparatus ends.

(Step M9)

This step is basically the same as Step J7 described in the above-mentioned Embodiment 9.

In other words, by using the above-mentioned matching information created at Step M6, the writing processing for the data of the corresponding latter portion is carried out for the microwave ovens 4906*a* to 4906*c* of each of the above-mentioned connection destinations.

As a result, when the control object gains access to the recording medium of the control object, data writing is not performed; therefore, cooking sequence writing is possible safely and securely.

(Embodiment 13)

Figure 51:
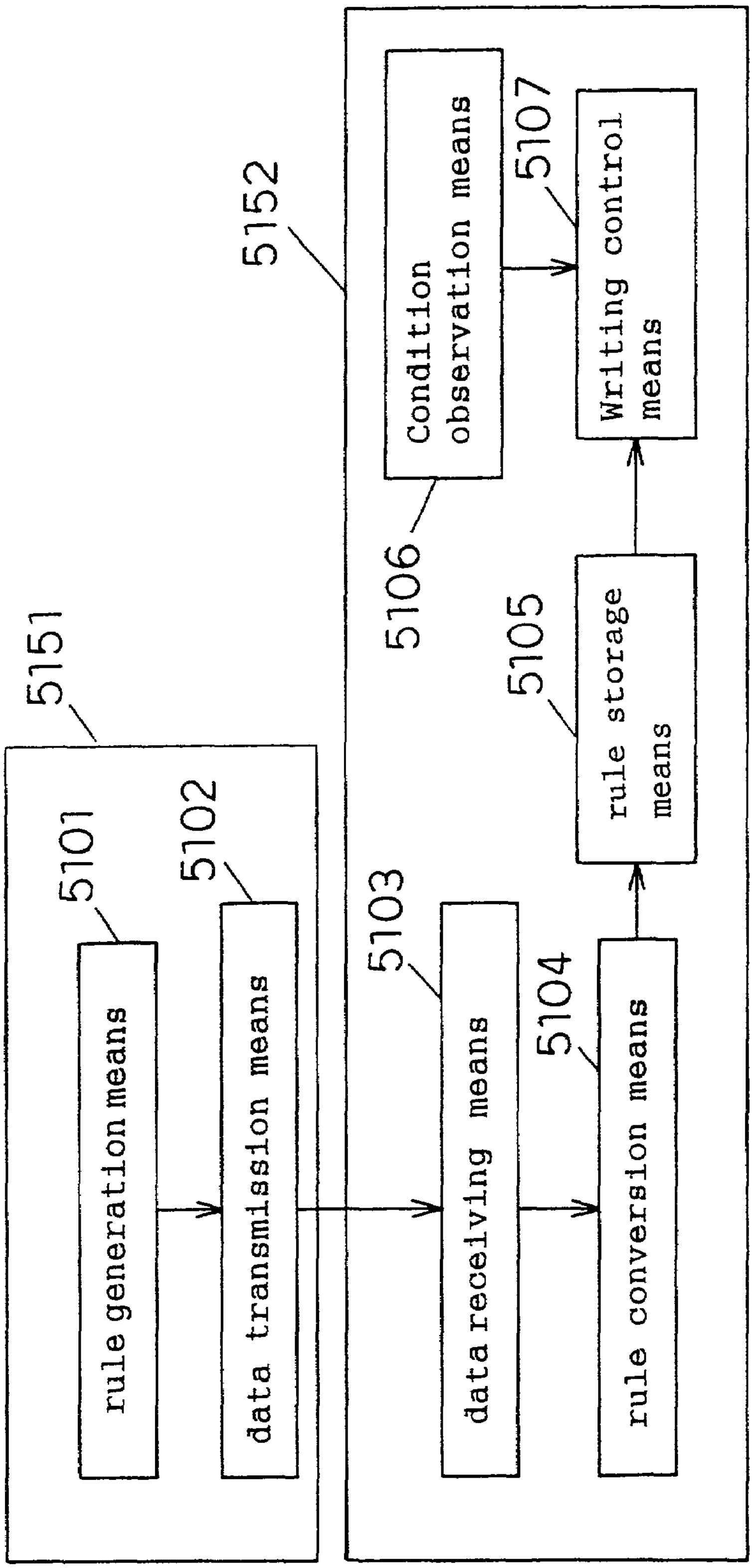
FIG. 51 is a block diagram showing the system configuration of a rule communication apparatus in accordance with Embodiment 13.

FIG. 51 is a system configuration diagram of a rule communication apparatus of an embodiment in accordance with the present invention; and the present embodiment will be described by using the figure.

In FIG. 51, the numeral 5101 represents a rule generation means for generating rules, and the numeral 5102 represents a data transmission means for converting the rules generated by the rule generation means 5101 into data and for transmitting the data. These are used to form a transmission apparatus 5151. Furthermore, the numeral 5103 represents a data receiving means for receiving data transmitted by the data transmission means 5102, the numeral 5104 represents a rule conversion means for converting the data received by the data receiving means 5103 into rules, the numeral 5105 represents a rule storage means for storing the rules converted by the rule conversion means 5104, and the numeral 5106 represents a condition observation means for observing conditions affecting the control of the control object, and the numeral 5107 represents a writing control means for controlling data writing on the basis of the rules stored in the rule storage means 5105 and the conditions observed by the condition observation means 5106. These are used to form a receiving apparatus 5152.

Figure 52:
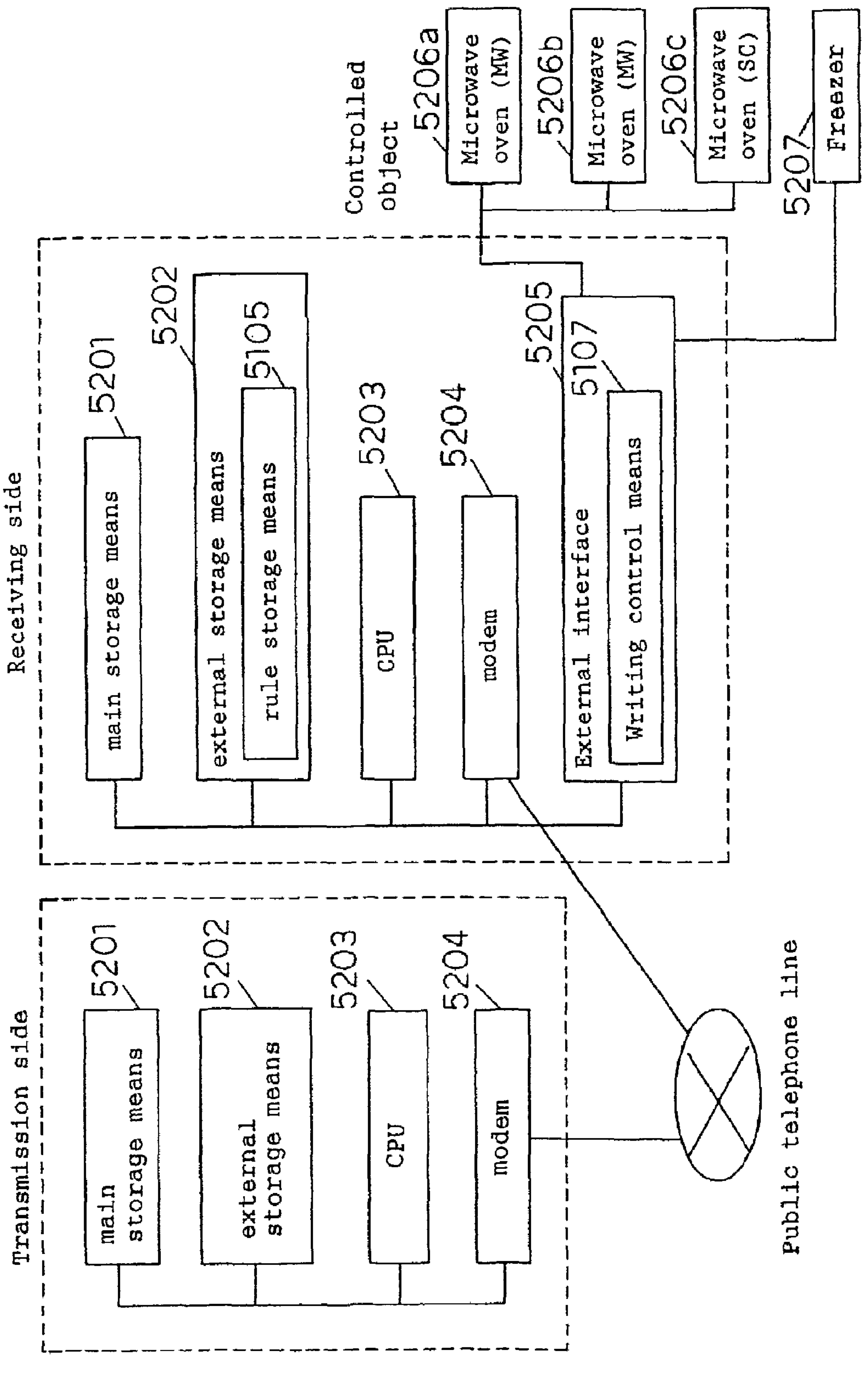
FIG. 52 is a block diagram showing the hardware configuration of the rule communication apparatus in accordance with Embodiment 13.

FIG. 52 shows a hardware configuration wherein the system configured as described above is operated. FIG. 52 is basically the same configuration as that of a general-purpose computer system for carrying out communication. In FIG. 52, the numeral 5201 represents a main storage apparatus for storing processing programs and data at the time of execution, the numeral 5202 represents an external storage apparatus for storing programs and data, the numeral 5203 represents a CPU for transferring programs stored in the external storage apparatus to the main storage apparatus and for executing them, the numeral 5204 represents a modem capable of being connected to an external network, the numeral 5205 represents an external interface, such as an RS232C or the like, for writing data externally, the numerals 5206*a* to 5206*c* represent microwave ovens having storage media, and the numeral 5207 represents a freezer for storing frozen food materials to be put into microwave ovens.

The main differences between the present embodiment and the above-mentioned Embodiment 9 are that the present embodiment is provided with a temperature detector for observing the internal temperature of the freeze 5207 as the above-mentioned condition observation mans 5106; for this reason, the cooking sequence for the microwave oven is corrected more minutely depending on the temperature condition of the freezer. Therefore, in other respects, the present embodiment is basically the same as Embodiment 9.

Figure 53:
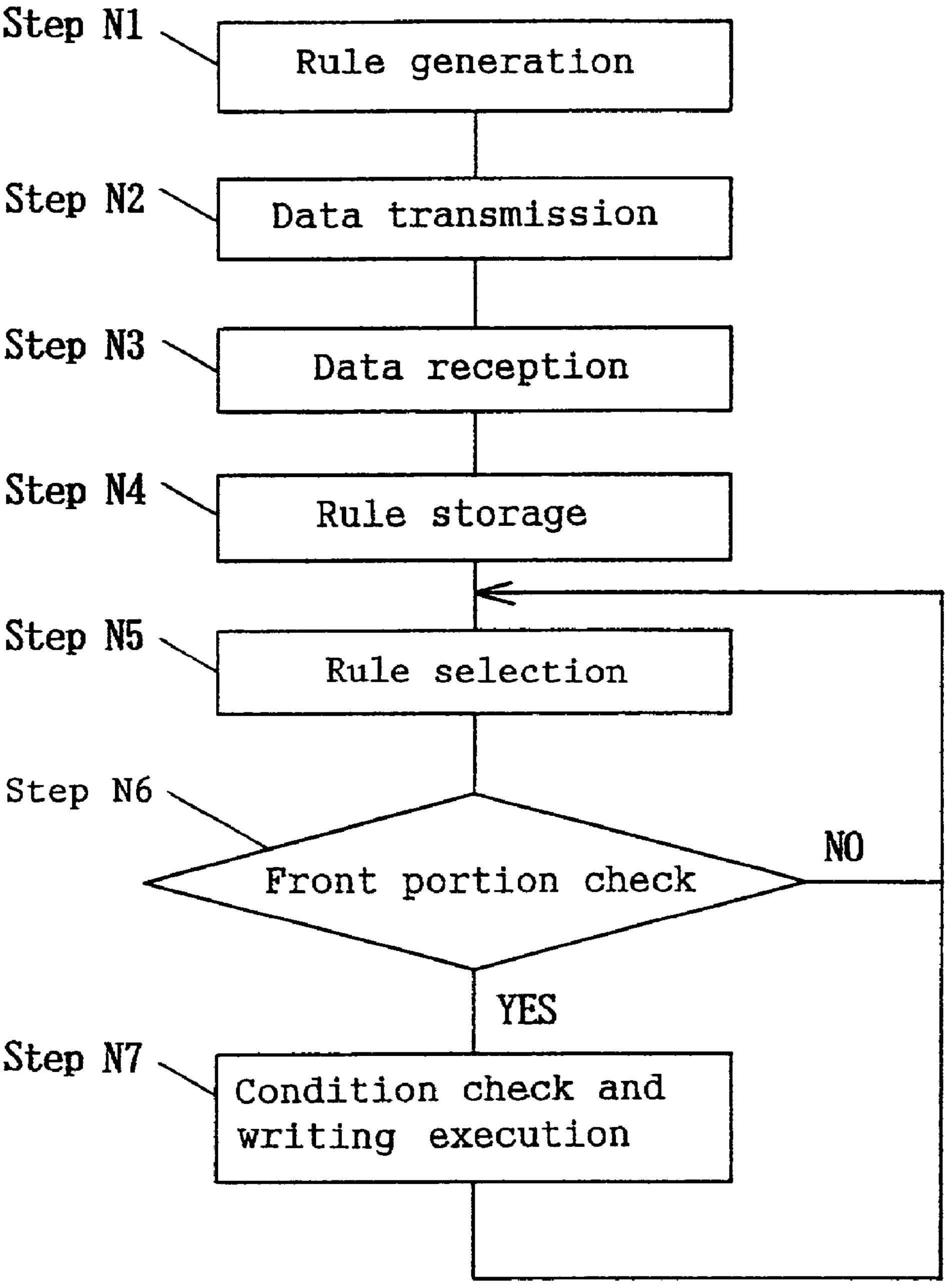
FIG. 53 is a flowchart explaining the operation of the rule communication apparatus in accordance with Embodiment 13.

The operation of the rule communication apparatus configured as described above will be explained in accordance with the flowchart of FIG. 53

(Step N1)

At the rule generation means, rules are edited on the transmitter side. For example, it is assumed that the rules shown in FIG. 54 have been created and edited as rules for controlling the written contents of the cooking sequences for microwave ovens depending on the type of the microwave oven. This rule is a rule representing that "in the case when the type is MW, and the temperature condition of the freezer is high (since the temperature is high and the temperature of the frozen food is not so low, it is not necessary to heat it for a long time), heating is carried out at 800 W for 10 sec first, and at 300 W for 30 sec next."

(Step N2)

The data transmission means transmits the rules created by the rule generation means. For example, transmission is carried out to the receiving apparatus through a modem via a telephone line (Step N3)

The data receiving means receives the rules transmitted from the data transmission means.

(Step N4)

The rules received by the data receiving means are stored in the rule storage means.

(Step N5)

From the rules stored in the rule storage means 5105, one rule not yet selected is selected.

(Step N6)

This step is basically the same as Step J6 described in the above-mentioned Embodiment 9.

(Step N7)

For a rule, the front portion of which is compatible, data writing processing compatible thereto is carried out on the basis of the freezer condition observed by the condition observation means. The data writing processing at this step is basically the same as Step J7 described in the above-mentioned Embodiment 9, except for the addition of the freezer condition. Hereafter, the sequence returns to (Step N5).

For this reason, it is possible to change the data of the latter portion of the rule depending on the condition of the freezer to change the cooking sequence of the microwave oven. Furthermore, in the case when the internal temperature condition is changed by door opening/closing for food storage into the freezer, the cooking sequence can be changed to a proper content at the time of each change. As a result, it is possible to reduce waste loss due to food cooking failure caused by difference in the frozen condition of the frozen food.

Furthermore, the cooking sequence may be changed depending on the external temperature, season, cooking time period and the preference of customers as well as the condition of the freezer.

(Embodiment 14)

Figure 55:
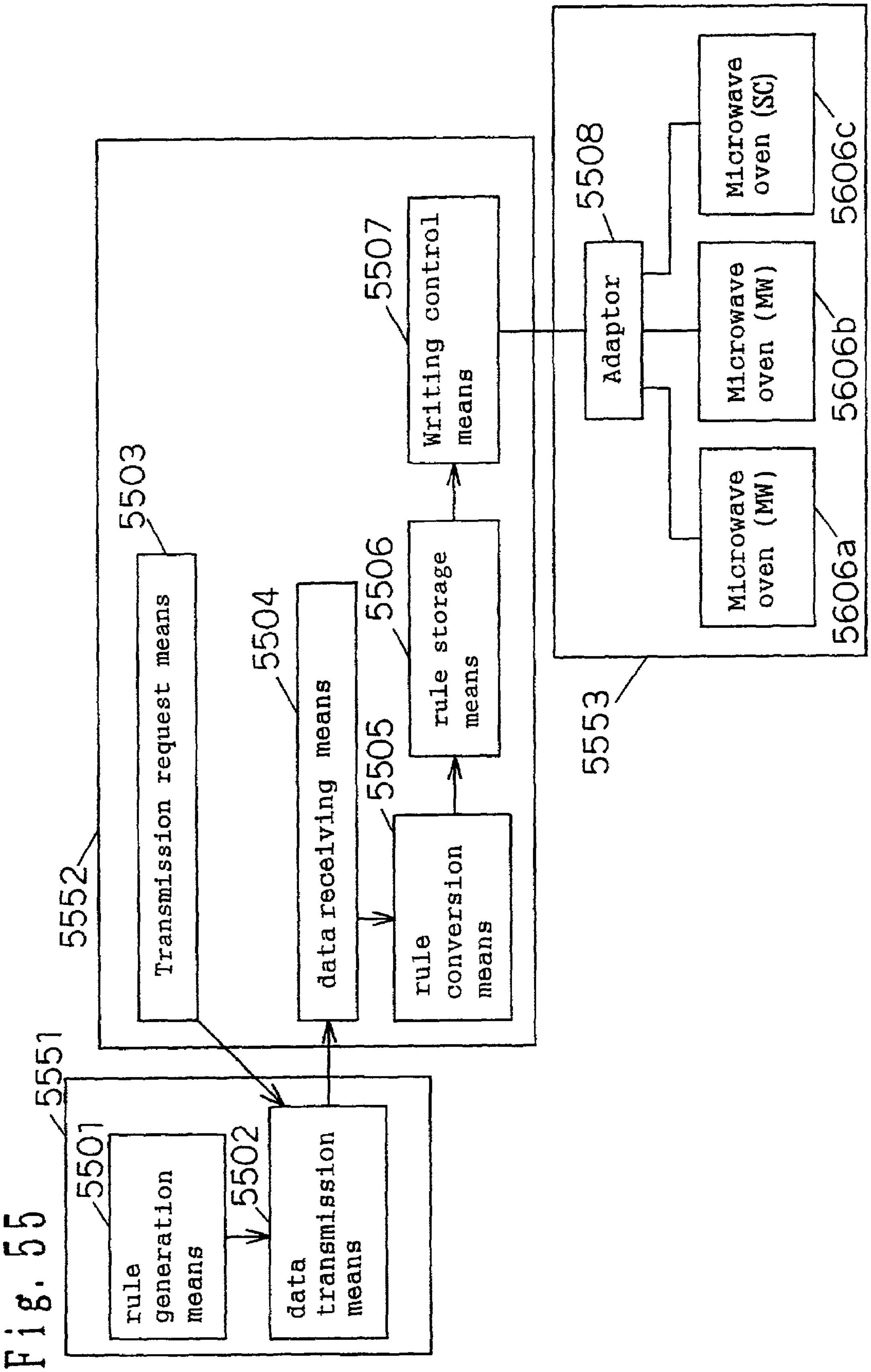
FIG. 55 is a block diagram showing the system configuration of a rule communication apparatus in accordance with Embodiment 14.

FIG. 55 is a system configuration diagram of a rule communication apparatus of an embodiment in accordance with the present invention; and the present embodiment will be described by using the figure.

In FIG. 55, the numeral 5501 represents a rule generation means for generating rules, and the numeral 5502 represents a data transmission means for converting the rules generated by the rule generation means 5501 into data and for transmitting the data. These are used to form a transmission apparatus 5551. Furthermore, the numeral 5503 represents a request transmission means for requesting data transmission for the data transmission means 5503, the numeral 5504 represents a data receiving means for receiving data transmitted by the data transmission means 5502, the numeral 5505 represents a rule conversion means for converting the data received by the data receiving means 5504 into rules, the numeral 5506 represents a rule storage means for storing the rules converted by the rule conversion means 5505, and the numeral 5507 represents a writing control means for controlling data writing on the basis of the rules stored in the rule storage means 5505. These are used to form a mobile-type receiving apparatus 5552. In addition, the microwave ovens 5606*a* to 5606*c* installed at the convenience store 5553 are connected to an adaptor 5508. The writing control means 5507 is configured so as to be connectable to the adaptor 5508 via an interface 5605 (see FIG. 56).

Figure 56:
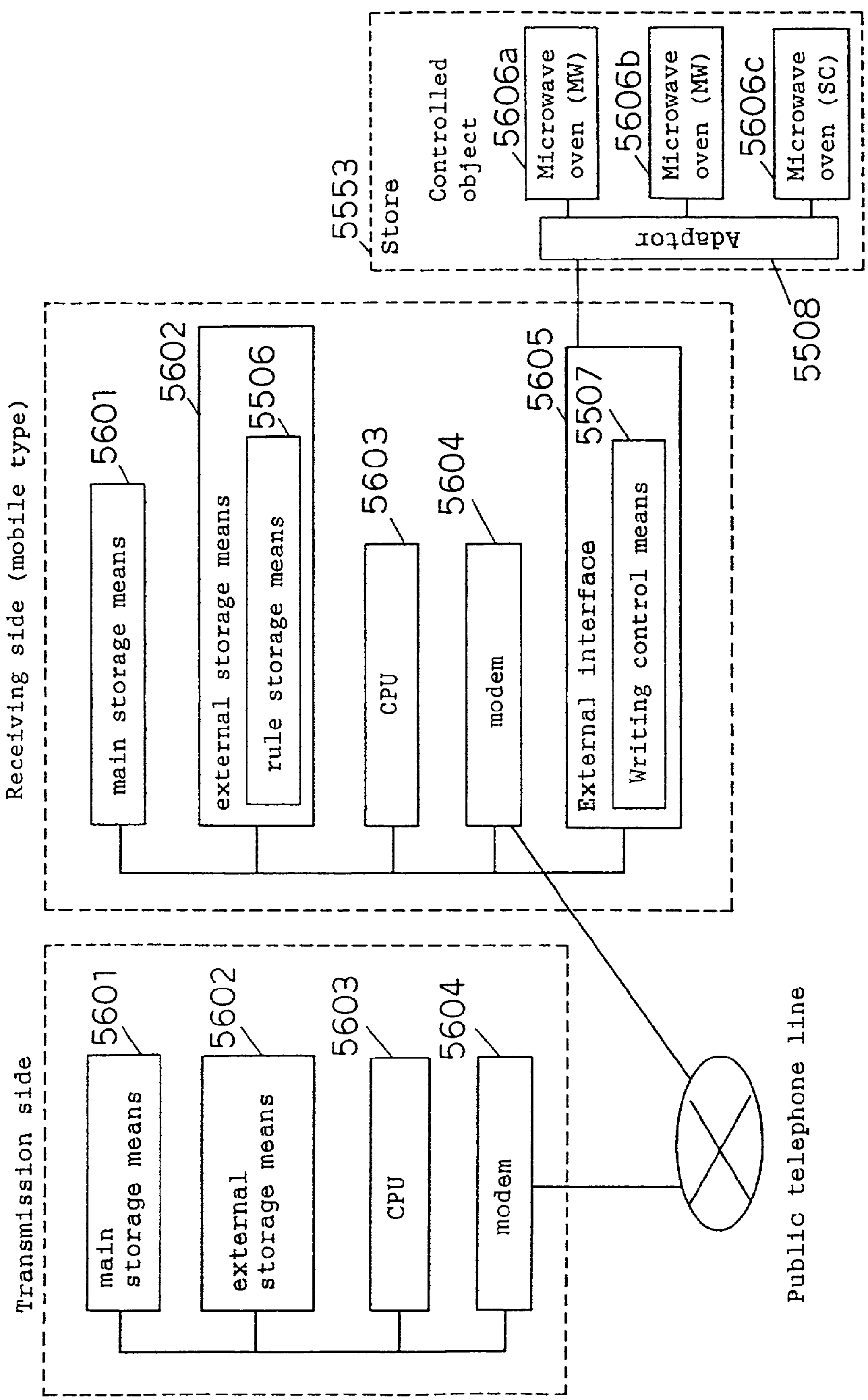
FIG. 56 is a block diagram showing the hardware configuration of the rule communication apparatus in accordance with Embodiment 14.

FIG. 56 shows a hardware configuration wherein the system configured as described above is operated. FIG. 56 is basically the same configuration as that of a general-purpose computer system for carrying out communication. In FIG. 56, the numeral 5601 represents a main storage apparatus for storing processing programs and data at the time of execution, the numeral 5602 represents an external storage apparatus for storing programs and data, the numeral 5603 represents a CPU for transferring programs stored in the external storage apparatus to the main storage apparatus and for executing them, the numeral 5604 represents a modem capable of being connected to an external network, the numeral 5605 represents an external interface, such as an RS232C or the like, for writing data externally, and the numerals 5606*a* to 5606*c* represent microwave ovens having storage media.

Herein, the summary of the present embodiment will be described first.

In the case of the above-mentioned embodiment, the receiving apparatus is installed in each store. However, in the case of the present embodiment, the receiving apparatus is mobile and not installed at each store at all times. In other words, a supervisor who makes the rounds of each store and writes new cooking sequences for the microwave ovens installed therein as his main jobs possesses this receiving apparatus. Therefore, the supervisor gains access to the WWW server by using the Internet browser, and browses and monitors as necessary whether a new cooking sequence has come or not. In the case when a new cooking sequence is found, the rule of the new cooking sequence is obtained by downloading, and is stored once in the rule storage means of the receiving apparatus. After this, he makes rounds of each store with the receiving apparatus, connects it to the adaptor 5508 installed in the store, and executes writing of the new cooking sequence.

Figure 57:
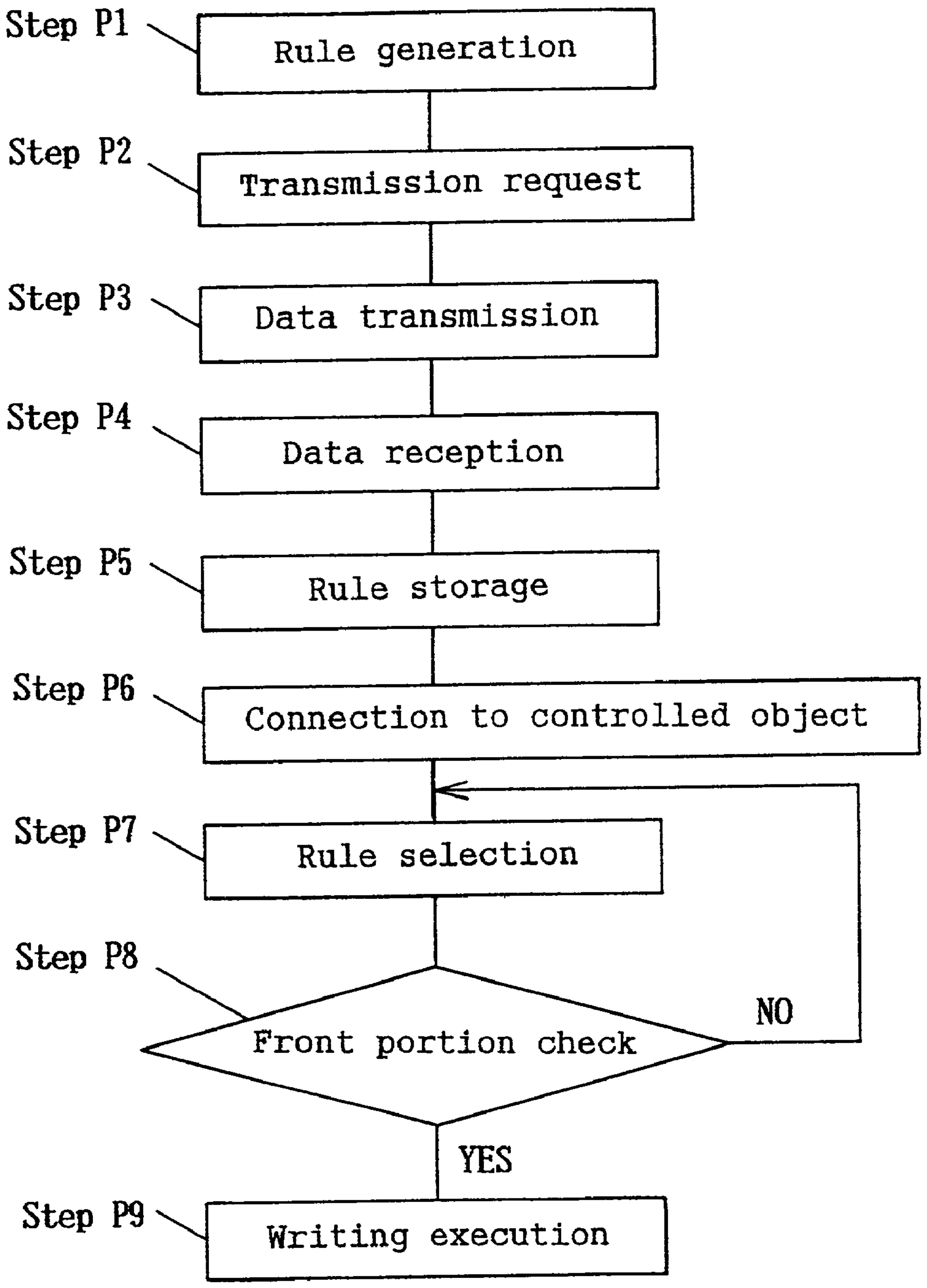
FIG. 57 is a flowchart explaining the operation of the rule communication apparatus in accordance with Embodiment 14.

The operation of the rule communication apparatus configured as described above will be explained in accordance with the flowchart of FIG. 57

(Step P1)

At the rule generation means, rules are edited on the transmitter side (the WWW server). For example, it is assumed that the rules shown in FIG. 39 have been created and edited as rules for controlling the written contents of the cooking sequences for microwave ovens depending on the type of the microwave oven.

(Step P2)

The supervisor checks whether a new cooking sequence is present or not by using the Internet browser. If a new cooking sequence is present, he issues a data request from the data request means 5503 on the data receiving side to the data transmission means 5502. For example, by clicking a button indicated on the Internet browser, the data request is carried out. Alternatively, a transmission request is issued to the data transmission apparatus through a modem via a telephone line.

(Step P3)

The data transmission apparatus transmits the rules created and edited at (Step P1) in response to the transmission request on the data receiving side.

(Step P4)

The data receiving means 5504 receives the rules transmitted from the data transmission means 5502.

(Step P5)

The rules received by the data receiving means 5504 are stored in the rule storage means 5506.

(Step P6)

The supervisor, a rounding worker, makes rounds of each convenience store with the mobile-type receiving apparatus 5552. He then connects the receiving apparatus 5552 to the controlled apparatuses (microwave ovens) installed in the store via the adaptor 5508.

(Step P7)

From the rules stored in the rule storage means 5506, one rule not yet selected is selected.

(Step P8)

This step is basically the same as Step J6 described in the above-mentioned Embodiment 9.

(Step P9)

This step is basically the same as Step J7 described in the above-mentioned Embodiment 9.

In other words, by using the above-mentioned matching information created at Step P8, the writing process for the data of the corresponding latter portion is carried out for the microwave ovens 5606*a* to 5606*c* of each of the above-mentioned connection destinations.

As clarified by the above-mentioned explanations, in the above-mentioned embodiments, the receiving apparatus is required to be installed in each store. In addition, usually, the electric power for the receiving apparatus should be turned on at all times, since it is unknown when a new cooking sequence is disclosed.

However, in the case of the present embodiment, since the supervisor possesses the data receiving apparatus, it is not necessary to install the apparatus at each store. In addition, rule reception is carried out at the time when a data request is issued regularly from the supervisor to the server, whereby it is not necessary that the data receiving apparatus is powered on at all times and set in the data receiving standby mode.

Furthermore, the data receiving apparatus may have any configurations if it is a communication apparatus having a storage medium, such as a portable telephone.

Moreover, the communication between the control object and the receiving apparatus is carried out regardless of whether it is wireless or wired.

(Embodiment 15)

Figure 58:
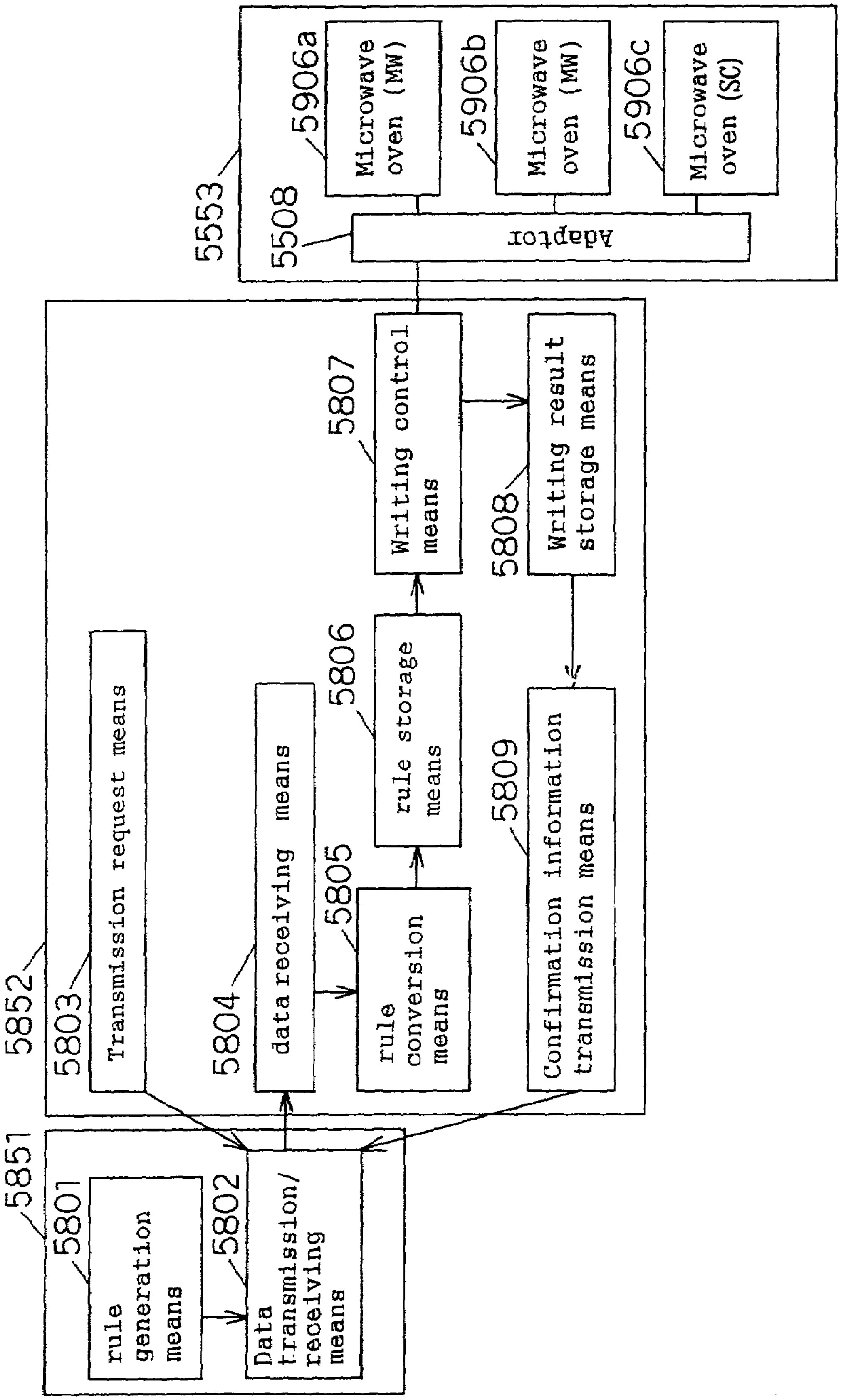
FIG. 58 is a block diagram showing the system configuration of a rule communication apparatus in accordance with Embodiment 15.

FIG. 58 is a system configuration diagram of a rule communication apparatus of an embodiment in accordance with the present invention; and the present embodiment will be described by using the figure.

In FIG. 58, the numeral 5801 represents a rule generation means for generating rules, and the numeral 5802 represents a data transmission means for converting the rules generated by the rule generation means 5801 into data and for transmitting the data. These are used to form a transmission apparatus 5851. Furthermore, the numeral 5803 represents a request transmission means for requesting data transmission for the data transmission means 5803, the numeral 5804 represents a data receiving means for receiving data transmitted by the data transmission means 5802, the numeral 5805 represents a rule conversion means for converting the data received by the data receiving means 5804 into rules, the numeral 5806 represents a rule storage means for storing the rules converted by the rule conversion means 5805, the numeral 5807 represents a writing control means for controlling data writing on the basis of the rules stored in the rule storage means 5805, the numeral 5808 represents a writing result storage means for storing the result of writing executed by the writing control means 5807, and the numeral 5809 represents a confirmation information transmission means for transmitting data stored in the writing result storage means to the transmission side. These are used to form a receiving apparatus.

Figure 59:
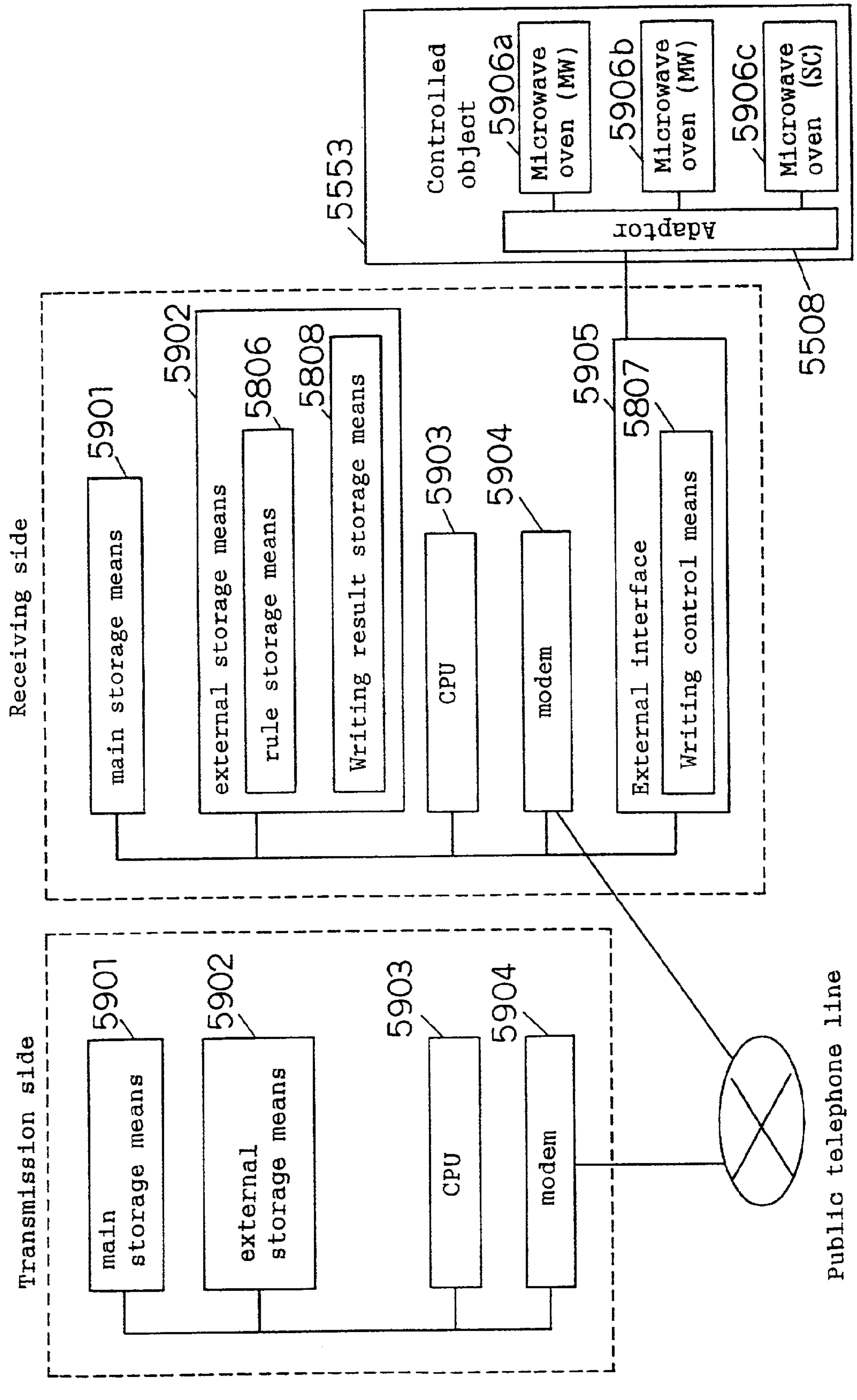
FIG. 59 is a block diagram showing the hardware configuration of the rule communication apparatus in accordance with Embodiment 15.

FIG. 59 shows a hardware configuration wherein the system configured as described above is operated. FIG. 59 is basically the same configuration as that of a general-purpose computer system for carrying out communication.

In FIG. 59, the numeral 5901 represents a main storage apparatus for storing processing programs and data at the time of execution, the numeral 5902 represents an external storage apparatus for storing programs and data, the numeral 5903 represents a CPU for transferring programs stored in the external storage apparatus to the main storage apparatus and for executing them, the numeral 5904 represents a modem capable of being connected to an external network, the numeral 5905 represents an external interface, such as an RS232C, for writing data externally, and the numerals 5906*a* to 5906*c* represent microwave ovens having storage media.

In the present embodiment, as described in the above-mentioned Embodiment 14, the supervisor possesses the receiving apparatus 5852, and the adaptor 5508 and microwave ovens are installed in each store 5553.

Figure 60:
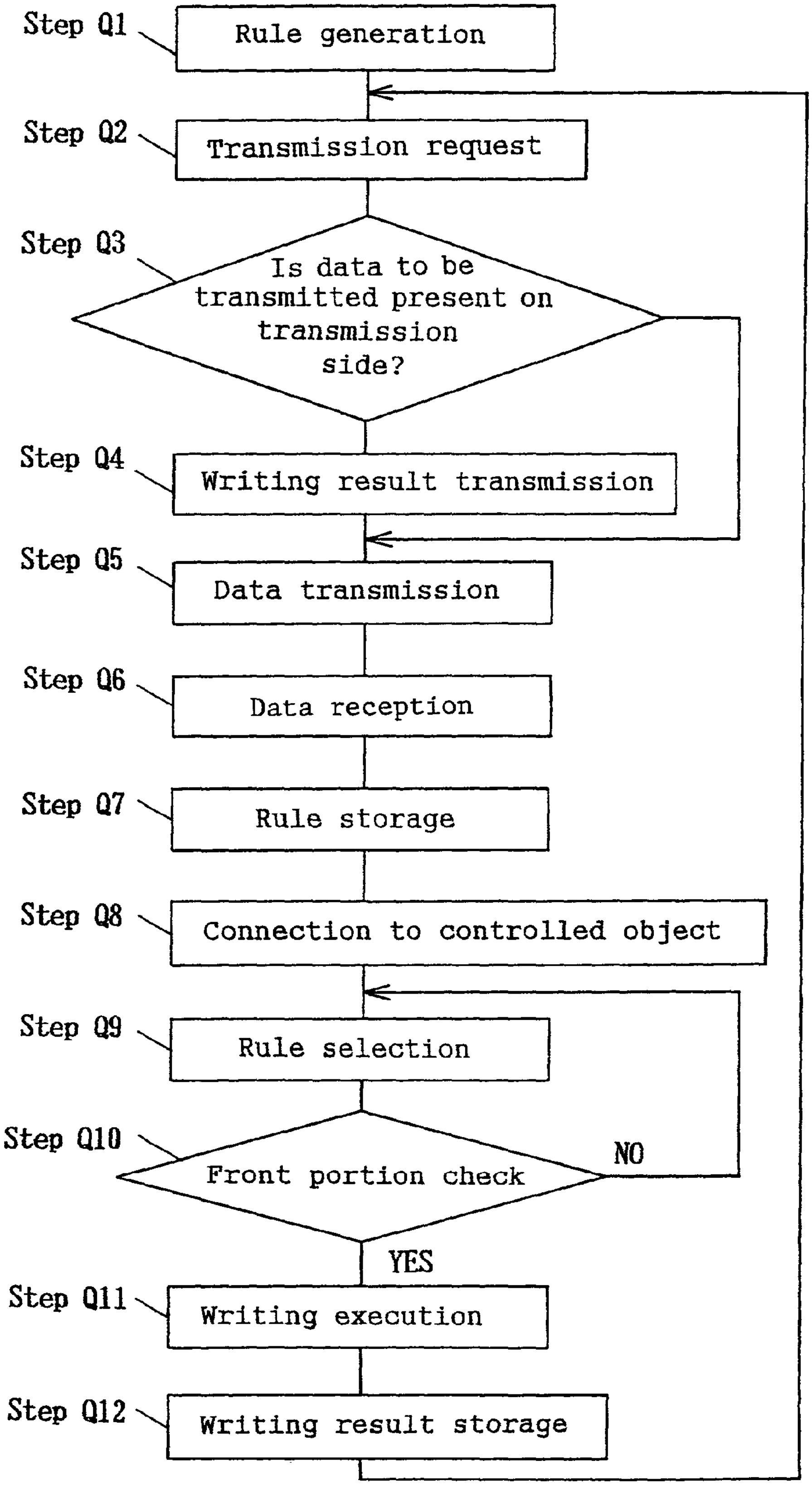
FIG. 60 is a flowchart explaining the operation of the rule communication apparatus in accordance with Embodiment 15.

The operation of the rule communication apparatus configured as described above will be explained in accordance with the flowchart of FIG. 60

(Step Q1)

At the rule generation means 5801, rules are edited on the transmitter side. For example, it is assumed that the rules shown in FIG. 39 have been created and edited as rules for controlling the written contents of the cooking sequences for microwave ovens depending on the type of the microwave oven.

(Step Q2)

The supervisor issues a data request from the data request means 5803 in the data receiving apparatus 5852 to the data transmission means 5802. For example, a data request is issued to the data transmission apparatus through a modem via a telephone line.

(Step Q3)

At the data receiving apparatus 5852, in the case when there is no data to be transmitted to the data transmission apparatus, the sequence advances to (Step Q5). In the case when there is data, the sequence advances to the next step.

(Step Q4)

The supervisor transmits the contents of history data, such as data renewal date/time information and the number of usage times of the controlled apparatus having been read from the storage medium of the controlled apparatus at the time of data renewal during the previous rounding of each store.

(Step Q5)

The data transmission apparatus transmits the rules created and edited at (Step Q1) in response to the data request from the supervisor.

(Step Q6)

The data receiving means receives the rules transmitted from the data transmission means.

(Step Q7)

The supervisor, a rounding worker, makes rounds of each convenience store with the mobile-type receiving apparatus 5552. He then connects the receiving apparatus 5552 to the controlled apparatuses (microwave ovens) installed in the store via the adaptor 5508.

(Step Q8)

The rules received by the data receiving means are stored in the rule storage portion.

(Step Q9)

From the rules stored in the rule storage means 5806, one rule not yet selected is selected.

(Step Q10)

This step is basically the same as Step J6 described in the above-mentioned Embodiment 9.

(Step Q11)

This step is basically the same as Step J7 described in the above-mentioned Embodiment 9.

In other words, by using the above-mentioned matching information created at Step Q10, the writing processing for the data of the corresponding latter portion is carried out for the microwave ovens 5906*a* to 5906*c* of each of the above-mentioned connection destinations.

(Step Q12)

The date/time when the above-mentioned supervisor, a rounding worker, renewed data at each store is stored as data to be sent to the data transmission side, and the sequence returns to (Step Q2).

For example, as the date/time when data is written at convenience store A, information "10:35, Mar. 10, 1999" is stored at (Step Q12). When the supervisor issues a transmission request to the data transmission side at the next time, the date/time information having been stored is also transmitted. As a result, it is possible to confirm that data has been renewed at store A on the data transmission side, and it is also possible to know the date/time of the renewal.

The data transmission and reception between the transmission apparatus and the receiving apparatus may be carried out by using the Internet browser. At this time, the affinity for the Internet browser is improved by representing rules in the XML format.

In the above-mentioned embodiment, a case wherein the recording medium built in the controlled apparatus (microwave oven) is used a data writing destination is described; however, without being limited to this, it may be possible to use a card-type storage medium removable from the controlled apparatus. It is needless to say that this card-type storage medium is installed in each controlled apparatus, and that the storage medium is provided with identification information indicating each controlled apparatus corresponding thereto.

By the way, it may be possible that a program recording medium, such as a magnetic storage medium or an optical storage medium, on which programs for making a computer execute the functions of all of the means (or steps) or part of the means (or steps) described in the above-mentioned embodiments are recorded, is produced, and that it is used to make the computer execute all or part of operations identical to the above mentioned operations.

In the above-mentioned embodiments, the case wherein data transmission and reception by using the data transmission means and the data receiving means are mainly described; however, without being limited to this, these means may be changed to a DTMF transmission means and a DTMF receiving means, respectively, so that information transmission and reception are carried out by using DTMF signals.

Furthermore, in the present embodiment, cooking devices, such as microwave ovens and ovens, are described; however, any kinds of control devices may be used, provided that they are control devices having different control contents depending on other cooking devices such as a rice cocker, air-conditioning devices for cooling and heating, devices such as a washing machine and a vacuum cleaner, and devices such as a television image quality adjuster.

Furthermore, in the present embodiment, the transmission and reception of rules to be changed depending on food material are described; however, the transmission and reception of rules for changing cooking contents depending on time and season may be used.

Furthermore, in the above-mentioned embodiments, the case wherein the information receiving apparatus is a device connected to a network via a modem or the like is mainly described; however, without being limited to this, it may be possible to transmit information in the rule format by using media such as broadcasting, and to receive the information in the rule format by using a tuner.

In the present embodiment, transmission and reception of rules for changing processing contents depending on the type of IC card are described; however, it may be possible to use transmission and reception of rules for changing processing contents depend on time and season.

Furthermore, in the above-mentioned embodiments, a modem connected to a telephone line is described as a device for transmitting and receiving data; however, it may be possible to use a leased line for such as the Internet or a LAN line.

Furthermore, in the above-mentioned embodiments, the system of a rule communication apparatus is mainly described; however, without being limited to this, a configuration capable of achieving one of a data transmission apparatus and a data receiving apparatus may be used. In this case, the data transmission apparatus is, for example, a data transmission apparatus comprising a rule generation means for generating rules respectively corresponding to plural kinds of controlled apparatuses on the receiving side, and a data transmission means for converting the rules generated by the above-mentioned rule generation means into data and transmitting the converted data to plural data receiving apparatuses; and each of the above-mentioned data receiving apparatuses has a configuration comprising a data receiving means for receiving data transmitted from the above-mentioned transmission means, a rule conversion means for converting the data received by the above-mentioned data receiving means to rules, a rule storage means for storing the rules converted by the above-mentioned rule conversion means, and a control means for selecting the corresponding rule from among the above-mentioned plural kinds of rules stored in the above-mentioned rule storage means and for controlling the above-mentioned controlled apparatus on the basis of the selected rule. In addition, the data receiving apparatus comprises, for example, a data receiving means for receiving data transmitted from a data transmission apparatus which has a rule generation means for generating rules corresponding to each kind of plural kinds of controlled apparatuses as controlled objects on the receiving side, and a data transmission means for converting the rules generated by the above-mentioned rule generation means into data and transmitting the converted data to plural receiving terminals having the above-mentioned controlled apparatuses; a rule conversion means for converting the data received by the above-mentioned data receiving means into rules; a rule storage means for storing the rules converted by the above-mentioned rule conversion means; and a control means for selecting a predetermined rule from among the above-mentioned plural kinds of rules stored in the above-mentioned storage means and for controlling the above-mentioned controlled apparatus on the basis of the selected rule, wherein the above-mentioned predetermined rule is selected corresponding to the above-mentioned controlled apparatus. Furthermore, the above-mentioned data receiving apparatus may be configured that it has an output means for outputting information on the predetermined usage times or abnormality/failure of the above-mentioned controlled apparatus, that the above-mentioned rule is a rule wherein the conditions for outputting the above-mentioned information are set corresponding to the above-mentioned data receiving apparatus or the above-mentioned controlled apparatus, and that, in the case where the above-mentioned conditions have been established in the above-mentioned controlled apparatus, the above-mentioned information is output from the above-mentioned output means. Moreover, the above-mentioned data receiving apparatus may be configured so as to be provided with a password judgment means, which, at the time of the issue of a connection request from the above-mentioned data transmission apparatus, judges as to whether the password attached to the above-mentioned connection request is proper or not on the basis of the renewal planned information of the password previously transmitted from the above-mentioned data transmission apparatus, and permits the above-mentioned connection depending on the result of the judgment. This delivers an effect similar to that described above.

In accordance with the rule communication apparatus of a 15th invention of the present invention, it is possible to change device control depending on the food material and object to be cooked, for example. Moreover, control contents to be changed can be set on the transmitter side at a remote location. As a result, it is possible to change device control contents depending on the object without going to the site where the control apparatus is located.

In accordance with the rule communication apparatus of a 34th invention of the present invention, it is possible to change device control depending on the food material and object to be cooked, for example. Moreover, control contents to be changed can be set on the transmitter side at a remote location. In addition, since DTMF signals are used, the contents of device control can be changed through a general-use pushbutton telephone. As a result, it is possible to change device control contents depending on the object without going to the site where the control apparatus is located.

In accordance with the rule communication apparatus of an 18th invention of the present invention, in the case when a device is controlled by using an external storage medium, such as an IC card, for example, data writing contents can be described depending on the type of the card; therefore, even a user, who must control the device by using the external storage medium, such as the IC card, can make the present apparatus automatically identify the type of the card and write data, without concern for the type of the card.

In accordance with the rule communication apparatus of a 20th invention of the present invention, it is possible to change device control depending on the food material and object to be cooked, for example. Moreover, control contents to be changed can be set on the transmitter side at a remote location. As a result, it is possible to change device control contents depending on the object without going to the site where the control apparatus is located. Furthermore, since the previously transmitted control contents can be used for complicated control operation, it is not necessary to transmit the same control contents again, whereby the cost for data transmission and reception can be reduced.

In accordance with the rule communication apparatus of a 22nd invention of the present invention, it is possible to change device control depending on the food material and object to be cooked, for example. Moreover, control contents to be changed can be set on the transmitter side at a remote location. As a result, it is possible to change device control contents depending on the object without going to the site where the control apparatus is located. Furthermore, only the change portions of the rules stored in the device on the receiving side can be corrected on the transmission side. As a result, even if a wrong control content is transmitted, it can be corrected easily on the transmission side.

In accordance with the rule communication apparatus of a 24th invention of the present invention, it is possible to monitor the usage contents of the control device at a remote location without going to the site where the control device is installed. This is particularly effective in notifying failure or the like of the control device.

In accordance with the rule communication apparatus of a 26th invention of the present invention, in the case when a device is controlled by using an external storage medium, such as an IC card, for example, data writing contents can be described depending on the type of the card; therefore, the present apparatus can automatically identify the card so that data can be written, whereby even a user who must control the device by using an external storage medium, such as an IC card, is not required to worry about the type of the card. Furthermore, a check can be urged so that writing is carried out completely.

In accordance with the rule communication apparatus of a 28th invention of the present invention, it is possible to dynamically change the password each time data is transmitted, for example, whereby high security can easily be achieved by using rules.

As described above, in the present invention, information is transmitted in the rule format so that processing contents can be changed depending on conditions from the information transmission side, or so that the processing contents can be selected depending on the conditions on the receiving terminal side, whereby it, is made possible to change or select the processing contents depending on the environment and conditions on the receiving side, thereby extending the conventional information communication system. In addition, with respect to device control information, the contents of control processing can be changed depending on the control device or controlled object or conditions.

As clarified by the above descriptions, the present invention has an advantage of being capable of reducing burdens on the change of the received information on the information receiving terminal side.

Furthermore, the present invention has an advantage of being capable of ensuring data security.

Moreover, the present invention has an advantage of being capable of monitoring the usage contents of the control device from a remote location and capable of easily changing the contents of the monitoring.

INDUSTRIAL APPLICABILITY

As described above, in accordance with the present invention comprises, for example, a transmission apparatus comprises a rule generation means for generating rules and a data transmission means for converting the rules generated by the rule generation means into data and for transmitting the data; and a receiving apparatus comprises a data receiving means for receiving data transmitted by the data transmission means, a rule conversion means for converting the data received by the data receiving means into rules, a rule storage means for storing the rules converted by the rule conversion means, and a control means for controlling a controlled apparatus, such as a microwave oven, in accordance with the rules stored in the rule storage means. Consequently, it is possible to reduce burdens on the change of the received information on the information receiving terminal apparatus side.

What is claimed is:

1. A recording medium having a recorded, computer-executable program for performing a one-way-direction data transmission to transmit a common set of rules to each of plural data receiving apparatuses, each said data receiving apparatus controlling at least one controlled apparatus that is one of a predetermined kind of apparatus, wherein different apparatuses of said kind of apparatus have a primary operation function that is common to all said apparatuses of said kind, but wherein different apparatuses of said kind also have different specific parameters that identify different specific features of each data receiving apparatus, and each said data receiving apparatus selecting, from a received said common set of rules, a specific rule corresponding to one of said specific parameters of said at least one controlled apparatus, wherein said specific rule is used to control said at least one controlled apparatus, said computer-executable program causes steps to occur, said steps comprising:

generating rules to provide generated rules that include a specific rule corresponding to said specific parameter of each controlled apparatus of said kind of controlled apparatuses;

converting said generated rules into converted data to provide a set of rules, and transmitting said converted data to all said plural data receiving apparatuses as said common set of rules.

2. A recording medium as claimed in claim 1, wherein said specific rules include identification information for identifying which said kind of apparatuses use said specific rules.

3. A recording medium having a recorded, computer-executable program for controlling a controlled apparatus that is one of a predetermined kind of apparatus wherein different apparatuses of said kind of apparatus have a primary operation function that is common to all apparatuses of said kind but wherein different apparatuses of said kind also have different specific parameters that identify different specific features of each controlled apparatus, said controlling comprising:

at a transmitting side, generating a common set of rules for controlling said primary operation function of all of said apparatuses of said kind, said common set of rules including a specific rule corresponding to one of said specific parameters of each of said controlled apparatuses;

converting said common set of rules into transmittable rule data and transmitting said rule data to all said controlled apparatuses at a receiving side; and at said receiving side, receiving transmitted rule data to obtain received rule data;

converting said received rule data into rules;

storing said rules to provide stored rules;

selecting said specific rule from among said stored rules in dependence upon the specific parameter; and controlling said controlled device according to said specific rule without transmitting information to said transmitter side.

4. A recording medium having a recorded, computer-executable program for performing one-way-direction data receiving to control a controlled apparatus of a predetermined kind of controlled apparatus according to a specific rule corresponding to a specific parameter of said one controlled apparatus, said specific parameter identifying a specific feature of said one controlled apparatus, said specific rule being one rule of a common set of rules provided for control over said predetermined kind of controlled apparatuses, wherein said controlled apparatuses of said predetermined kind have a primary operation function that is common to all of said controlled apparatuses, and wherein said one controlled apparatus has a different control parameter than other controlled apparatuses of said predetermined kind of controlled apparatuses, said different control parameter corresponding to said specific feature, said computer-executable program causes steps to occur, said steps comprising:

receiving rule data representative of all rules of said common set of rules, said common set of rules having been converted into said rule data and transmitted prior to said receiving;

converting said rule data into all said rules;

storing all said rules converted from said rule data; and selecting a selected rule from all said rules stored, depending on said specific parameter of said controlled apparatus, whereafter said controlled apparatus is controlled according to said specific rule.

5. A recording medium having a recorded, computer-executable program for performing one-way-direction rule communication to control predetermined controlled apparatuses that are of a predetermined kind of apparatus, wherein different apparatuses of said kind of apparatus have a primary operation function that is common to all apparatuses of said kind, but wherein different apparatuses of said kind also have different specific parameters that identify different specific features of each controlled apparatus, said computer-executable program causes steps to occur, said steps comprising:

generating a common set of rules corresponding to said predetermined kind of controlled apparatuses, each said common set of rules including a specific rule corresponding to each specific parameter of each of said controlled apparatuses;

converting said common set of rules into rule data;

transmitting said rule data to all said controlled apparatuses;

receiving all said rule data transmitted;

converting said rule data received into said common set of rules;

storing said common set of rules; and selecting a selected rule from among said common said set of rules as stored, depending on a said specific parameter of one of said controlled apparatuses, whereby said selected rule is selected based upon a said specific parameter of said at least one of said predetermined controlled apparatuses, and whereafter said controlled apparatus is controlled according to said specific rule.

6. A recording medium having a recorded, computer-executable program for controlling a controlled apparatus of a predetermined kind of controlled apparatus according to a specific rule corresponding to a specific parameter of said one controlled apparatus, said specific parameter identifying a specific feature of said one controlled apparatus, said specific rule being one rule of a common set of rules provided for control over said predetermined kind of controlled apparatuses, wherein said controlled apparatuses of said predetermined kind have a primary operation function that is common to all of said controlled apparatuses, and wherein said one controlled apparatus has a different control parameter than other controlled apparatuses of said predetermined kind of controlled apparatuses, said different control parameter corresponding to said specific feature, said controlling comprising steps, said steps comprising:

receiving rule data representative of all rules of said common set of rules, said common set of rules having been converted into said rule data and transmitted prior to said receiving;

converting received rule data into all said rules;

storing all said rules converted from said received rule data; and selecting a selected rule from all said stored rules, depending on said specific parameter of said controlled apparatus, whereafter said controlled apparatus is controlled according to said specific rule.

* * * * *